US012713001B2

(12) United States Patent
Wang

(10) Patent No.: US 12,713,001 B2
(45) **Date of Patent: *Aug. 18, 2026**

(54) PREDICTION METHODS AND A METHOD FOR BITSTREAM TRANSMISSION

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 13 days.

This patent is subject to a terminal disclaimer.

(21) Appl. No.: 18/759,749

(22) Filed: Jun. 28, 2024

(65) Prior Publication Data

US 2024/0364860 A1 Oct. 31, 2024

Related U.S. Application Data

(63) Continuation of application No. PCT/CN2021/143977, filed on Dec. 31, 2021.

(51) Int. Cl.
*H04N 19/103* (2014.01)
*H04N 19/176* (2014.01)

(52) U.S. Cl.
CPC ......... *H04N 19/103* (2014.11); *H04N 19/176* (2014.11)

(58) Field of Classification Search
CPC .................................................... H04N 19/103
USPC .................................................... 375/240.02
See application file for complete search history.

(56) References Cited

U.S. PATENT DOCUMENTS

| | | | | |
|---|---|---|---|---|
| 11,388,421 | B1 * | 7/2022 | Wang | H04N 19/11 |
| 2017/0353730 | A1 * | 12/2017 | Liu | H04N 19/159 |
| 2018/0098086 | A1 * | 4/2018 | Chuang | H04N 19/198 |
| 2018/0255295 | A1 * | 9/2018 | Lee | H04N 19/593 |
| 2019/0215531 | A1 * | 7/2019 | Lee | H04N 19/577 |
| 2019/0335181 | A1 * | 10/2019 | Abe | H04N 19/139 |
| 2020/0053364 | A1 * | 2/2020 | Seo | H04N 19/503 |
| 2020/0366900 | A1 * | 11/2020 | Jun | H04N 19/105 |
| 2021/0021847 | A1 * | 1/2021 | Moon | H04N 19/46 |
| 2021/0067776 | A1 * | 3/2021 | Reuze | H04N 19/573 |

(Continued)

FOREIGN PATENT DOCUMENTS

| | | |
|---|---|---|
| CN | 113709498 | 11/2021 |
| CN | 113709500 | 11/2021 |

(Continued)

OTHER PUBLICATIONS

WIPO, International Search Report for International Application No. PCT/CN2021/143977, Sep. 19, 2022.

*Primary Examiner* — Leron Beck
(74) *Attorney, Agent, or Firm* — Hodgson Russ LLP

(57) ABSTRACT

Methods for video encoding/decoding and bitstream transmission are provided. A weight derivation mode of a current block is determined; K templates are determined according to at least one of a size of the current block and the weight derivation mode; K prediction modes are determined according to the K templates; and a prediction value is determined according to the K prediction modes and the weight derivation mode. The K templates are determined according to the size of the current block and/or the weight derivation mode.

20 Claims, 29 Drawing Sheets

(56) References Cited

U.S. PATENT DOCUMENTS

| | | | | |
|---|---|---|---|---|
| 2022/0329824 | A1* | 10/2022 | Liao | H04N 19/176 |
| 2022/0385888 | A1* | 12/2022 | Lee | H04N 19/61 |
| 2023/0104476 | A1* | 4/2023 | Chen | H04N 19/52 375/240.02 |
| 2024/0291972 | A1* | 8/2024 | Liao | H04N 19/105 |

FOREIGN PATENT DOCUMENTS

| | | |
|---|---|---|
| CN | 113840148 | 12/2021 |
| WO | 2020180159 | 9/2020 |
| WO | 2021238396 | 12/2021 |

* cited by examiner

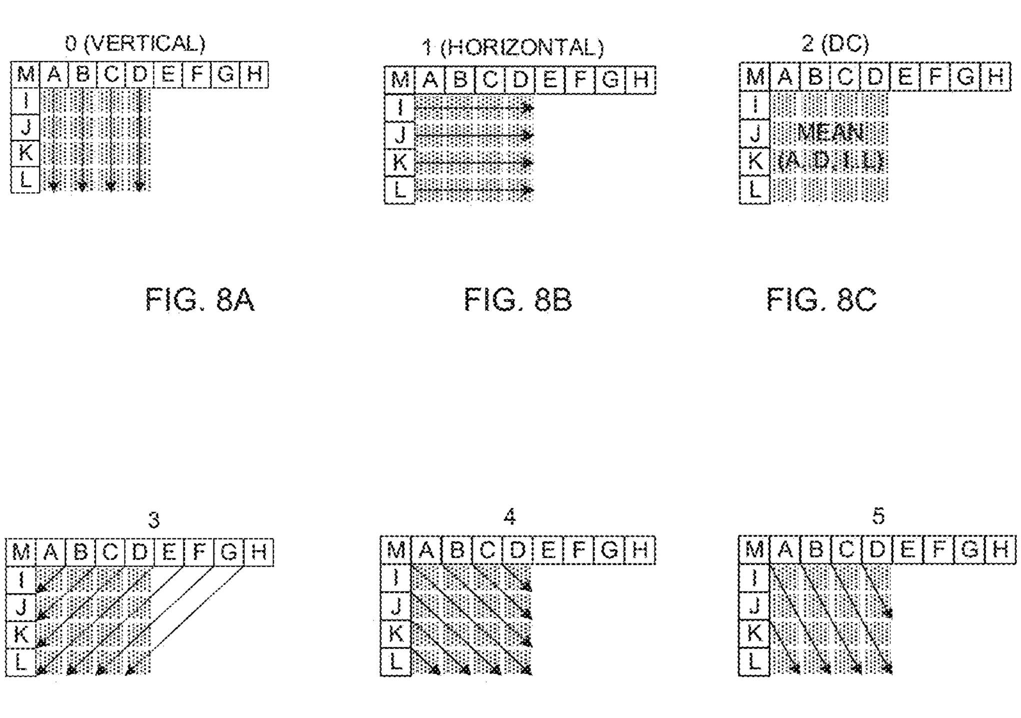
FIG. 8A
FIG. 8B
FIG. 8C
FIG. 8D
FIG. 8E
FIG. 8F
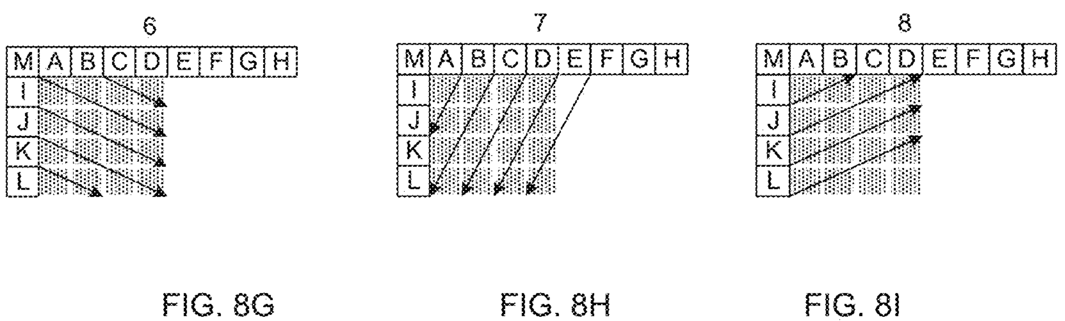
FIG. 8G
FIG. 8H
FIG. 8I Partition the template of the current block into K templates according to the weight derivation mode

S102-A

PREDICTION METHODS AND A METHOD FOR BITSTREAM TRANSMISSION

CROSS-REFERENCE TO RELATED APPLICATION(S)

This application is a continuation of International Application No. PCT/CN2021/143977, filed Dec. 31, 2021, the entire disclosure of which is incorporated herein by reference.

TECHNICAL FIELD

This disclosure relates to the field of video coding technology, and more particularly, to a prediction method and apparatus, a device, a system, and a storage medium.

BACKGROUND

Digital video technology may be applied to various video apparatuses, such as digital televisions, smart phones, computers, electronic readers, or video players, etc. With development of video technology, the data amount in video data is large. In order to facilitate transmission of video data, the video apparatus implements video compression technology, so that video data can be transmitted or stored more efficiently.

There is temporal redundancy or spatial redundancy in a video, and redundancy in the video can be eliminated or reduced through prediction, thereby improving compression efficiency. During prediction, a prediction mode is firstly determined, for example, a first prediction mode and a second prediction mode of a current block are determined through template matching. However, at present, template partitioning is not fine enough, and as a result, when determining the first prediction mode and the second prediction mode according to the template, the prediction modes determined are inaccurate, which leads to poor compression effect.

SUMMARY

In a first aspect, a prediction method is provided in the disclosure. The method is applied to a decoder. The method includes the following. A bitstream is decoded to determine a weight derivation mode of a current block. K templates are determined according to at least one of a size of the current block and the weight derivation mode, wherein K is a positive integer and K>1. K prediction modes are determined according to the K templates. A prediction value is determined according to the K prediction modes and the weight derivation mode.

In a second aspect, a prediction method is provided in embodiments of the disclosure. The method includes the following. A weight derivation mode of a current block is determined. K templates are determined according to at least one of a size of the current block and the weight derivation mode, wherein K is a positive integer and K>1. K prediction modes are determined according to the K templates. A prediction value is determined according to the K prediction modes and the weight derivation mode.

In a third aspect, a method is provided. The method includes, obtaining, by a processor, a bitstream; and transmitting the bitstream: wherein the bitstream is generated by performing steps of: determining, by the processor, a weight derivation mode of a current block; determining, by the processor, K templates according to at least one of a size of the current block and the weight derivation mode, wherein K is a positive integer and K>1; determining, by the processor, K prediction modes according to the K templates; and determining, by the processor, a prediction value according to the K prediction modes and the weight derivation mode.

BRIEF DESCRIPTION OF THE DRAWINGS

FIG. 8A to FIG. 81 each are a schematic diagram illustrating intra prediction.

DETAILED DESCRIPTION

The disclosure can be applied to the field of picture coding, video coding, hardware video coding, dedicated circuit video coding, real-time video coding, etc. For example, the solution in the disclosure may be incorporated into audio video coding standards (AVS), such as H.264/audio video coding (AVC) standard, H.265/high efficiency video coding (HEVC) standard, and H.266/versatile video coding (VVC) standard. Alternatively, the solution in the disclosure may be incorporated into other proprietary or industry standards, including ITU-TH.261, ISO/IECMPEG-1Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It should be understood that the techniques in the disclosure are not limited to any particular coding standard or technology.

Figure 1:
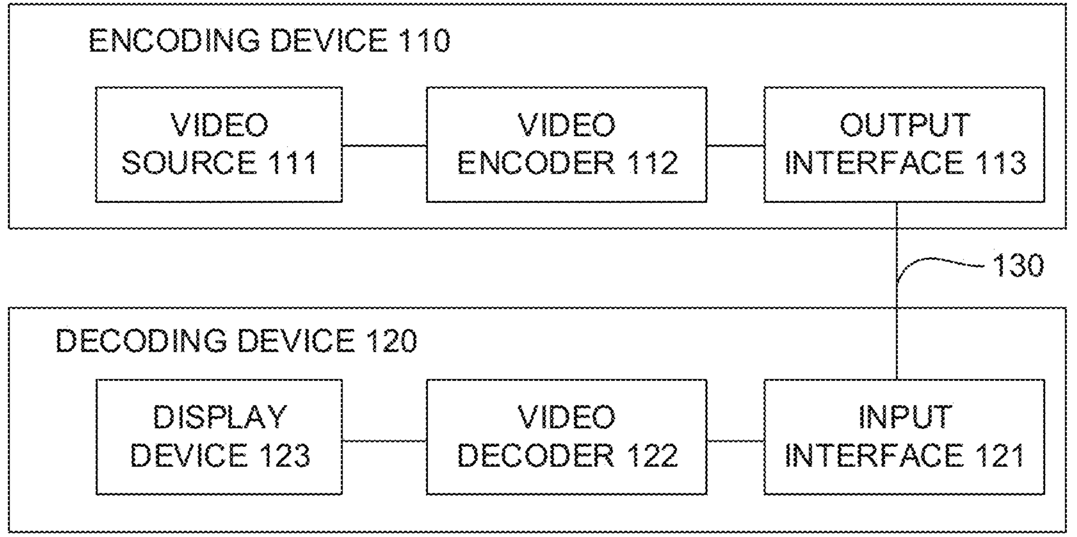
FIG. 1 is a schematic block diagram of a video coding system according to embodiments of the disclosure.

For ease of understanding, a video coding system in embodiments of the disclosure is firstly introduced with reference to FIG. 1.

FIG. 1 is a schematic block diagram of a video coding system 100 according to embodiments of the disclosure. It should be noted that FIG. 1 is only an example, and the video coding system in embodiments of the disclosure includes but is not limited to that illustrated in FIG. 1. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain decoded video data.

The encoding device 110 in the embodiments of the disclosure can be understood as a device having a video encoding function, and the decoding device 120 can be understood as a device having a video decoding function, that is, the encoding device 110 and the decoding device 120 in the embodiments of the disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding device 110 may transmit encoded video data (such as bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, digital versatile discs (DVDs), flash memory, and the like. In this example, the decoding device 120 may obtain the encoded video data from the storage medium.

In another example, the channel 130 may include a storage server that may store video data encoded by the encoding device 110. In this example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the input interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated together with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the disclosure are not limited to FIG. 1. For example, the technology of the disclosure may also be applied to one-sided video encoding or one-sided video decoding.

In the following, a video encoding framework in embodiments of the disclosure will be introduced.

Figure 2:
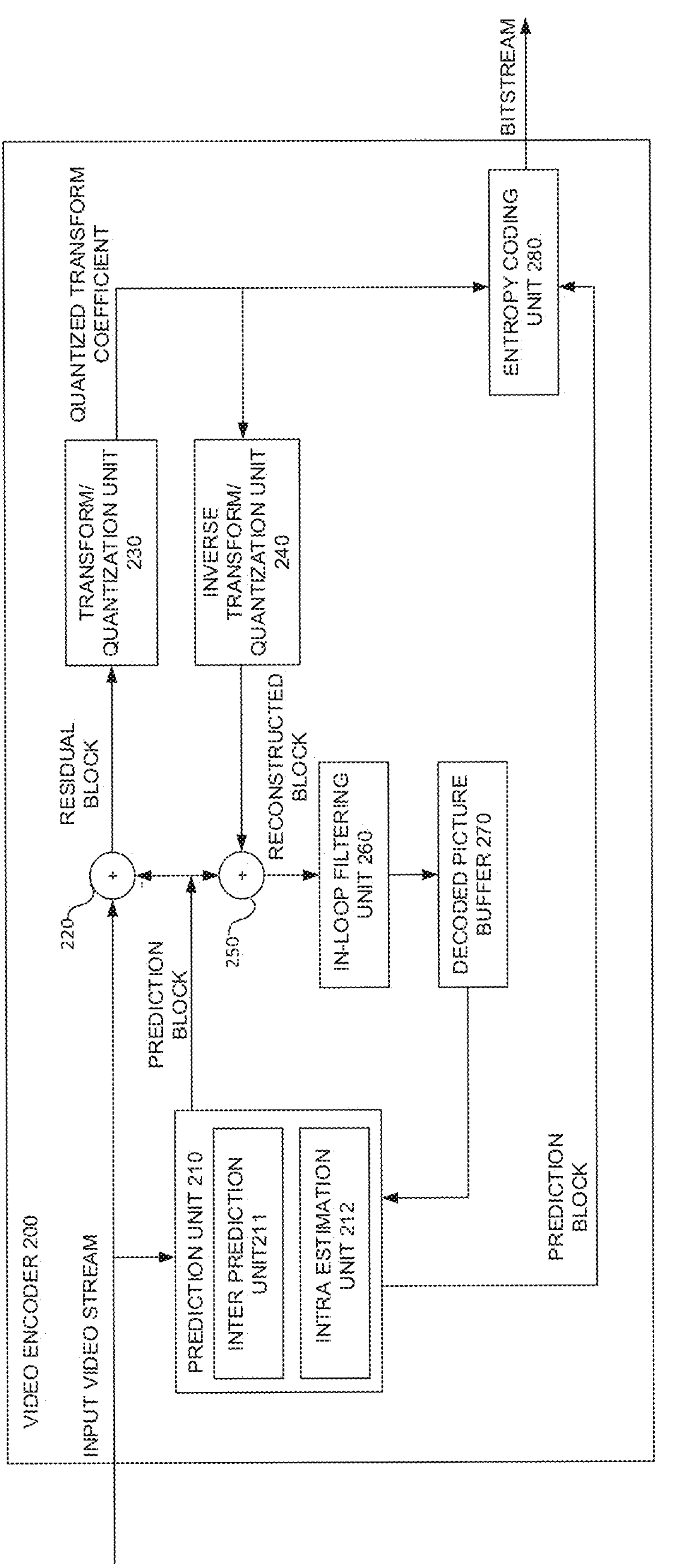
FIG. 2 is a schematic block diagram of a video encoder according to embodiments of the disclosure.

FIG. 2 is a schematic block diagram of a video encoder 200 according to embodiments of the disclosure. It should be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y represents luminance (Luma), Cb (U) represents blue chrominance, and Cr (V) represents red chrominance. U and V represent chrominance (Chroma) for describing colour and saturation. For example, in terms of color format, 4:2:0 represents that every 4 pixels have 4 luma components and 2 chroma components (YYYYCbCr), 4:2:2 represents that every 4 pixels have 4 luma components and 4 chroma component (YYYYCbCrCbCr), and 4:4:4 represents full pixel display (YYYYCbCrCbCrCbCrCbCr).

For example, the video encoder 200 reads video data, and for each picture in the video data, partitions the picture into several coding tree units (CTU). In some examples, the CTU may be called "tree block", "largest coding unit" (LCU), or "coding tree block" (CTB). Each CTU may be associated with a pixel block of the same size as the CTU within the picture. Each pixel may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further partitioned into several coding units (CUs) for coding. The CU may be a rectangular block or a square block. The CU may be further partitioned into a prediction unit (PU) and a transform unit (TU), so that coding, prediction, and transformation are separated, which is more conducive to flexibility in processing. In an example, the CTU is partitioned into CUs in a quadtree manner, and the CU is partitioned into TUs and PUs in a quadtree manner.

The video encoder and video decoder can support various PU sizes. Assuming that a size of a specific CU is 2N×2N, the video encoder and video decoder may support PUs of 2N×2N or N×N for intra prediction, and support symmetric PUs of 2N×2N, 2N×N, N×2N, N×N, or similar size for inter prediction; and the video encoder and video decoder may also support asymmetric PUs of 2N×nU, 2N×nD, nL×2N, or nR×2N for inter prediction.

In some embodiments, as illustrated in FIG. 2, the video encoder 200 may include a prediction unit 210, a residual unit 220, a transform/quantization unit 230, an inverse transform/quantization unit 240, a reconstruction unit 250, an in-loop filtering unit 260, a decoded picture buffer 270, and an entropy coding unit 280. It should be noted that the video encoder 200 may include more, fewer, or different functional components.

Optionally, in the disclosure, a current block may be referred to as a current CU or a current PU. A prediction block may be referred to as a prediction picture block or a picture prediction block. A reconstructed picture block may be referred to as a reconstructed block or a picture reconstructed block.

In some embodiments, the prediction unit 210 includes an inter prediction unit 211 and an intra estimation unit 212. Since there is a strong correlation between neighbouring samples in a video picture, intra prediction is used in the video coding technology to eliminate spatial redundancy between neighbouring samples. Since there is a strong similarity between neighbouring pictures in video, inter prediction is used in the video coding technology to eliminate temporal redundancy between neighbouring pictures, thereby improving encoding efficiency.

The inter prediction unit 211 may be used for inter prediction. The inter prediction may include motion estimation and motion compensation. In inter prediction, reference can be made to picture information of different pictures. In inter prediction, motion information is used to find a reference block from a reference picture, and a prediction block is generated according to the reference block to eliminate temporal redundancy. A frame for which inter prediction is used may be a P frame and/or a B frame, where P frame refers to a forward prediction frame, and B frame refers to bidirectional prediction frame. In inter prediction, the motion information is used to find a reference block from a reference picture, and a prediction block is generated according to the reference block. The motion information includes a reference picture list containing the reference picture, a reference picture index, and a motion vector. The motion vector can be an integer-sample motion vector or a fractional-sample motion vector. If the motion vector is the fractional-sample motion vector, interpolation filtering on the reference picture is required to generate a required fractional-sample block. Here, an integer-sample block or fractional-sample block found in the reference picture according to the motion vector is called a reference block. In some technologies, the reference block may be called a prediction block, and in some technologies, the prediction block will be generated based on the reference block. Generating the prediction block based on the reference block may also be understood as taking the reference block as a prediction block and then processing to generate a new prediction block based on the prediction block.

The intra estimation unit 212 predicts sample information of the current picture block only with reference to information of the same picture, so as to eliminate spatial redundancy. A frame used for intra prediction may be an I frame.

There are multiple prediction modes for intra prediction. Taking the international digital video coding standard H series as an example, there are 8 angular prediction modes and 1 non-angular prediction mode in H.264/AVC standard, which are extended to 33 angular prediction modes and 2 non-angular prediction modes in H.265/HEVC. The intra prediction mode used in HEVC includes a planar mode, direct current (DC), and 33 angular modes, and there are 35 prediction modes in total. The intra prediction mode used in VVC includes planar, DC, and 65 angular modes, and there are 67 prediction modes in total.

It should be noted that with increase of the number of angular modes, intra prediction will be more accurate, which will be more in line with demand for development of high-definition and ultra-high-definition digital video.

The residual unit 220 may generate a residual block of the CU based on a sample block of the CU and a prediction block of a PU of the CU. For example, the residual unit 220 may generate the residual block of the CU such that each sample in the residual block has a value equal to a difference between a sample in the sample block of the CU and a corresponding sample in the prediction block of the PU of the CU.

The transform/quantization unit 230 may quantize a transform coefficient. The transform/quantization unit 230 may quantize a transform coefficient associated with a TU of a CU based on a quantization parameter (QP) value associated with the CU. The video encoder 200 may adjust the degree of quantization applied to a transform coefficient associated with the CU by adjusting the QP value associated with the CU.

The inverse transform/quantization unit 240 may perform inverse quantization and inverse transform respectively on the quantized transform coefficient, to reconstruct a residual block from the quantized transform coefficient.

The reconstruction unit 250 may add samples in the reconstructed residual block to corresponding samples in one or more prediction blocks generated by the prediction unit 210, to generate a reconstructed picture block associated with the TU. By reconstructing sample blocks of each TU of the CU in this way, the video encoder 200 can reconstruct the sample block of the CU.

The in-loop filtering unit 260 is configured to process an inverse-transformed and inverse-quantized sample, compensate distorted information, and provide a better reference for subsequent sample encoding. For example, the in-loop filtering unit 260 may perform deblocking filtering operations to reduce blocking artifacts of the sample block associated with the CU.

In some embodiments, the in-loop filtering unit 260 includes a deblocking filtering unit and a sample adaptive offset/adaptive loop filtering (SAO/ALF) unit, where the deblocking filtering unit is configured for deblocking, and the SAO/ALF unit is configured to remove a ringing effect.

The decoded picture buffer 270 may store reconstructed sample blocks. The inter prediction unit 211 may use reference pictures including reconstructed sample blocks to perform inter prediction on PUs of other pictures. In addition, the intra estimation unit 212 may use the reconstructed sample blocks in the decoded picture buffer 270 to perform intra prediction on other PUs in the same picture as the CU.

The entropy coding unit 280 may receive the quantized transform coefficient from the transform/quantization unit 230. The entropy coding unit 280 may perform one or more entropy coding operations on the quantized transform coefficient to generate entropy coded data.

Figure 3:
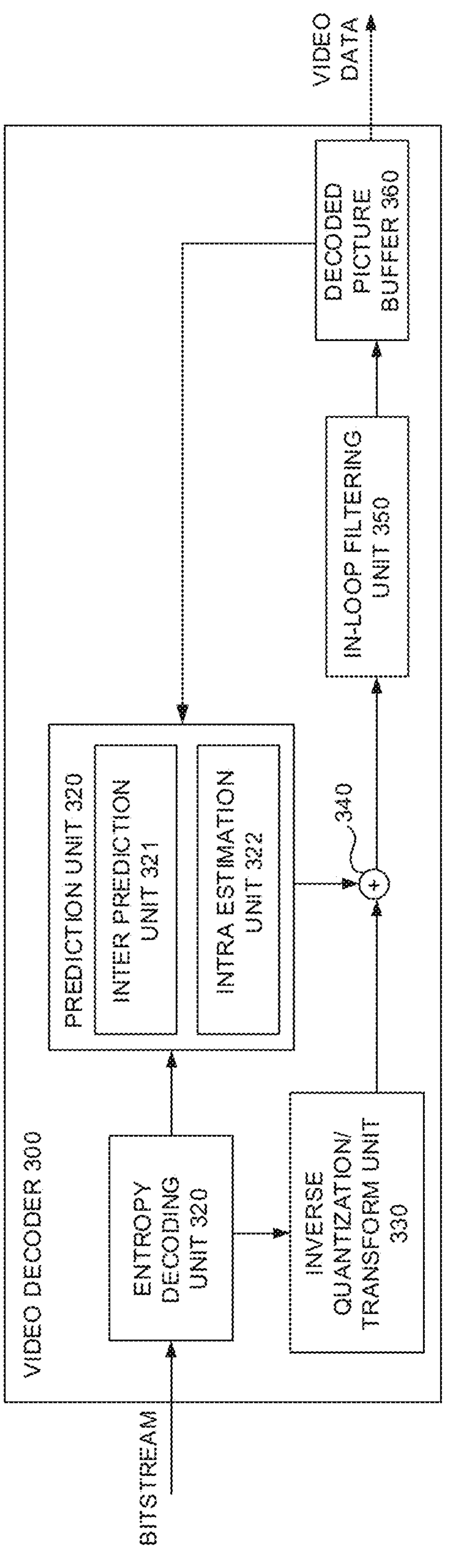
FIG. 3 is a schematic block diagram of a video decoder according to embodiments of the disclosure.

FIG. 3 is a schematic block diagram of a video decoder according to embodiments of the disclosure.

As illustrated in FIG. 3, the video decoder 300 includes an entropy decoding unit 310, a prediction unit 320, an inverse quantization/transform unit 330, a reconstruction unit 340, an in-loop filtering unit 350, and a decoded picture buffer 360. It should be noted that the video decoder 300 may include more, fewer, or different functional components.

The video decoder 300 may receive a bitstream. The entropy decoding unit 310 may parse the bitstream to extract syntax elements from the bitstream. As part of parsing the bitstream, the entropy decoding unit 310 may parse entropy-coded syntax elements in the bitstream. The prediction unit 320, the inverse quantization/transform unit 330, the reconstruction unit 340, and the in-loop filtering unit 350 may decode video data according to the syntax elements extracted from the bitstream, that is, generate decoded video data.

In some embodiments, the prediction unit 320 includes an inter prediction unit 321 and an intra estimation unit 322.

The intra estimation unit 322 may perform intra prediction to generate a prediction block of a PU. The intra estimation unit 322 may use an intra-prediction mode to generate a prediction block of the PU based on a sample block of spatially neighbouring PUs. The intra estimation unit 322 may also determine an intra prediction mode of the PU from one or more syntax elements parsed from the bitstream.

The inter prediction unit 321 can construct a first reference picture list (list 0) and a second reference picture list (list 1) according to the syntax elements parsed from the bitstream. In addition, the entropy decoding unit 310 may parse motion information of the PU if the PU is encoded using inter prediction. The inter prediction unit 321 may determine one or more reference blocks of the PU according to the motion information of the PU. The inter prediction unit 321 may generate a prediction block of the PU based on one or more reference blocks of the PU.

The inverse quantization/transform unit 330 may perform inverse quantization on (that is, dequantize) a transform coefficient associated with a TU. The inverse quantization/transform unit 330 may use a QP value associated with a CU of the TU to determine the degree of quantization.

After inverse quantization of the transform coefficient, the inverse quantization/transform unit 330 may perform one or more inverse transformations on the inverse-quantized transform coefficient in order to generate a residual block associated with the TU.

The reconstruction unit 340 uses the residual block associated with the TU of the CU and the prediction block of the PU of the CU to reconstruct a sample block of the CU. For example, the reconstruction unit 340 may add samples in the residual block to corresponding samples in the prediction block to reconstruct the sample block of the CU to obtain the reconstructed picture block.

The in-loop filtering unit 350 may perform deblocking filtering to reduce blocking artifacts of the sample block associated with the CU.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for display.

A basic process of video coding is as follows. At an encoding end, a picture is partitioned into blocks, and for a current block, the prediction unit 210 performs intra prediction or inter prediction to generate a prediction block of the current block. The residual unit 220 may calculate a residual block based on the prediction block and an original block of the current block, that is, a difference between the prediction block and the original block of the current block, where the residual block may also be referred to as residual information. The residual block can be transformed and quantized by the transform/quantization unit 230 to remove information that is not sensitive to human eyes, so as to eliminate visual redundancy. Optionally, the residual block before being transformed and quantized by the transform/quantization unit 230 may be called a time-domain residual block, and the time-domain residual block after being transformed and quantized by the transform/quantization unit 230 may be called a frequency residual block or a frequency-domain residual block. The entropy coding unit 280 receives the quantized transformation coefficient output by the transform/quantization unit 230, and may perform entropy coding on the quantized transformation coefficient to output a bitstream. For example, the entropy coding unit 280 can eliminate character redundancy according to a target context model and probability information of a binary bitstream.

At a decoding end, the entropy decoding unit 310 may parse the bitstream to obtain prediction information, a quantization coefficient matrix, etc. of the current block, and the prediction unit 320 performs intra prediction or inter prediction on the current block based on the prediction information to generate a prediction block of the current block. The inverse quantization/transform unit 330 uses the quantization coefficient matrix obtained from the bitstream to perform inverse quantization and inverse transformation on the quantization coefficient matrix to obtain a residual block. The reconstruction unit 340 adds the prediction block and the residual block to obtain a reconstructed block. The reconstructed blocks form a reconstructed picture. The in-loop filtering unit 350 performs in-loop filtering on the reconstructed picture on a picture basis or on a block basis to obtain a decoded picture. Similar operations are also required at the encoding end for obtaining the decoded picture. The decoded picture may also be referred to as a reconstructed picture, and the reconstructed picture may be a reference picture of a subsequent picture for inter prediction.

It should be noted that block partition information as well as mode information or parameter information for prediction, transformation, quantization, entropy coding, and in-loop filtering, etc. determined at the encoding end is carried in the bitstream when necessary. At the decoding end, the bitstream parsed and existing information is analyzed to determine the block partition information as well as the mode information or the parameter information for prediction, transformation, quantization, entropy coding, in-loop filtering, etc. that is the same as such information at the encoding end, so as to ensure the decoded picture obtained at the encoding end is the same as the decoded picture obtained at the decoding end.

The above is the basic process of video coding under a block-based hybrid coding framework. With development of technology, some modules or steps of the framework or process may be optimized. The disclosure is applicable to the basic process of the video coder under the block-based hybrid coding framework, but is not limited to the framework and process.

In some embodiments, the current block may be a current CU or a current PU, etc. Due to requirements of parallel processing, a picture may be partitioned into slices, etc. Slices in the same picture may be processed in parallel, that is, there is no data dependency between the slices. The term "frame" is a common expression. It can be generally understood that a frame is a picture. In the disclosure, the frame may also be replaced with a picture or a slice, etc.

In the video coding standard VVC currently under development, there is an inter prediction mode called geometric partitioning mode (GPM). In the video coding standard AVS currently under development, there is an inter prediction mode called angular weighted prediction (AWP) mode. Although these two modes have different names and implementation details, they share common principles.

It should be noted that in traditional unidirectional prediction, only one reference block with the same size as the current block is searched for, while in traditional bidirectional prediction, two reference blocks with the same size as the current block are used, where a sample value of each sample in a prediction block is an average of samples at corresponding positions in the two reference blocks, that is, all samples in each reference block account for 50%. Bidirectional weighted prediction allows proportions of the two reference blocks to be different, such as 75% for all samples in a $1^{st}$ reference block and 25% for all samples in a $2^{nd}$ reference block, but proportions of all samples in the same reference block are the same. Other optimization methods, such as decoder-side motion vector refinement (DMVR) technology, bi-directional optical flow (BIO), etc., may cause some changes in reference samples or prediction samples. In addition, in GPM or AWP, two reference blocks with the same size as the current block are also used. However, in some sample positions, 100% of sample values at corresponding positions in the $1^{st}$ reference block are used; in some sample positions, 100% of sample values at corresponding positions in the $2^{nd}$ reference block are used; and in a boundary area, sample values at corresponding positions in these two reference blocks are used according to a certain proportion (weight). The allocation of these weights is determined according to the prediction mode of GPM or AWP. Alternatively, it may be considered that in GPM or AWP, two reference blocks with different sizes from the current block are used, that is, a required part of each reference block is taken as a reference block, in other words, a part with non-zero weights is taken as the reference block, and a part with zero weights is removed.

Figure 4:
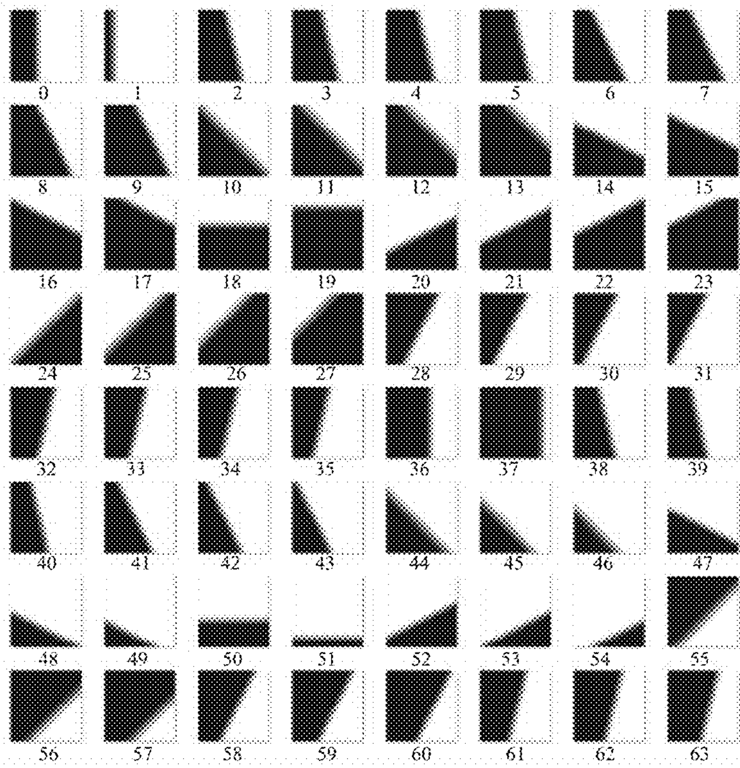
FIG. 4 is a schematic diagram illustrating weight allocation.
Figure 5:
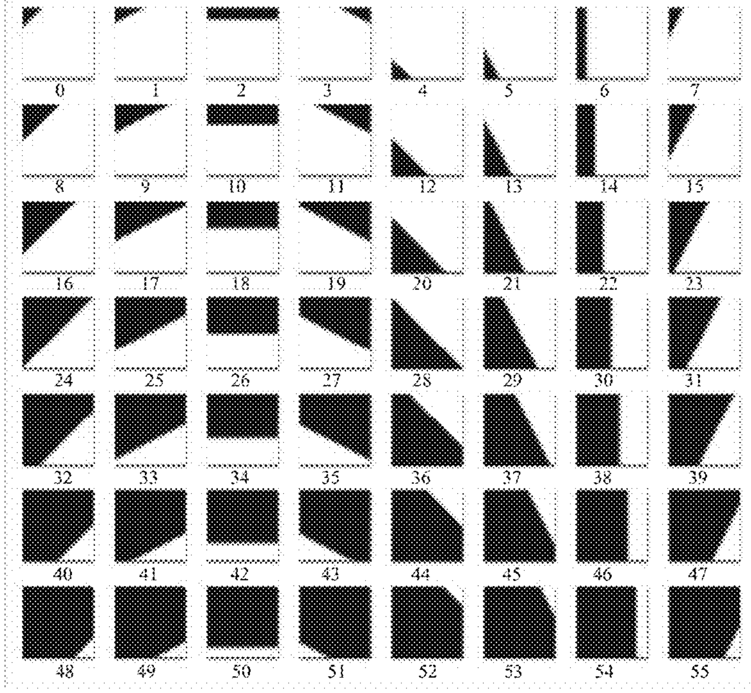
FIG. 5 is a schematic diagram illustrating weight allocation.

Exemplarily, FIG. 4 is a schematic diagram illustrating weight allocation. FIG. 4 is a schematic diagram illustrating weight allocation for multiple partitioning modes of GPM on a 64×64 current block provided in embodiments of the disclosure, where GPM has 64 partition modes. FIG. 5 is a schematic diagram illustrating weight allocation. FIG. 5 illustrates a schematic diagram of weight allocation for multiple partitioning modes of AWP on a 64×64 current block provided in embodiments of the disclosure, where AWP has 56 partitioning modes. In each of FIG. 4 and FIG. 5, for each partitioning mode, a black area represents a weight of 0% for corresponding positions in the $1^{st}$ reference block, while a white area represents a weight of 100% for corresponding positions in the $1^{st}$ reference block, a grey area represents a weight greater than 0% and less than 100%, represented by a colour depth, for corresponding positions in the $1^{st}$ reference block, and a weight for a corresponding position in the $2^{nd}$ reference block is 100% minus a weight for a corresponding position in the $1^{st}$ reference block.

GPM and AWP differ in method for weight derivation. For GPM, an angle and an offset are determined according to each mode, and then a weight matrix for each mode is calculated. For AWP, a one-dimensional weight line is firstly defined, and then a method similar to intra angular prediction is used to fill an entire matrix with the one-dimensional weight line.

It should be noted that in earlier coding technologies, only rectangular partitioning was available, no matter whether it is for CU partitioning, PU partitioning, or TU partitioning. However, with GPM or AWP, the effect of non-rectangular partitioning for prediction is achieved without partitioning. In GPM and AWP, a weight mask is used for two reference blocks, namely the weight map as described above. From the mask, weights of the two reference blocks for generating the prediction block are determined. It may be simply understood as that some positions in the prediction block come from the $1^{st}$ reference block and some positions come from the $2^{nd}$ reference block, and a blending area is obtained by weighting corresponding positions in the two reference blocks, which allows a smoother transition. In GPM and AWP, the current block are not partitioned into two CUs or PUs according to a partition line. Therefore, after prediction, the current block is processed as a whole during transformation, quantization, inverse transformation, and inverse quantization of residuals.

In GPM, a weight matrix is used to simulate geometric shape partitioning, or more precisely, simulate partitioning of prediction. To implement GPM, in addition to the weight matrix, two prediction values are also needed, each determined by one unidirectional motion information. These two unidirectional motion information come from a motion information candidate list, such as a merge motion information candidate list (mergeCandList). In GPM, two indices are used in a bitstream to determine the two unidirectional motion information from mergeCandList.

In inter prediction, motion information is used to represent "motion". Basic motion information includes reference frame (or called reference picture) information and motion vector (MV) information. In common bidirectional prediction, a current block is predicted by using two reference blocks. The two reference blocks may be a forward reference block and a backward reference block. Optionally, the two reference blocks are allowed to be both forward or both backward. Forward means that a moment corresponding to the reference picture is before a current picture, and backward means that the moment corresponding to the reference picture is after the current picture. In other words, forward means that a position of the reference picture in a video is before the current picture, and backward means that the position of the reference picture in the video is after the current picture. In other words, forward means that a picture order count (POC) of the reference picture is less than a POC of the current picture, and backward means that the POC of the reference picture is greater than the POC of the current picture. In order to use bidirectional prediction, it is necessary to find two reference blocks, and accordingly, two groups of reference picture information and motion vector information are needed. Each of the two groups may be understood as one unidirectional motion information, and one bidirectional motion information may be obtained by combining the two groups. During implementation, the unidirectional motion information and the bidirectional motion information may use the same data structure, but the two groups of reference picture information and motion vector information in the bidirectional motion information are both valid, while one of the two groups of reference picture information and motion vector information in the unidirectional motion information is invalid.

In some embodiments, two reference picture lists are supported, and are denoted as RPL0, RPL1, where RPL is an abbreviation for reference picture list. In some embodiments, P slice can only use RPL0, and B slice can use RPL0 and RPL1. For a slice, each reference picture list has several reference pictures, and a coder finds a certain reference picture according to a reference picture index. In some embodiments, the motion information is represented by a reference picture index and a motion vector. For example, for the bidirectional motion information described above, a reference picture index refIdxL0 corresponding to RPL0, a motion vector mvL0 corresponding to RPL0, a reference picture index refIdxL1 corresponding to RPL1, and a motion vector mvL1 corresponding to RPL1 are used. Here, the reference picture index corresponding to RPL0 and the reference picture index corresponding to RPL1 may be understood as the reference picture information described above. In some embodiments, two flag bits are used to indicate whether to use motion information corresponding to RPL0 and whether to use motion information corresponding to RPL1 respectively, and are denoted as predFlagL0 and predFlagL1 respectively, which may also mean that predFlagL0 and predFlagL1 indicate whether the unidirectional motion information is "valid". Although such data structure of the motion information is not explicitly indicated, the motion information is indicated by using a reference picture index, a motion vector, and a flag bit indicating validity corresponding to each RPL. In some standard texts, the term "motion vector" is used rather than "motion information", and it may also be considered that the reference picture index and the flag indicating whether to use corresponding motion information are associated with the motion vector. In the disclosure, "motion information" is still used for the convenience of illustration, but it should be understood that "motion vector" may also be used for illustration.

Motion information used for the current block may be stored, and motion information of previously coded blocks such as neighbouring blocks may be used for subsequent coding blocks of the current picture based on a positional relationship. This utilizes spatial correlation, so this kind of coded motion information is called spatial motion information. Motion information used for each block of the current picture may be stored, and motion information of previously coded picture may be used for subsequent coding pictures based on a reference relationship. This utilizes temporal correlation, so this kind of motion information of coded picture is called temporal motion information. The motion information used for each block in the current picture is usually stored in the following manner: a fixed-size matrix such as a 4×4 matrix is usually taken as a minimum unit, and each minimum unit stores a set of motion information separately. In this way, when coding each block, a minimum unit(s) corresponding to a position of the block may store motion information of the block. As such, when spatial motion information or temporal motion information is used, motion information corresponding to a position may be directly found according to the position. For example, if traditional unidirectional prediction is used for a 16×16 block, all 4×4 minimum units corresponding to the block will store motion information of this unidirectional prediction. If GPM or AWP is used for a block, all minimum units corresponding to the block will store motion information determined according to the mode of GPM or AWP, 1st motion information, $2^{nd}$ motion information, and a position of each minimum unit. In one manner, if all 4×4 samples corresponding to a minimum unit come from the $1^{st}$ motion information, the minimum unit stores the $1^{st}$ motion information. If all 4×4 samples corresponding to a minimum unit come from the $2^{nd}$ motion information, the minimum unit stores the $2^{nd}$ motion information. If all 4×4 samples corresponding to a minimum unit come from both the $1^{st}$ motion information and the $2^{nd}$ motion information, in AWP, one of the 1st motion information and the $2^{nd}$ motion information will be chosen and stored; and in GPM, two motion information will be combined as bidirectional motion information for storage if the two motion information correspond to to different RPLs, and otherwise, only the $2^{nd}$ motion information will be stored.

Figure 6A:
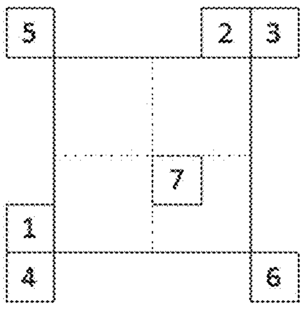
FIG. 6A is a schematic diagram illustrating inter prediction.

Optionally, the aforementioned mergeCandList is constructed based on spatial motion information, temporal motion information, history-based motion information, and some other motion information. Exemplarily, for the mergeCandList, positions 1 to 5 in FIG. 6A are used to derive the spatial motion information, and position 6 or 7 in FIG. 6A is used to derive the temporal motion information. For the history-based motion information, motion information of each block is added to a first-in-first-out list when coding the block, and the addition process may require some checks, such as whether the motion information duplicates existing motion information in the list. In this way, reference may be made the motion information in the history-based list when coding the current block.

In some embodiments, the syntax description for GPM is that as illustrated in Table 1.

TABLE 1

```
regular_merge_flag[x0][y0]                              ae(v)
if( regular_merge_flag[x0][y0] == 1 ) {
  if( sps_mmvd_enabled_flag )
    mmvd_merge_flag[x0][y0]                              ae(v)
  if( mmvd_merge_flag[x0][y0] == 1 ) {
    if( MaxNumMergeCand > 1 )
      mmvd_cand_flag[x0][y0]                             ae(v)
    mmvd_distance_idx[x0][y0]                            ae(v)
    mmvd_direction_idx[x0][y0]                           ae(v)
  } else if( MaxNumMergeCand > 1 )
      merge_idx[x0][y0]                                  ae(v)
} else {
  if( sps_ciip_enabled_flag &&
sps_gpm_enabled_flag &&
      sh_slice_type == B &&
    cu_skip_flag[x0][y0] == 0 &&
cbWidth >= 8 && cbHeight >= 8 &&
    cbWidth < (8*cbHeight) &&
cbHeight < (8*cbWidth) &&
  cbWidth < 128 && cbHeight < 128 )
      ciip_flag[x0][y0]                                  ae(v)
    if( ciip_flag[x0][y0] &&
MaxNumMergeCand > 1 )
      merge_idx[x0][y0]                                  ae(v)
    if( !ciip_flag[x0][y0] ) {
  merge_gpm_partition_idx[x0][y0]                        ae(v)
      merge_gpm_idx0[x0][y0]                             ae(v)
  if( MaxNumGpmMergeCand > 2 )
      merge_gpm_idx1[x0][y0]                             ae(v)
    }
  }
```

As illustrated in Table 1, in a merge mode, if regular_merge_flag is not equal to 1, either combined inter-intra prediction (CIIP) or GPM may be used for the current block. If CIIP is not used for the current block, then GPM will be used, as indicated by the syntax "if(!ciip_flag[x0][y0])" in Table 1.

As illustrated in the above Table 1, in GPM, transmission of three information in a bitstream, namely merge_gpm_partition_idx, merge_gpm_idx0, and merge_gpm_idx1, is required, where x0 and y0 are used to determine coordinates (x0, y0) of a top-left luma sample of the current block relative to a top-left luma sample of the picture. merge_gpm_ partition_idx is used to determine a partitioning shape of GPM, which is a "simulated partitioning" as described above. merge_gpm_partition_idx represents a weight derivation mode or an index of the weight derivation mode in embodiments of the disclosure. merge_gpm_idx0 represents an index of the 1$^{st}$ motion information in the candidate list, and merge_gpm_idx1 represents an index of the 2$^{nd}$ motion information in the candidate list. merge_gpm_idx1 needs to be transmitted only when a length of the candidate list (MaxNumGpmMergeCand) is greater than 2; otherwise, merge_gpm_idx1 may be determined directly.

In some embodiments, a decoding process of GPM includes the following steps.

Information input for the decoding process includes: coordinates (xCb, yCb) of a top-left luma location of the current block relative to a top-left luma location of the picture, a width (cbWidth) of a current luma component, a height (cbHeight) of a current luma component, luma motion vectors mvA and mvB in 1/16 fractional-sample accuracy, chroma motion vectors mvCA and mvCB, reference picture indices refIdxA and refIdxB, and prediction list flags predListFlagA and predListFlagB.

Exemplarily, the motion information may be represented by a combination of motion vectors, reference picture indices, and prediction list flags. In some embodiments, two reference picture lists are supported, each of which may have multiple reference pictures. In unidirectional prediction, only one reference block in one reference picture in one reference picture list is used for reference, while in bidirectional prediction, two reference blocks each in one reference picture in one of the two reference picture lists are used for reference. In GPM, two unidirectional predictions are used. In mvA and mvB, mvCA and mvCB, refIdxA and refIdxB, predListFlagA and predListFlagB, "A" may be understood as a first prediction mode, and "B" may be understood as a second prediction mode. Optionally, "X" is used to represent "A" or "B", so that predListFlagX indicates whether a 1$^{st}$ reference picture list or a 2$^{nd}$ reference picture list is used for X, refIdxX indicates a reference picture index in the reference picture list used for X, mvX indicates a luma motion vector used for X, and mvCX indicates a chroma motion vector used for X. It should be noted that, the motion information described in the disclosure may be considered as represented by a combination of motion vectors, reference picture indices, and prediction list flags.

Information output for the decoding process includes: an (cbWidth)×(cbHeight) array predSamplesL of luma prediction samples; an (cbWidth/SubWidthC)×(cbHeight/SubHeightC) array of chroma prediction samples for the component Cb, if necessary; and an (cbWidth/SubWidthC)×(cbHeight/SubHeightC) array of chroma prediction samples for the component Cr, if necessary.

Exemplarily, the luma component is taken as an example. The processing of the chroma component is similar to that of the luma component.

Let each of predSamplesLAL and predSamplesLBL have a size of (cbWidth)×(cbHeight), which are prediction sample arrays obtained based on two prediction modes. predSamplesL is derived as follows. predSamplesLAL and predSamplesLBL are determined separately according to the luma motion vectors mvA and mvB, chroma motion vectors mvCA and mvCB, reference picture indices refIdxA and refIdxB, and prediction list flags predListFlagA and predListFlagB. In other words, prediction is performed according to motion information of the two prediction modes, and the detailed process thereof is not described herein. Generally, GPM is a merge mode, so that both the two prediction modes of GPM may be considered as merge modes.

According to merge_gpm_partition_idx[xCb][yCb], a "partition" angle index variable angleIdx and a distance index variable distanceIdx of GPM are determined based on Table 2.

TABLE 2

Correspondence among angleIdx, distanceIdx, and merge_gpm_partition_idx

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

TABLE 2-continued

| Correspondence among angleIdx, distanceIdx, and merge_gpm_partition_idx | | | | | | | | | | | | | | | | |
|---|---|---|---|---|---|---|---|---|---|---|---|---|---|---|---|---|
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

It should be noted that, GPM may be used for each of the three components components (Y, Cb, Cr). Therefore, the process of generating a GPM prediction sample array for a component is encapsulated in a sub-process called "weighted sample prediction process for GPM". This sub-process is invoked for all the three components, with different parameters for each component. Here, the luma component is taken as an example. A prediction array for a current luma block, predSamplesL[xL][yL] (where xL=0 . . . cbWidth−1, yL=0 . . . cbHeight−1), is derived from the weighted sample prediction process for GPM. nCbW is set to cbWidth, and nCbH is set to cbHeight. The prediction sample arrays predSamplesLAL and predSamplesLBL generated using the two prediction modes, as well as angleIdx and distanceIdx, are used as inputs.

In some embodiments, the weighted sample prediction and derivation process for GPM includes the following steps.

Inputs to this process are: a width nCbW of the current block, a height nCbH of the current block, two (nCbW)×(nCbH) prediction sample arrays predSamplesLA and predSamplesLB, a "partition" angle index variable angleIdx of GPM, a distance index variable distanceIdx of GPM, and a colour component index variable cIdx. Here, a luma component is taken as an example, so that cIdx=0, which indicates the luma component.

Output of this process is the (nCbW)×(nCbH) array pbSamples of prediction sample values of GPM.

Exemplarily, variables nW, nH, shift1, offset1, displacementX, displacementY, partFlip, and shiftHor are derived as follows:

```
   nW = ( cIdx = = 0 ) ? nCbW : nCbW * SubWidthC;
   nH = ( cIdx = = 0 ) ? nCbH : nCbH * SubHeightC;
   shift1 = Max( 5, 17 − BitDepth ), where BitDepth represents a coding bit
depth;
   offset1 = 1 << ( shift1 − 1 ), where "<<" represents shift left;
   displacementX = angleIdx;
   displacementY = ( angleIdx + 8 ) % 32;
   partFlip = ( angleIdx >= 13 && angleIdx <= 27 ) ? 0 : 1;
   shiftHor = ( angleIdx % 16 = = 8 | | ( angleIdx % 16 != 0 && nH >=
nW ) ) ? 0 : 1.
```

Variables offsetX and offsetY are derived as follows:

```
  If shiftHor = 0:
     offsetX = ( −nW ) >> 1
     offsetY = ( ( −nH ) >> 1 ) + ( angleIdx < 16 ? ( distanceIdx * nH ) >> 3 :
−( ( distanceIdx * nH ) >> 3 ) )
  If shiftHor = 1:
     offsetX = ( ( −nW ) >> 1 ) + ( angleIdx < 16 ? ( distanceIdx * nW ) >>
3 : −( ( distanceIdx * nW ) >> 3 ) )
     offsetY = ( − nH ) >> 1.
```

Variables xL and yL are derived as follows:

```
xL = ( cIdx = = 0 ) ? x : x * SubWidthC;
yL = ( cIdx = = 0 ) ? y : y * SubHeightC.
```

Variable wValue specifying a weight of a prediction sample at a current position is derived as follows:

wValue is a weight of a predicted sample predSamplesLA[x][y] at (x, y) in a prediction array for the first prediction mode, and (8−wValue) is a weight of a predicted sample predSamplesLB[x][y] at (x, y) in the prediction array for the first prediction mode.

The distance matrix disLut is determined according to Table 3.

TABLE 3

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

```
weightIdx = ( ( ( xL + offsetX ) << 1 ) + 1 ) * disLut[ displacementX ] +
( ( ( yL + offsetY ) << 1 ) + 1 ) * disLut[ displacementY ];
weightIdxL = partFlip ? 32 + weightIdx : 32 − weightIdx;
wValue = Clip3( 0, 8, ( weightIdxL + 4) >> 3 ).
```

The prediction sample values pbSamples[x][y] are derived as follows:

```
pbSamples[ x ][ y ] = Clip3( 0, ( 1 << BitDepth ) − 1,
( predSamplesLA[ x ][ y ] * wValue + predSamplesLB[ x ][ y ] * ( 8 − wValue ) +
offset1 ) >> shift1 ).
```

It should be noted that, for each position in the current block, a weight is derived and then a GPM prediction value pbSamples[x][y] is calculated. In this case, although the weights wValue do not have to be written in matrix form, it may be understood that if each wValue for each position is stored in a matrix, then a weight matrix is formed. The principle of calculating the GPM prediction value by separately calculating the weight for each sample and weighting, and the principle of calculating the GPM prediction sample array by calculating all the weights and then uniformly weighting, are the same. However, the expression of "weight matrix" in various elaborations in the disclosure is for the sake of better understanding, and drawings based on a weight matrix are more intuitive. In fact, elaborations can also be made based the weight of each position. For example, a weight matrix derivation mode may also be referred to as a weight derivation mode.

Figure 6B:
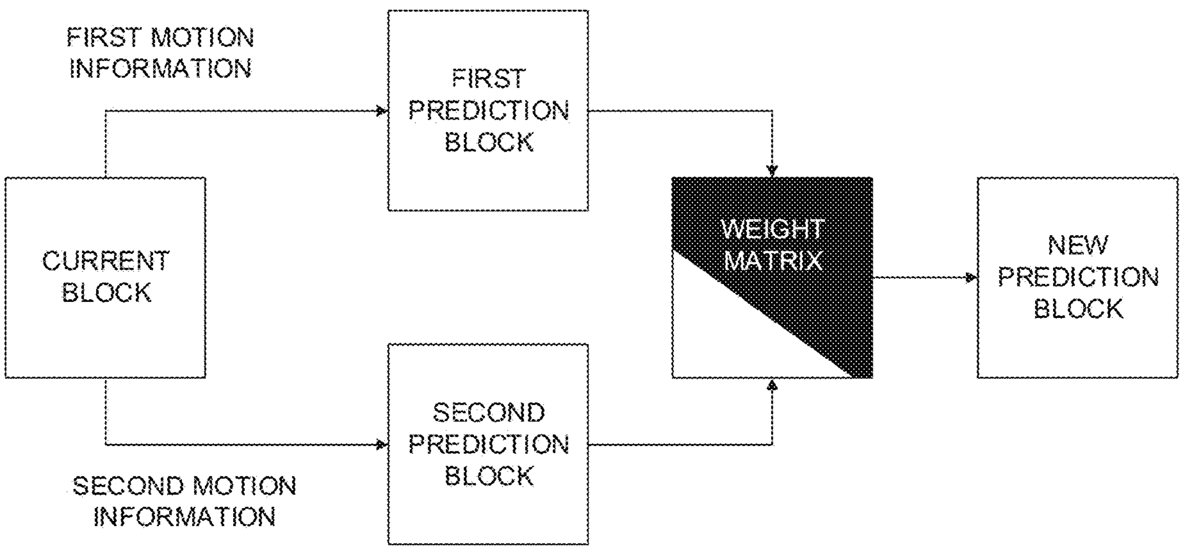
FIG. 6B is a schematic diagram illustrating weighted inter prediction.

In some embodiments, as illustrated in FIG. 6B, a GPM decoding process may be expressed as follows. A bitstream is parsed to determine whether a GPM technology is adopted for the current block. If the GPM technology is adopted for the current block, a weight derivation mode (or a "partitioning" mode or a weight matrix derivation mode), first motion information, and second motion information are determined. A first prediction block is determined according to the first motion information, a second prediction block is determined according to the second motion information, a weight matrix is determined according to the weight matrix derivation mode, and a prediction block of the current block is determined according to the first prediction block, the second prediction block, and the weight matrix.

It should be noted that in embodiments of the disclosure, GPM or AWP is a type of prediction technique. A flag indicating whether GPM or AWP is used needs to be transmitted in the bitstream, where the flag indicates whether GPM or AWP is used for the current block. If GPM or AWP is used, the encoder needs to transmit the specific mode used, that is, one of the 64 partitioning modes of GPM or one of the 56 partitioning modes of AWP, as well as index values of two unidirectional motion information, in the bitstream. That is, for the current block, the decoder may obtain information regarding whether GPM or AWP is used by parsing the bitstream. If it is determined that GPM or AWP is used, the decoder may parse to obtain prediction mode parameters of GPM or AWP and the index values of the two motion information. For example, if the current block is partitioned into two partitions, a first index value corresponding to a first partition and a second index value corresponding to a second partition may be obtained through parsing.

Specifically, for a GPM mode, if GPM is used, the prediction mode parameter of GPM will be transmitted in the bitstream, such as the specific partitioning mode of GPM. Generally, GPM includes 64 partitioning modes. For an AWP mode, if AWP is used, the prediction mode parameter of AWP will be transmitted in the bitstream, such as the specific partitioning mode of AWP. Generally, AWP includes 56 partitioning modes.

In an inter prediction mode such as GPM and AWP, two unidirectional motion information are required to search for two reference blocks. At present, this is implemented as follows. At an encoder side, a unidirectional motion information candidate list is constructed using relevant information of the coded part before the current block, unidirectional motion information is selected from the unidirectional motion information candidate list, and indices of these two unidirectional motion information in the unidirectional motion information candidate list are signalled into the bitstream. At a decoder side, the same method applies, that is, a unidirectional motion information candidate list is constructed using relevant information of the decoded part before the current block, and this unidirectional motion information candidate list must be identical to the one constructed at the encoder side. As such, the indices of the two unidirectional motion information are parsed out from the bitstream, and these two unidirectional motion information are found from the unidirectional motion information candidate list as the two unidirectional motion information required for the current block.

In other words, the unidirectional motion information described herein may include motion vector information, which is the value of (x, y), and corresponding reference picture information, which is a reference picture list and a reference picture index value in the reference picture list. In one manner, reference picture index values in two reference picture lists are recorded, where index values in one list are valid, such as 0, 1, 2, etc., and index values in the other list are invalid, i.e. −1. The reference picture list with valid reference picture index values is the reference picture list used for the motion information of the current block. A corresponding reference picture may be found in the reference picture list based on the reference picture index value. Each reference picture list has a corresponding motion vector, and a motion vector for a valid reference picture list is valid, while a motion vector for an invalid reference picture list is invalid. The decoder may use the reference picture information in the unidirectional motion information to find the required reference picture, and may find the reference block in the reference picture based on a position of the current block and the motion vector, that is, the value of (x, y), so as to determine an inter prediction value of the current block.

Figure 7A:
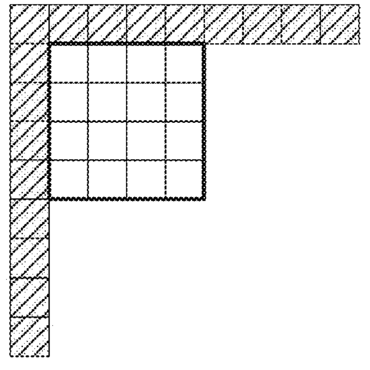
FIG. 7A is a schematic diagram illustrating intra prediction.

In intra prediction, reconstructed samples around the current block that have been coded are used as reference samples to predict the current block. FIG. 7A is a schematic diagram illustrating intra prediction. As illustrated in FIG. 7A, the current block is 4×4 in size, and samples on the left column and the above row of the current block are used as reference samples of the current block and are used for intra prediction of the current block. These reference samples may all be available, i. e. they have all been coded. Alternatively, some of the reference samples may not be available. For example, if the current block is on the leftmost of a picture, the reference samples on the left of the current block are not available. For another example, when coding the current block, the samples on the bottom left of the current block have not yet been coded, and in this case, reference samples on the bottom left are also not available. For the case where reference samples are not available, available reference samples, some values, or some methods may be used for filling, or no filling may be performed.

Figure 7B:
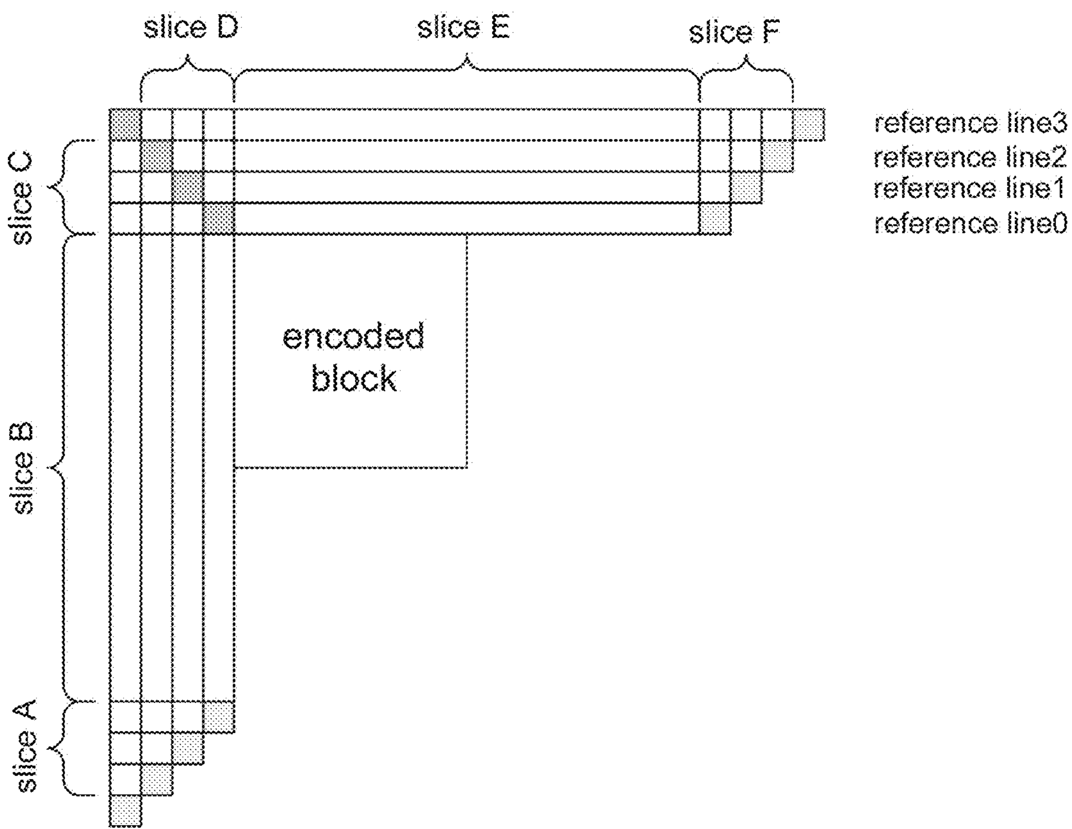
FIG. 7B is a schematic diagram illustrating intra prediction.

FIG. 7B is a schematic diagram illustrating intra prediction. As illustrated in FIG. 7B, with a multiple reference line (MRL) intra prediction method, more reference samples may be used to improve coding efficiency. For example, four reference rows/columns are used as the reference samples of the current block.

Further, there are multiple prediction modes for intra prediction. FIG. 8A~FIG. 5I each are a schematic diagram illustrating intra prediction. As illustrated in FIG. 8A~FIG. 5I, in H.264, there are nine modes for intra prediction of 4×4 blocks. In mode 0 illustrated in FIG. 8A, samples above the current block are copied to the current block vertically as prediction values. In mode 1 illustrated in FIG. 8B, reference samples on the left of the current block are copied to the current block horizontally as prediction values. In mode 2 (DC) illustrated in FIG. 8C, an average value of eight samples (A~D and I~L) is taken as the prediction value of all samples. In mode 3 to mode 8 illustrated in FIG. 8D~FIG. 5I, reference samples are copied to corresponding positions in the current block according to a certain angle, and since some positions in the current block may not correspond exactly to the reference sample, a weighted average of reference samples or interpolated factional samples of the reference samples may be required.

Figure 9:
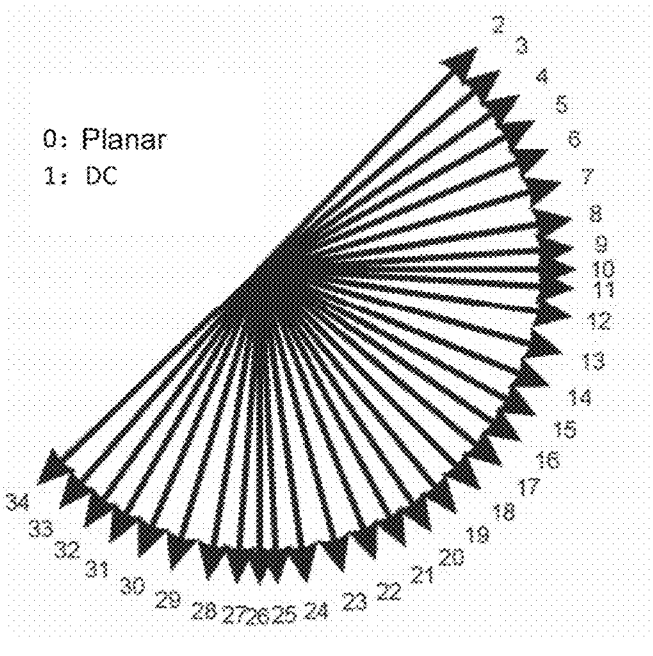
FIG. 9 is a schematic diagram illustrating intra prediction modes.
Figure 10:
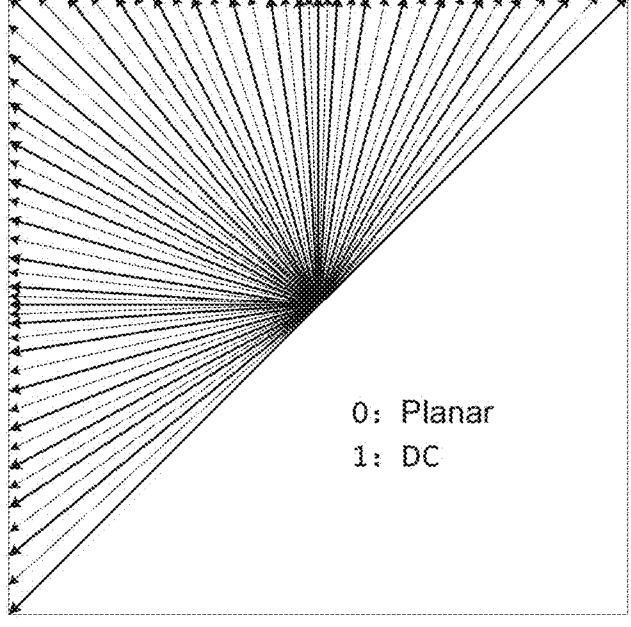
FIG. 10 is a schematic diagram illustrating intra prediction modes.
Figure 11:
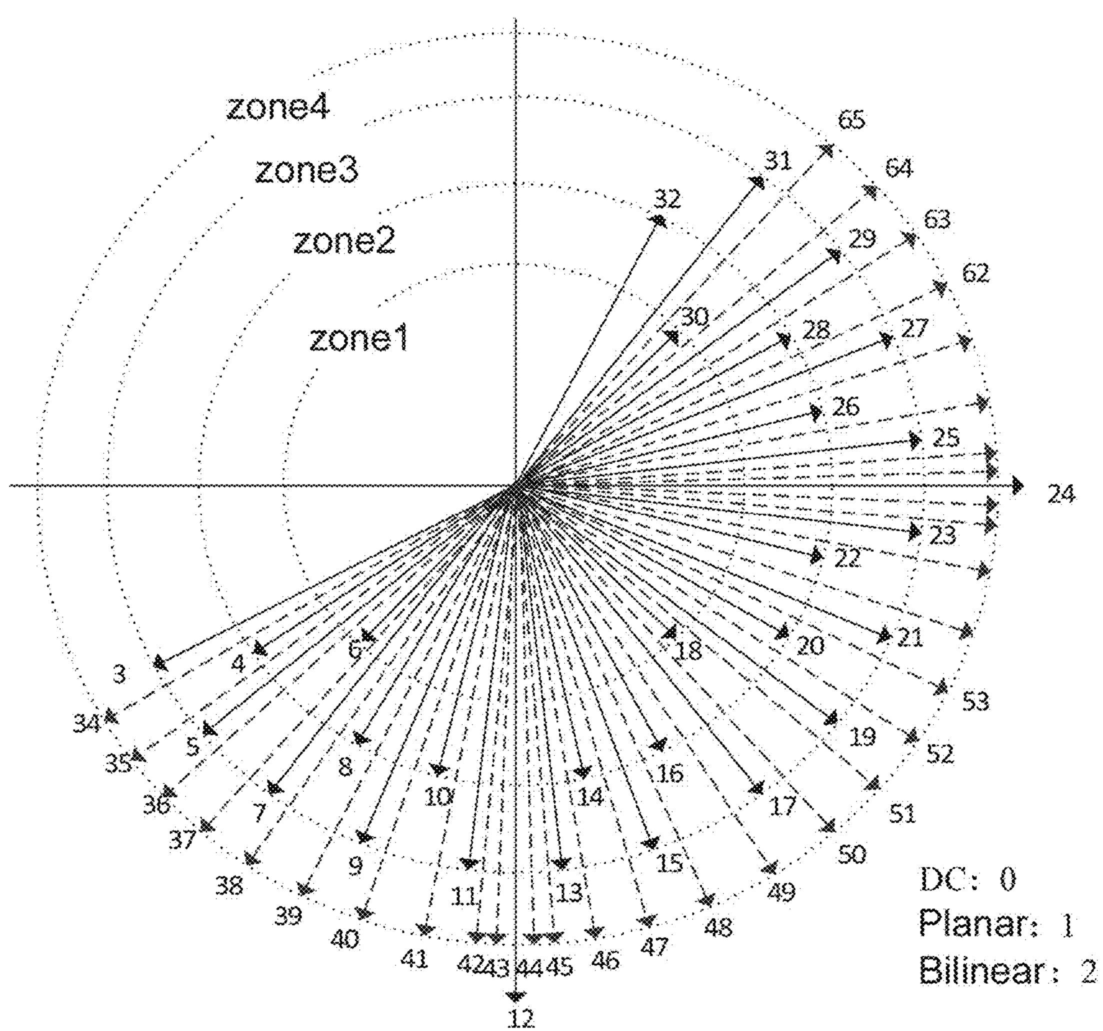
FIG. 11 is a schematic diagram illustrating intra prediction modes.

In addition, there are other modes such as the planar mode. With development of technology and increase in block size, there are an increasing number of angular prediction modes. FIG. 9 is a schematic diagram illustrating intra prediction modes. As illustrated in FIG. 9, in HEVC, a total of 35 prediction modes are used, including planar, DC, and 33 angular modes. FIG. 10 is a schematic diagram illustrating intra prediction modes. As illustrated in FIG. 10, in VVC, a total of 67 prediction modes are used, including planar, DC, and 65 angular modes. FIG. 11 is a schematic diagram illustrating intra prediction modes. As illustrated in FIG. 11, in AVS3, a total of 66 prediction modes are used, including DC, planar, bilinear, and 63 angular modes.

Furthermore, there are some techniques to improve the prediction, such as fractional sample interpolation which improves reference samples, filtering of prediction samples, etc. For example, in multiple intra prediction filter (MIPF) in AVS3, prediction values are generated by using different filters for different block sizes. For different positions of samples within the same block, a filter is used to generate prediction values for samples that are closer to the reference samples, while another filter is used to generate prediction values for samples that are away from the reference samples. With aid of technology for filtering prediction samples, such as intra prediction filter (IPF) in AVS3, the prediction values may be filtered based on the reference samples.

In intra prediction, an intra mode coding technology using a most probable mode (MPM) list may be used to improve coding efficiency. The mode list is constructed with intra prediction modes for surrounding coded blocks, intra prediction modes derived from the intra prediction modes for the surrounding coded blocks such as a neighbourhood mode, and some commonly-used or high-probability intra prediction modes such as DC, planar, and bilinear modes. Reference to the intra prediction modes for the surrounding coded blocks utilizes spatial correlation because textures have a certain spatial continuity. The MPM(s) may be used as a prediction for intra prediction modes. That is, it is assumed that the probability of using the MPM for the current block is higher than not using the MPM. Therefore, during binarization, fewer codewords will be assigned to the MPM to reduce overhead and improve coding efficiency.

In GPM, two inter-prediction blocks are combined by using a weight matrix. In practice, usage of the weight matrix can be extended to combining any two prediction blocks, such as two inter-prediction blocks, two intra-prediction blocks, and one inter-prediction block and one intra-prediction block. A prediction block(s) of intra block copy (IBC) or palette may also be used as one or two of the prediction blocks in screen content coding.

In the disclosure, intra, inter, IBC, and palette are referred to as different prediction manners. For ease of elaboration, they are referred to as prediction modes. The prediction mode means that a coder may generate information of a prediction block of the current block according to the prediction mode. For example, in intra prediction, the prediction mode may be a certain intra prediction mode, such as DC, planar, and various intra angular prediction modes. One or more auxiliary information may also be added, for example, an optimization method for intra reference samples, an optimization method (for example, filtering) after a preliminary prediction block is generated, and the like. For example, in inter prediction, the prediction mode may be a skip mode, a merge mode, a merge with motion vector difference (MMVD) mode, or a common inter mode (MVP+MVD). The inter prediction mode may be unidirectional prediction, bidirectional prediction, or multi-hypothesis prediction. If unidirectional prediction is used for the inter prediction mode, motion information that is one unidirectional motion information needs to be determined, and a prediction block can be determined according to the motion information. If bidirectional prediction is used for the inter prediction mode, one bidirectional motion information or two unidirectional motion information needs to be determined, and a prediction block can be determined according to the motion information. If multi-hypothesis prediction is used for the inter prediction mode, multiple unidirectional motion information needs to be determined, and a prediction block can be determined according to the motion information. The skip mode, the merge mode, the MMVD mode, and the common inter mode each can support unidirectional prediction, bidirectional prediction, or multi-hypothesis prediction. If the prediction mode is an inter prediction mode, motion information can be determined, and a prediction block can be determined according to the motion information. Template matching can be used on the basis of the skip mode, the merge mode, the MMVD mode, and the common inter mode, and such a prediction mode can still be referred to as the skip mode, the merge mode, the MMVD mode, and the common inter mode, or a template matching-based skip mode, a template matching-based merge mode, a template matching-based MMVD mode, and a template matching-based common inter mode.

In the skip mode or the merge mode, an MVD does not need to be transmitted in a bitstream, and in the skip mode, an MVD and a residual also do not need to be transmitted in the bitstream. The MMVD may be considered as a special merge mode, in which some specific MVDs are represented by some flag bits, and these specific MVDs each only have several possible preset values. An example is an MMVD mode in VVC, in which the direction of the MVD is represented by mmvd_direction_idx. The possible value of mmvd_direction_idx is 0, 1, 2, and 3, where 0 indicates that the horizontal component of the MMVD is a positive value and the vertical direction is 0, 1 indicates that the horizontal component of the MMVD is a negative value and the vertical direction is 0, 2 represents that the horizontal component of the MMVD is 0 and the vertical direction is a positive value, and 3 represents that the horizontal component of the MMVD is 0 and the vertical direction is a negative value. The absolute value of the above positive or negative value is represented by mmvd_distance_idx, and the possible value of mmvd_distance_idx is 0~7, which represent 1, 2, 4, 8, 16, 32, 64, and 128 respectively when ph_mmvd_fullpel_only_flag==0, and represent 4, 8, 16, 32, 64, 128, 256, and 512 respectively when ph_mmvd_fullpel_only_flag==1. The MVD of the common inter mode can represent theoretically any possible MVD in a valid range.

In this way, information that needs to be determined for GPM may be expressed as one weight derivation mode and two prediction modes. The weight derivation mode is used to determine a weight matrix or weights, and the two prediction modes are each used determine a prediction block or prediction value. The weight derivation mode is sometimes referred to as a partitioning mode, but since it is simulated partitioning, the disclosure tends to refer to the partitioning mode as a weight derivation mode.

Optionally, the two prediction modes may come from the same or different prediction modes, where the prediction mode includes but is not limited to intra prediction, inter prediction, IBC, and palette.

A specific example is as follows. GPM is adopted for the current block and this example is used for an inter-coded block, the intra prediction and the merge mode in the inter prediction are allowed to be used. As illustrated in Table 4, a syntax element intra_mode_idx is added, so as to indicate which prediction mode is an intra prediction mode. For example, if intra_mode_idx=0, it indicates that two prediction modes each are an inter prediction mode, that is, mode0IsInter=1 and mode1IsInter=1. If intra_mode_idx=1, it indicates that a first prediction mode is an intra prediction mode and a second prediction mode is an inter prediction mode, that is, mode0IsInter=0 and mode1IsInter=1. If intra_mode_idx=2, it indicates that the first prediction mode is an inter prediction mode and the second prediction mode is an intra prediction mode, that is, mode0IsInter=1 and mode1IsInter=0. If intra_mode_idx=3, it indicates that the two prediction modes each are an intra prediction mode, that is, mode0IsInter=0, and mode1IsInter=0.

TABLE 4

```
        {
    merge_gpm_partition_idx[x0][y0]                          ae(v)
  intra_mode_idx[x0][y0]                                     ae(v)
   if( mode0IsInter )
      merge_gpm_idx0[x0][y0]                                 ae(v)
        if( (!mode0IsInter &&
mode1IsInter) || (MaxNumGpmMergeCand > 2 && mode0IsInter &&
  mode1IsInter))
          merge_gpm_idx1[x0][y0]                             ae(v)
        }
```

Figure 12:
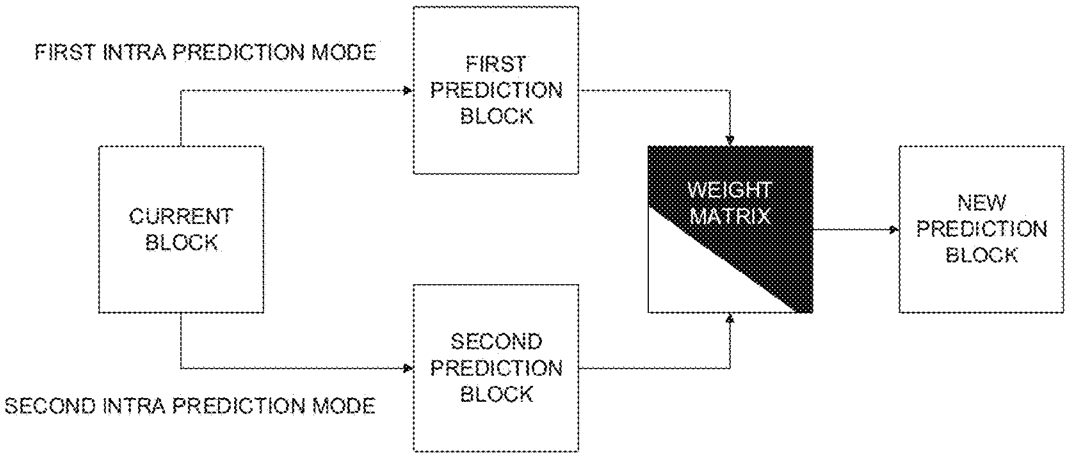
FIG. 12 is a schematic diagram illustrating weighted intra prediction.

In some embodiments, as illustrated in FIG. 12, a GPM decoding process may be expressed as follows. A bitstream is parsed to determine whether a GPM technology is adopted for the current block. If the GPM technology is adopted for the current block, a weight derivation mode (or a "partitioning" mode or a weight matrix derivation mode), a first intra prediction mode, and a second intra prediction mode are determined. A first prediction block is determined according to the first intra prediction mode, a second prediction block is determined according to the second intra prediction mode, a weight matrix is determined according to the weight matrix derivation mode, and a prediction block of the current block is determined according to the first prediction block, the second prediction block, and the weight matrix.

Template matching is originally used in inter prediction. In template matching, by utilizing correlation between neighbouring samples, some regions neighbouring the current block are taken as a template. Before coding the current block, blocks on the left and the top of the current block have already been coded according to a coding order. However, when implemented by an existing hardware decoder, it may not be ensured that blocks on the left and the top of the current block have already been decoded before decoding the current block, where the current block is an inter block. For example, in HEVC, when generating a prediction block for an inter-coding block, neighbouring reconstructed samples are not required, and therefore, a prediction process for the inter block may be performed in parallel. However, for an intra-coding block, reconstructed samples on the left and on the top are required as reference samples. Theoretically, samples on the left and on the top are available, that is, this can be realized by making corresponding adjustments on hardware design. Samples on the right and on the bottom are unavailable based on a coding order in an existing standard such as VVC.

Figure 13:
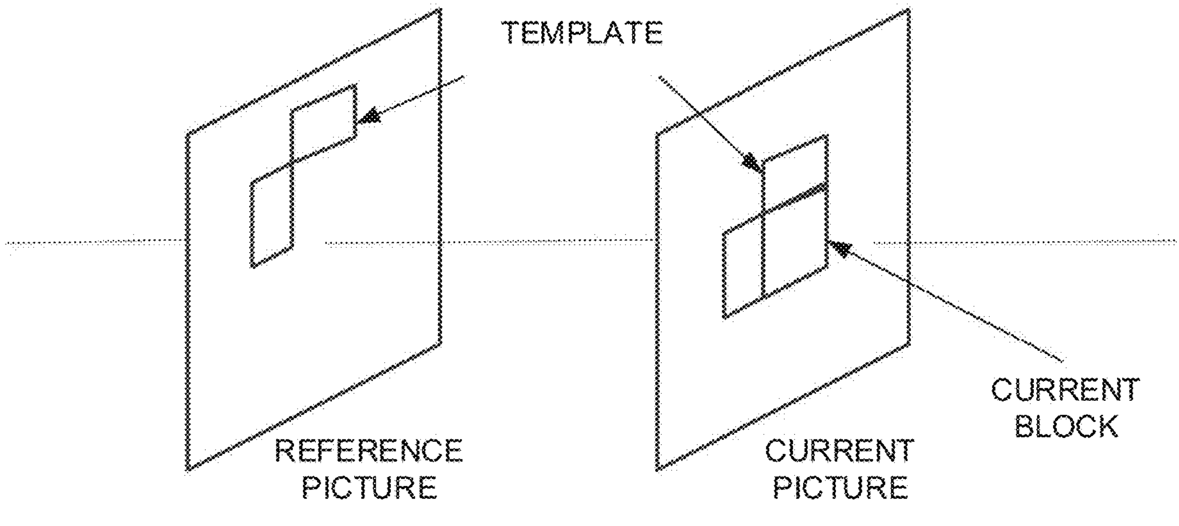
FIG. 13 is a schematic diagram illustrating template matching.

As illustrated in FIG. 13, rectangular regions on the left and the top of the current block are set as a template, where a height of the left template is usually the same as a height of the current block, and a width of the top part of the template is usually the same as a width of the current block. The template may also have a different height or width from the current block. A best matching position of the template is found in a reference picture, so as to determine motion information or a motion vector of the current block. This process may be generally described as follows. In a certain reference picture, search within a certain range starting from a start position. A search rule may be preset, such as a search range and a search step size. Upon moving to a position each time, a degree of matching between a template corresponding to the position and a template neighbouring the current block is calculated. The degree of matching may be measured according to some distortion costs, such as a sum of absolute difference (SAD) and a sum of absolute transformed difference (SATD). A transform used in the SATD is usually a Hadamard transform or a mean-square error (MSE). A lower value of the SAD, the SATD, or the MSE indicates a higher degree of matching. A cost is calculated based on a prediction block of the template corresponding to the position and a reconstructed block of the template neighbouring the current block. In addition to searching for a position of an integer sample, searching for a position of a fractional sample may also be performed. The motion information of the current block is determined according to a position with the highest degree of matching found through searching. Due to correlation between neighbouring samples, motion information suitable for the template may also be motion information suitable for the current block. Template matching may not be applicable to some blocks, and therefore, whether template matching is used for the current block may be determined according to some methods, for example, a control switch is used for the current block to indicate whether to use template matching. Such template matching is also called decoder side motion vector derivation (DMVD). Both an encoder and a decoder may perform searching based on a template to derive motion information or find better motion information based on original motion information. In order to ensure consistency between encoding and decoding, the encoder and the decoder perform searching based on the same rule instead of transmitting a specific motion vector or motion vector difference. With template matching, it is possible to improve compression performance, but the decoder still needs to perform searching, which causes increase in decoder complexity.

The above is a method for applying template matching to inter prediction. Template matching may also be applied to intra prediction, for example, a template is used to determine an intra prediction mode. For the current block, a region within a certain range from the top and the left of the current block may be used as a template, such as a left rectangular region and a top rectangular region illustrated in the foregoing figure. When coding the current block, reconstructed samples in the template are available. This process may be generally described as follows. A set of candidate intra prediction modes is determined for the current block, where the candidate intra prediction modes constitute a subset of all available intra prediction modes, or the candidate intra prediction modes may be a universal set of all available intra prediction modes, which may be determined based on the trade-off between performance and complexity. The set of candidate intra prediction modes may be determined according to an MPM or some rules, such as equidistant screening. A cost, such as the SAD, the SATD, and the MSE, of each candidate intra prediction mode for the template is calculated. Prediction is performed on the template according to the mode to obtain a prediction block, and the cost is calculated according to the prediction block and a reconstructed block of the template. A mode with lower cost may match the template better, and due to similarity between neighbouring samples, an intra prediction mode that matches well with the template may also be an intra prediction mode that matches well with the current block. One or more modes with low cost are selected. The foregoing two steps may be repeated. For example, after one or more modes with low cost are selected, a set of candidate intra prediction modes is determined, cost is calculated for the newly determined set of candidate intra prediction modes, and one or more modes with lower cost are selected. This may also be understood as a rough selection and a fine selection. The one intra prediction mode finally chosen is determined as the intra prediction mode for the current block, or several intra prediction modes finally chosen are taken as candidates of the intra prediction mode for the current block. The set of candidate intra prediction modes may also be sorted by means of template matching. For example, an MPM list is sorted, that is, for each mode in the MPM list, a prediction block is obtained for the template according to the mode and a cost thereof is determined, and these modes are sorted in an ascending order of cost. Generally, a mode at the front in the MPM list leads to lower overhead in a bitstream, which can also improve compression efficiency.

Template matching may be used to determine two prediction modes of GPM. If template matching is used for GPM, one control switch may be used for the current block to control whether template matching is used for the two prediction modes for the current block, or two control switches may be used respectively to control whether template matching is used for each of the two prediction modes.

Another aspect is how to use template matching. For example, if GPM is used in the merge mode, for example, in GPM in VVC, merge_gpm_idxX is used to determine motion information from mergeCandList, where X=0 or 1. For $X^{th}$ motion information, one method is to perform optimization by means of template matching based on the foregoing motion information. That is, the motion information is determined from mergeCandList according to merge_gpm_idxX. If template matching is used for the motion information, template matching is used to perform optimization based on the motion information. Another method is to determine the motion information directly by searching based on default motion information, instead of using merge_gpm_idxX to determine the motion information from mergeCandList.

If an $X^{th}$ prediction mode is an intra prediction mode and template matching is used for an $X^{th}$ prediction mode for the current block, template matching may be used to determine an intra prediction mode, and an index of the intra prediction mode does not need to be indicated in a bitstream. Alternatively, a candidate set or an MPM list is determined by means of template matching, and an index of the intra prediction mode needs to be indicated in a bitstream.

In GPM, after determining the weight derivation mode, a region occupied by each prediction mode may be determined. Here, the region occupied may be understood as a region in which a weight corresponding to the prediction mode is the maximum, or a region in which the weight corresponding to the prediction mode is greater than or equal to a threshold. The reason why compression performance can be improved with aid of GPM is that the two parts "partitioned" based on GPM are different, and therefore, when determining a prediction mode of GPM by means of template matching, the template may also be partitioned. In the related art, the template may be classified into three types, i. e. left, top, and both (left and top). Partitioning of the template depends on a weight derivation mode. Exemplarily, as illustrated in Table 5, in the related art, partitioning of the template depends on a "partition" angle or a "partition" angle index angleIdx.

TABLE 5

| "Partition" angle index | Template corresponding to first prediction mode | Template corresponding to second prediction mode |
|---|---|---|
| 0 | TM_A | TM_AL |
| 1 | / | / |
| 2 | TM_A | TM_AL |
| 3 | TM_A | TM_AL |
| 4 | TM_A | TM_L |
| 5 | TM_AL | TM_L |
| 6 | / | / |
| 7 | / | / |
| 8 | TM_AL | TM_L |
| 9 | / | / |
| 10 | / | / |
| 11 | TM_AL | TM_L |
| 12 | TM_AL | TM_AL |
| 13 | TM_A | TM_AL |
| 14 | TM_A | TM_AL |
| 15 | / | / |
| 16 | TM_A | TM_AL |
| 17 | / | / |
| 18 | TM_A | TM_AL |

TABLE 5-continued

| "Partition" angle index | Template corresponding to first prediction mode | Template corresponding to second prediction mode |
|---|---|---|
| 19 | TM_A | TM_AL |
| 20 | TM_A | TM_L |
| 21 | TM_AL | TM_L |
| 22 | / | / |
| 23 | / | / |
| 24 | TM_AL | TM_L |
| 25 | / | / |
| 26 | / | / |
| 27 | TM_AL | TM_L |
| 28 | TM_AL | TM_AL |
| 29 | TM_A | TM_AL |
| 30 | TM_A | TM_AL |
| 31 | / | / |

For example, the template on the left is denoted as TM_A, the template on the top is denoted as TM_L, and both (left and top) templates are denoted as TM_AL. A relationship between templates and "partition" angle indices is illustrated in Table 5. Some angle indices such as 1, 6, and 7 are not used in the current GPM, and therefore there is no corresponding template, which is denoted by "/".

Template partitioning according to the weight derivation mode does take into consideration a difference between the two parts "partitioned" by means of GPM, but such partitioning is not fine enough. The reason is that the template is partitioned only into two parts, i. e. the left and the top, but it can be seen from the weight map that a boundary line may fall into various positions. The boundary line may be regarded as a line consisting of samples whose weight is a median value in a weight matrix. In the current GPM, the boundary line is a straight line, and if there is no integer sample whose weight is a median value in an actual weight matrix, fractional samples may be used for replacement, or samples with other weights may also be used. If templates are selected according to Table 5, an unsuitable template may be selected, which results in inaccurate template matching, low prediction accuracy, and poor encoding effect.

In order to solve the foregoing technical problem, in embodiments of the disclosure, K templates are determined for the current block according to at least one of a size of the current block and the weight derivation mode, and then K prediction modes are determined according to the K templates. That is to say, K templates are determined according to a size of the current block and/or the weight derivation mode, as such, the K templates determined are more in line with the actual situation. When determining the prediction mode with the K templates, accuracy of determination of the prediction mode can be improved, accurate prediction of the current block can be realized by using the K prediction modes which are determined accurately, thereby improving encoding effect.

A video decoding method provided in embodiments of the disclosure will be described below with reference to FIG. 14 by taking a decoding end as an example.

FIG. 14 is a schematic flowchart of a prediction method provided in an embodiment of the disclosure. The embodiment of the disclosure is applied to the video decoder illustrated in each of FIG. 1 and FIG. 3. As illustrated in FIG. 14, the method of the embodiment of the disclosure includes the following.

S101, a bitstream is decoded to determine a weight derivation mode of a current block.

It should be noted that, in the disclosure, the weight derivation mode is used to determine a weight used for the current block. Specifically, the weight derivation mode may be a mode for deriving a weight. For a block of a given length and width, each weight derivation mode may be used to derive one weight matrix. For blocks of the same size, weight matrices derived from different weight derivation modes may be different.

Exemplarily, in the disclosure, AWP has 56 weight derivation modes, and GPM has 64 weight derivation modes.

In the disclosure, the manner in which the weight derivation mode of the current block is determined at a decoding end includes, but is not limited to, the following manners.

Manner 1: At the decoding end, a weight derivation mode which is the same as that at an encoding end is chosen by default, for example, a weight derivation mode whose index is 44 is chosen at both the decoding end and the encoding end.

Manner 2: At the encoding end, an index of a weight derivation mode used for an encoding process is carried in the bitstream. In this way, at the decoding end, the weight derivation mode of the current block can be obtained by decoding the bitstream.

Manner 3: The weight derivation mode is determined in the same manner as the encoding end. For example, at the decoding end, all possible combinations of K prediction modes and the weight derivation mode are attempted, where K is a positive integer and K>1, and a weight derivation mode corresponding to the minimum cost is selected and determined as the weight derivation mode of the current block.

Taking K=2 as an example, the K prediction modes include a first prediction mode and a second prediction mode. Assuming that there are 66 available prediction modes, then there are 66 possibilities for the first prediction mode, and since the second prediction mode is different from the first prediction mode, there are 65 possibilities for the second prediction mode. Assuming that there are 64 weight derivation modes (taking GPM as an example), then in the disclosure, any two different prediction modes and any one weight derivation mode may be used, and there are totally 66×65×64 possibilities. If it is specified that a pulse code modulation (PCM) prediction mode is not used, there are 65×64×63 possibilities. As can be seen, in the disclosure, the prediction modes that can be selected from and the number of weight derivation modes that can be used may also be restricted, and then the number of such possible combinations is reduced accordingly.

Further, in embodiments of the disclosure, at the decoder, cost may be calculated for all possible combinations to determine a combination with the minimum cost.

If K=2, each combination comprises one first prediction mode, one second prediction mode, and one weight derivation mode.

Optionally, in order to reduce time consumption of cost calculation, preliminary selection may be made on all the foregoing possible combinations, for example, preliminary selection is made by using an SAD, an SATD, etc. as an approximate cost to determine a specified number of candidate combinations of the first prediction mode, the second prediction mode, and the weight derivation mode. Then, more elaborate cost calculation is performed for fine selection, to determine a combination of the first prediction mode, the second prediction mode, and the weight derivation mode with the minimum cost. In this way, the number of attempts is reduced by using some fast algorithms during preliminary selection. For example, if an angular prediction mode leads to high cost, several neighbouring prediction modes of the prediction mode will not be attempted.

It can be understood that in the disclosure, during both preliminary selection and fine selection, a first prediction value will be determined according to the first prediction mode, a second prediction value will be determined according to the second prediction mode, the weights will be derived according to the weight derivation mode, and the prediction value in the disclosure will be determined according to the first prediction value, the second prediction value, and the weights. During SAD and SATD preliminary selection, the SAD and SATD are determined by using the current block and the prediction value corresponding to the current block. It should be noted that, deriving the weight according to the weight derivation mode may be understood as deriving a weight corresponding to each sample in the current block, or may be understood as deriving a weight matrix corresponding to the current block. When determining the prediction value of the current block based on the weights, the first prediction value and the second prediction value corresponding to each sample in the current block are determined, and the prediction value corresponding to each sample is determined according to the first prediction value, the second prediction value, and the weights corresponding to each sample, where the prediction value corresponding to each sample in the current block constitute the prediction value of the current block. Optionally, the prediction of the current block may be determined based on the weights on the block basis. For example, the first prediction value and the second prediction value of the current block are determined, and the first prediction value and the second prediction value of the current block are weighted according to the weight matrix of the current block to obtain a new prediction value of the current block.

In some embodiments, at the decoding end, before determining the weight derivation mode of the current block, whether to use K different prediction modes for weighted prediction of the current block needs to be determined. If it is determined at the decoding end that K different prediction modes are used for weighted prediction of the current block, S101 is performed to determine the weight derivation mode of the current block.

In a possible implementation, at the decoding end, whether to use K different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether K different prediction modes can be used for prediction of the current block.

It can be understood that, in the embodiment of the disclosure, the prediction mode parameter may be understood as a flag bit indicating whether the GPM mode or the AWP mode is used. Specifically, at the encoding end, a variable may be used as the prediction mode parameter, so that the prediction mode parameter may be set by setting a value of the variable. Exemplarily, in the disclosure, if the GPM mode or the AWP mode is used for the current block, at the encoding end, a value of the prediction mode parameter may be set to indicate that the GPM mode or the AWP mode is used for the current block. Specifically, the value of the variable may be set to 1 at the encoding end. Exemplarily, in the disclosure, if the GPM mode or the AWP mode is not used for the current block, at the encoding end, the value of the prediction mode parameter may be set to indicate that the GPM mode or the AWP mode is not used for the current block. Specifically, the value of the variable may be set to 0 at the encoding end. Further, in the embodiment of the disclosure, after setting of the prediction mode parameter is completed, at the encoding end, the prediction mode parameter may be signalled into the bitstream and transmitted to the decoding end, so that at the decoding end, the prediction mode parameter may be obtained after parsing the bitstream.

Based on this, at the decoding end, the bitstream is decoded to obtain the prediction mode parameter, whether the GPM mode or the AWP mode is used for the current block is determined according to the prediction mode parameter, and if the GPM mode or the AWP mode is used for the current block, i. e. K different prediction modes are used for prediction, the weight derivation mode of the current block is determined.

It should be noted that, in the embodiment of the disclosure, the GPM mode or the AWP mode is a prediction method. Specifically, K different prediction modes are determined for the current block, K prediction values are determined according to the K different prediction modes, and then weights are determined to combine the K prediction values according to the weights, so as to obtain a new prediction value.

The K different prediction modes of the current block include the following examples.

Example 1: The K different prediction modes each are an intra prediction mode.

Example 2: The K different prediction modes each are an inter prediction mode.

Example 3: At least one of the K different prediction modes is an intra prediction mode, and at least one of the K different prediction modes is an inter prediction mode.

Example 4: At least one of the K different prediction modes is an intra prediction mode, and at least one of the K different prediction modes is a non-intra and non-inter prediction mode, for example, an intra block copy (IBC) prediction mode or a palette prediction mode.

Example 5: At least one of the K different prediction modes is an inter prediction mode, and at least one of the K different prediction modes is a non-intra and non-inter prediction mode, for example, an IBC prediction mode or a palette prediction mode.

Example 6: None of the K different prediction modes is an intra prediction mode or an inter prediction mode. For example, one is an IBC prediction mode, and another is a palette prediction mode.

It should be noted that, there is no limitation on the types of the foregoing K different prediction modes in embodiments of the disclosure.

Figure 15:
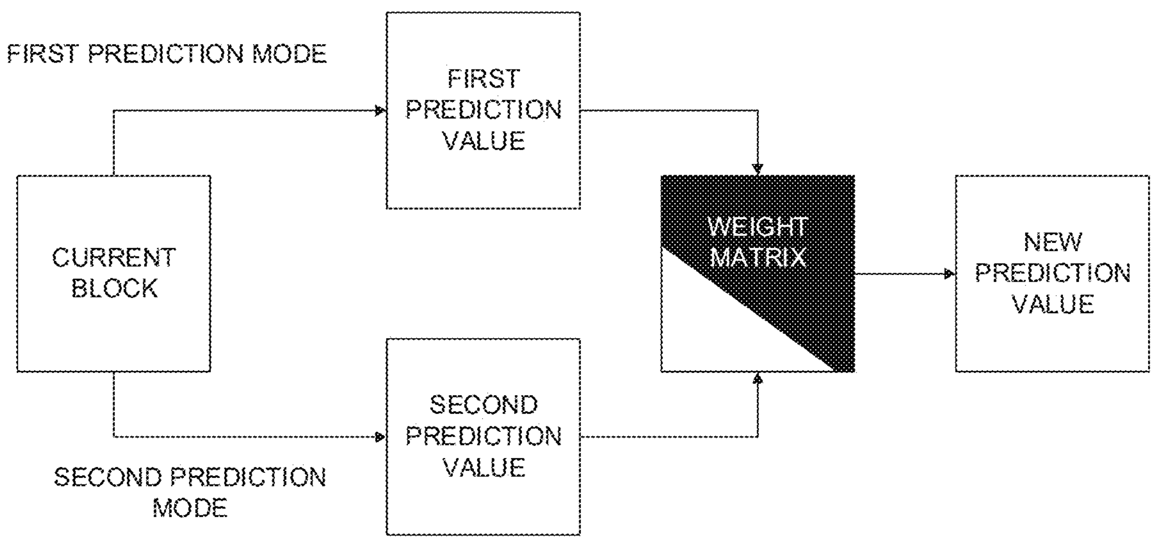
FIG. 15 is a schematic diagram illustrating prediction of a current block by using two prediction modes.

FIG. 15 is a schematic diagram illustrating prediction of the current block by using two prediction modes. As illustrated in FIG. 15, when predicting the current block, the first prediction mode may be used to determine the first prediction value, the second prediction mode may be used to determine the second prediction value, and then the first prediction value and the second prediction value may be combined based on weights, so as to obtain a new prediction value.

In some embodiments, limitations may be imposed on a size of the current block when applying the GPM mode or the AWP mode.

It may be understood that, in the prediction method provided in the embodiment of the disclosure, it is necessary to use the K different prediction modes to generate the K prediction values, which are then weighted to obtain a new prediction value, in order to reduce complexity while considering the trade-off between compression performance and complexity, the GPM mode or the AWP mode may not be used for blocks with certain sizes in the embodiment of the disclosure. Therefore, in the disclosure, at the decoder, a size parameter of the current block may be firstly determined, and then whether to use the GPM mode or the AWP mode for the current block is determined according to the size parameter.

It should be noted that, in the embodiment of the disclosure, the size parameter of the current block may include a height and a width of the current block, and therefore, at the decoder, the use of the GPM mode or the AWP mode may be restricted based on the height and the width of the current block.

Exemplarily, in the disclosure, if the width of the current block is greater than a first threshold and the height of the current block is greater than a second threshold, it is determined that the GPM mode or the AWP mode is used for the current block. As can be seen, one possible limitation is to use the GPM mode or the AWP mode only when the width of the block is greater than (or greater than or equal to) the first threshold and the height of the block is greater than (or greater than or equal to) the second threshold. The value of each of the first threshold and the second threshold may be 8, 16, 32, etc., and the first threshold may be equal to the second threshold.

Exemplarily, in the disclosure, if the width of the current block is less than a third threshold and the height of the current block is greater than a fourth threshold, it is determined that the GPM mode or the AWP mode is used for the current block. As can be seen, one possible limitation is to use the spatial angular weighted prediction (SAWP) mode only when the width of the block is less than (or less than or equal to) the third threshold and the height of the block is greater than (or greater than or equal to) the fourth threshold. The value of each of the third threshold and the fourth threshold may be 8, 16, 32, etc., and the third threshold may be equal to the fourth threshold.

Further, in the embodiment of the disclosure, limitation on the size of a block for which the GPM mode or the AWP mode can be used may also be implemented through limitations on the sample parameter.

Exemplarily, in the disclosure, at the decoder, a sample parameter of the current block may be firstly determined, and then whether the GPM mode or the AWP mode can be used for the current block may be determined according to the sample parameter and a fifth threshold. As can be seen, one possible limitation is to use the GPM mode or the AWP mode only when the number of samples in the block is greater than (or greater than or equal to) the fifth threshold. The value of the fifth threshold may be 8, 16, 32, etc.

That is, in the disclosure, the GPM mode or the AWP mode can be used for the current block only when the size parameter of the current block satisfies a size requirement.

Exemplarily, in the disclosure, a flag at a picture level may be used to determine whether the disclosure is applied to the current decoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

In some embodiments, a flag below the picture level but above a CU level (such as tile, slice, patch, LCU, etc.) may be used to determine whether the disclosure is applied to that region.

S102, K templates are determined according to at least one of a size of a current block and a weight derivation mode. K is a positive integer greater than one.

In template matching, by utilizing correlation between neighbouring samples, some regions neighbouring the current block are taken as a template. Before coding the current block, blocks on the left and the top of the current block have already been decoded according to a coding order. In inter prediction, a best matching position of the template is found in a reference picture to determine motion information or a motion vector of the current block. In intra prediction, an intra prediction mode of the current block is determined by using the template.

There is no limitation on the shape of the template of the current block in the disclosure.

In some embodiments, the template of the current block includes at least one of a top decoded region and a left decoded region.

Optionally, a width of the top decoded region is the same as a width of the current block, a height of the left decoded region is the same as a height of the current block.

Figure 16:
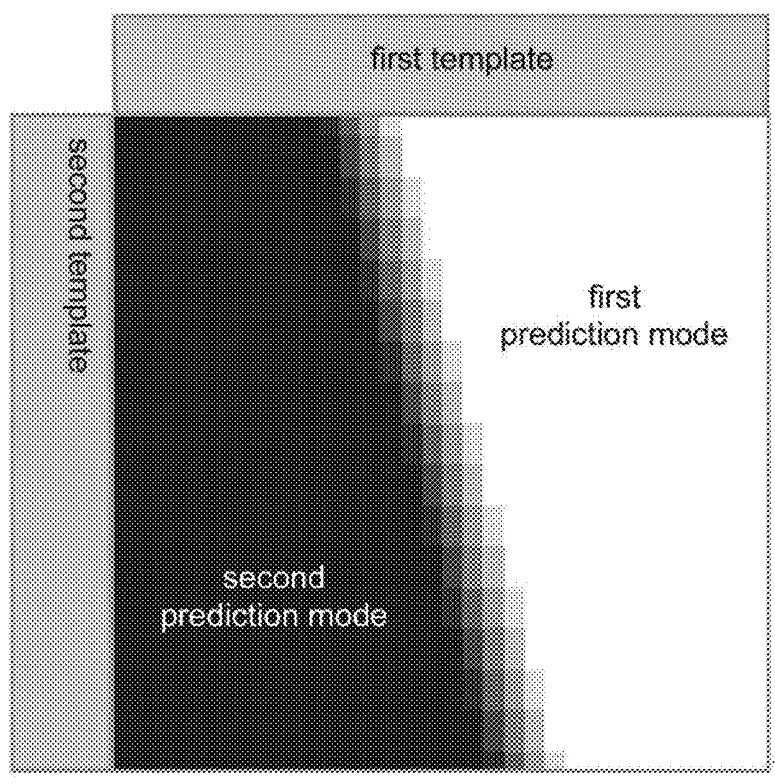
FIG. 16 is a schematic diagram illustrating template partitioning.

As illustrated in Table 5 above, a template corresponding to the first prediction mode and a template corresponding to the second prediction mode each are a top decoded region of the current block, or a left decoded region of the current block, or a left decoded region and a top decoded region of the current block. In this way, during template matching, the template corresponding to the first prediction mode is used to determine the first prediction mode, and the template corresponding to the second prediction mode is used to determine the second prediction mode. For example, as illustrated in FIG. 16, taking a weight derivation mode whose GPM index is 2 as an example, a white area in a weight matrix of the current block is a weight corresponding to a prediction value of the first prediction mode, and a black area is a weight corresponding to a prediction value of the second prediction mode. As illustrated in FIG. 16, a template corresponding to the first prediction mode is a top decoded region of the current block, a template corresponding to the second prediction mode is a left decoded region of the current block, but a template close to the second prediction mode further includes part of the top decoded region besides the left region. Therefore, in the related art, template partitioning is not fine enough, and as a result, if a prediction mode is determined based on a template that is not fine enough, prediction mode determination will be inaccurate and prediction error will be high.

In order to solve the technical problem, in the disclosure, a finer partitioning of template can be achieved with aid of at least one of the size of the current block and the weight derivation mode. The process of determining the K templates according to at least one of the size of the current block and the weight derivation mode will be detailed with reference to the method of Case 1 and Case 2.

Figures 14A, 14B:
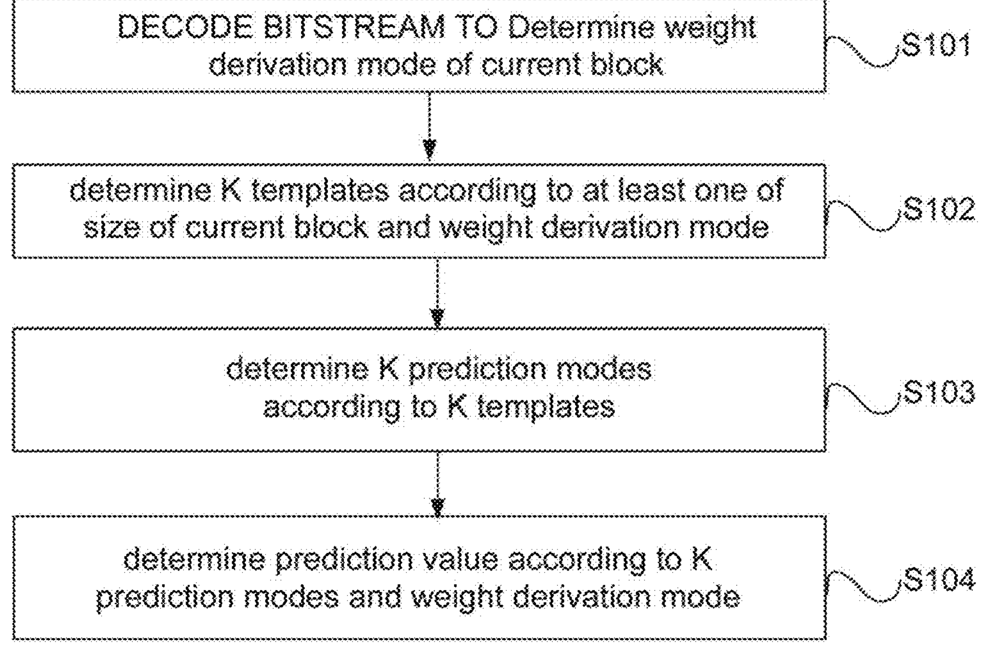
FIG. 14A is a schematic flowchart of a prediction method provided in an embodiment of the disclosure.
FIG. 14B is a schematic sub-flowchart of a step S102 of the FIG. 14A provided in an embodiment of the disclosure.

Case 1: Finer partitioning of the template can be achieved through the weight derivation mode. Specifically, as shown in FIG. 14B, the above S102 includes the following steps.

S102-A, the template of the current block is partitioned into K templates according to the weight derivation mode.

As shown in above FIG. 16, the template associated with the second prediction mode does not only includes the left region, but also includes the left part of the top region. The template associated with the first prediction mode includes the right part of the top region. As such, when using the left region and the left part of the top region of the template of the current block as the template of the second prediction mode for matching of the second prediction mode, the accuracy of matching of the second prediction mode can be improved. When using the upper-right portion of the template of the current block as the template of the first prediction mode for matching of the first prediction mode, the accuracy of matching of the first prediction mode can be improved. As can be seen, finer partitioning of template can be achieved based on the weight derivation mode, accuracy of determination of the prediction mode can be improved, and decoding effect can be improved.

In S102-A, the manner of partitioning the template of the current block into K templates according to the weight derivation mode can include but not limited to the following.

Manner 1: partitioning the template of the current block into K templates according to a boundary line of the weight matrix corresponding to the weight derivation mode.

Figure 17A:
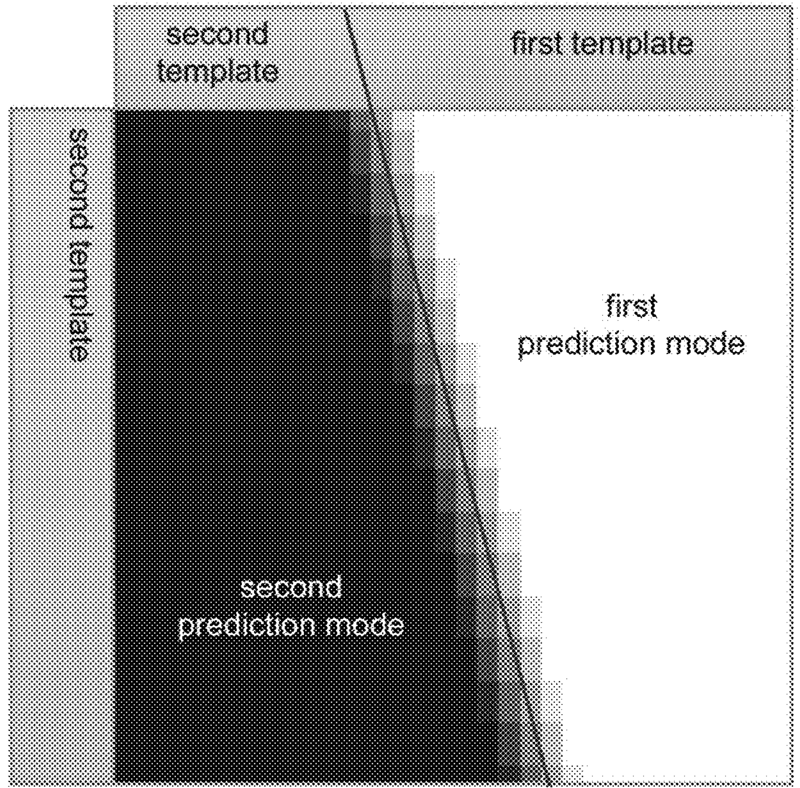
FIG. 17A-17G are schematic diagrams illustrating template partitioning.

For example, as illustrated in FIG. 17A, in the disclosure, a boundary line of a weight matrix corresponding to the weight derivation mode of the current block is extended to a template of the current block, for template partitioning of the current block. For example, K=2, a template on the right of the boundary line is referred to as a first template, and a template on the left of the boundary line is referred to as a second template. The first template corresponds to the first prediction mode, the second prediction mode corresponds to the second template, during template matching, the first template may be used to derive the first prediction mode, and the second template may be used to derive the second prediction mode, thereby determining a prediction mode accurately and improving decoding effect.

In some embodiments, the first template and the second template partitioned according to the above method may not be rectangular. For example, as illustrated in FIG. 17A, the first template and the second template each have an oblique edge, and cost calculation for an irregular template is relatively complex.

Figure 17B:
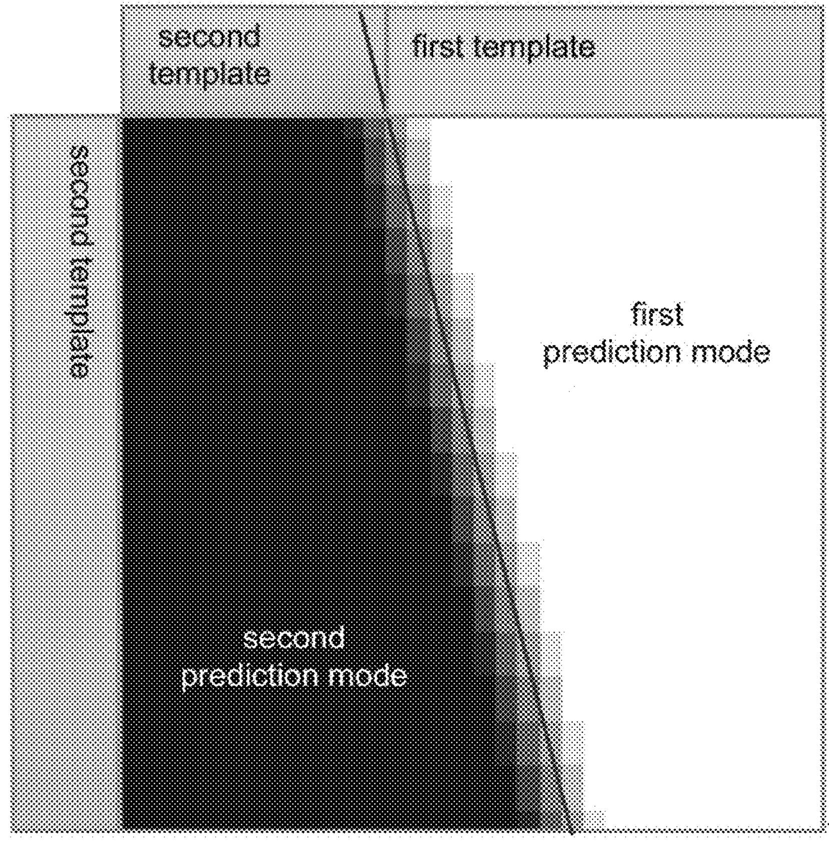
Figure 17C:
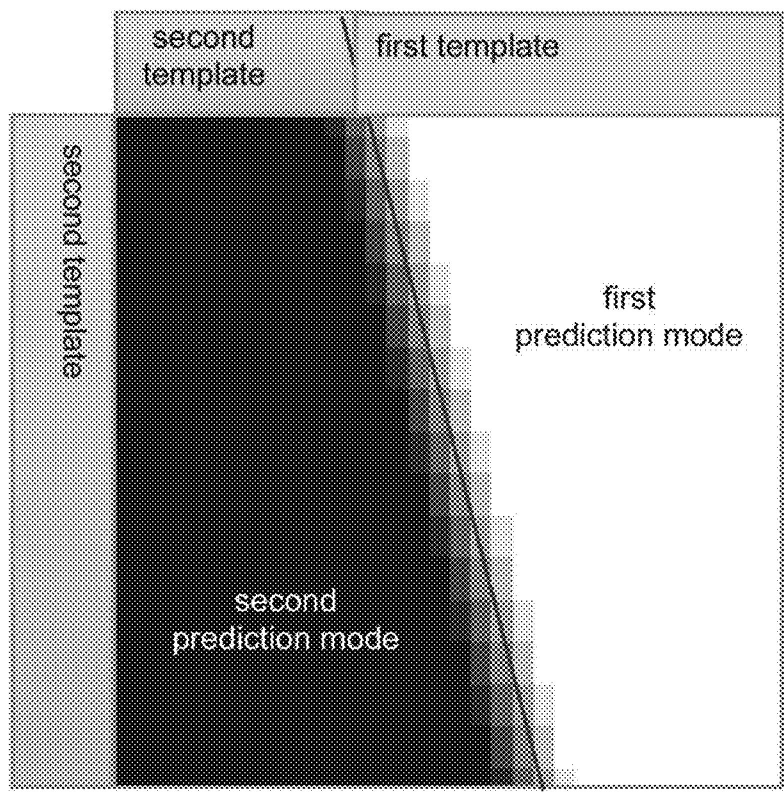

In order to reduce complexity of template matching, in some embodiments, the first template and the second template can be partitioned into rectangles. Specifically, the boundary line is extended into the template of the current block, and an extended line of the template of the current block can be obtained. The template of the current block is partitioned into a first template and a second template by the extended line. The boundary line between the first template and the second template intersect or not intersects with the extended line. Exemplary, as illustrated in FIG. 17B, the boundary line between the first template and the second template passes through one end point of the extended line and perpendicular to the long side of the current block. Exemplary, as illustrated in FIG. 17C, the boundary line between the first template and the second template passes through the middle point of the extended line and perpendicular to the long side of the current block.

In some embodiments, if K>2, the templates obtained through partitioning according to the weight derivation mode can be further partitioned. If K=3, for example, as shown in the templates obtained through partitioning according to the weight derivation mode illustrated in FIG. 17B, the left template can be partitioned into two parts, for example, the lower part of the left template can be portioned as a third template, the remaining part of the left template and the left part of the original top template is partitioned into a second template, and the left part of the top template is partitioned into a first template, as such, the template of the current block is partitioned into 3 templates.

In Manner 1, the template of the current block is partitioned into K templates according to the boundary line of the weight matrix, which is easy and can achieve accurate partition of templates.

In some embodiments, the template of the current block can be partitioned into K templates in the following Manner 2.

Figure 14C:
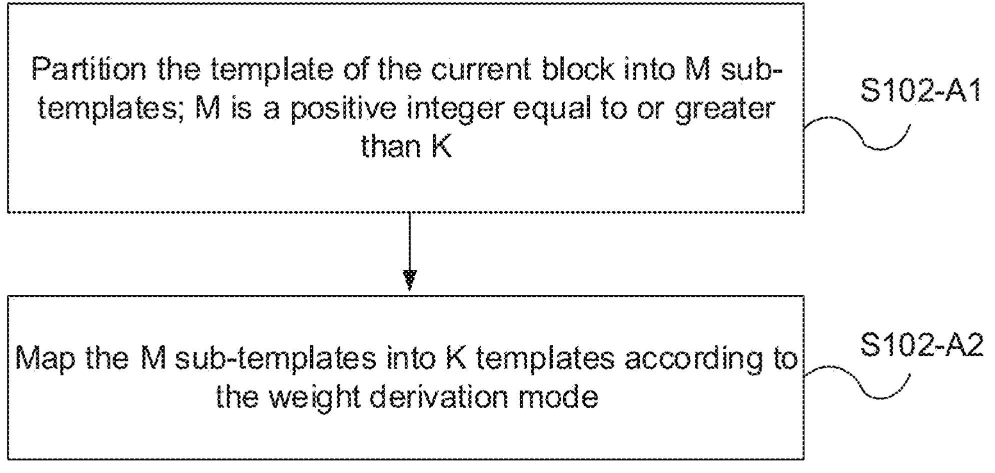
FIG. 14C is a schematic sub-flowchart of a step S102-A of the FIG. 14B provided in an embodiment of the disclosure.

Manner 2: as shown in FIG. 14C. S102-A includes the following S102-A1 and S102-A2.

S102-A1: The template of the current block is partitioned into M sub-templates; M is a positive integer equal to or greater than K.

S102-A2: the M sub-templates are mapped into K templates according to the weight derivation mode.

In manner 2, the template of the current block is partitioned into multiple sub-templates, for example, into M sub-templates, then determine the corresponding template for each sub-template, so as to achieve partition of K templates.

The manner for partitioning to obtain the sub-templates is not restricted in the disclosure.

In a possible implementation 1 of Manner 2, S102-A1 includes: partitioning the template of the current block into M sub-templates according to the weight derivation mode.

Figure 17D:
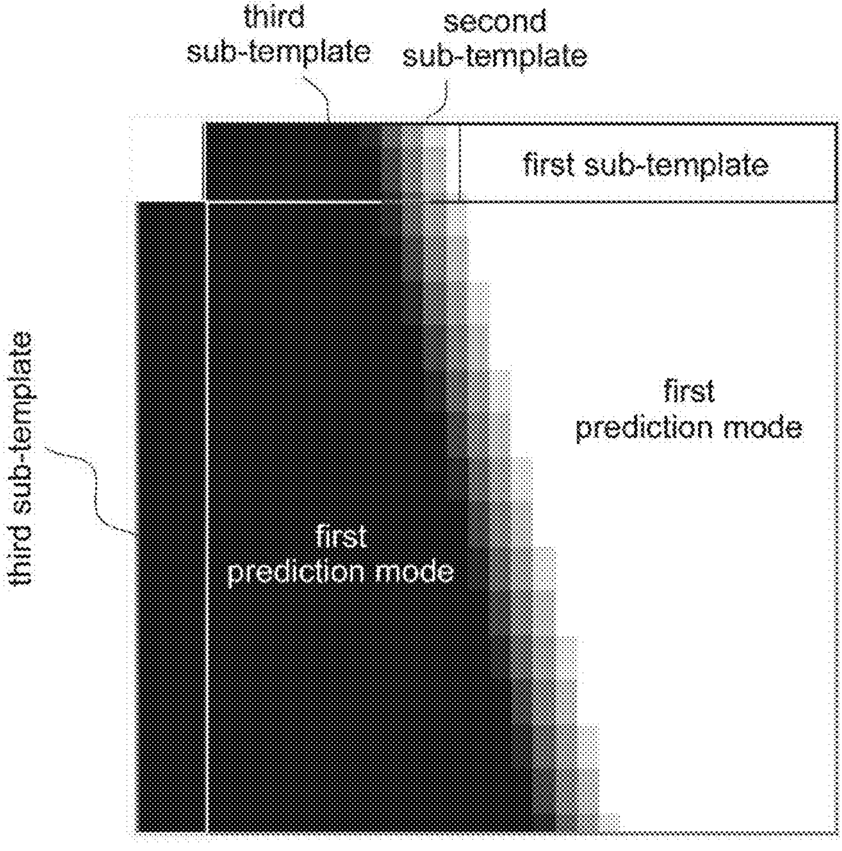

Example 1: a weight matrix is determined according to the weight derivation mode, the weight matrix is extended to the template of the current block, for example, extended to the left-top, as such, the weight matrix covers the template of the current block. For example, as illustrated in FIG. 17D, a small rectangular region in the top-left of the current block may be added to the template of the current block, so that the template of the current block and the current block can constitute a rectangle. Alternatively, only the left part and the top part may be used as the template of the current block. As illustrated in FIG. 17D, the template of the current block includes the left region and the top region of the current block, and a bottom-right rectangular region is the current block. The weight matrix of the current block is extended to a template of the current block to cover the template of the current block. As such, according to the coverage of the template of the current block by the weight matrix, the template of the current block is partitioned into M sub-templates. For example, points with a weight in a range from a0 to a1 in the template of the current block is partitioned into a first sub-template, and points with a weight in a range from a1 to a2 is partitioned into a second sub-template, and so on, and points with a weight in a range from aM−1 to aM is partitioned into a $M^{th}$ sub-template.

Exemplary, the black template in FIG. 17D is partitioned into a first sub-template, the top-grey template is partitioned into a second sub-template, and the top-white template is partitioned into the second sub-template.

Exemplary, the left-black template in FIG. 17D is partitioned into a first sub-template, the top-black template is partitioned into a second sub-template, the top-grey template is partitioned into a third sub-template, and the top-white template is partitioned into a fourth sub-template.

The shapes of the M sub-templates are not restricted.

In some embodiments, in order to reduce the complexity of subsequent pattern matching calculations, in Example 1 mentioned above, the M sub-templates are rectangles.

Example 2, a weight boundary line is determined according to the weight derivation mode, the boundary line is extended into the template of the current block to partition the template of the current block into M sub-templates.

Figure 17E:
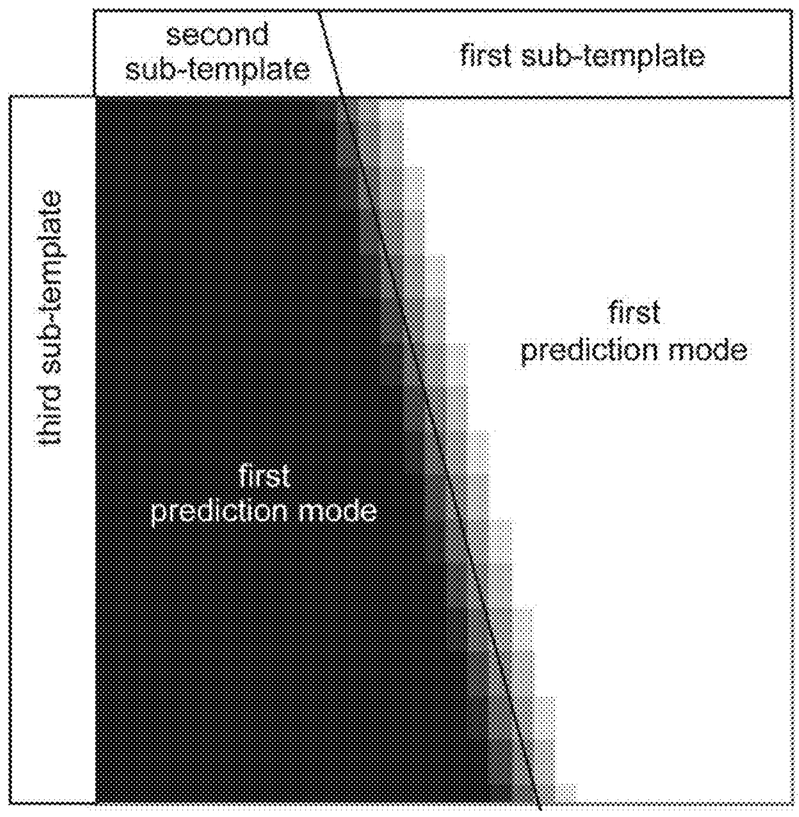
Figure 17F:
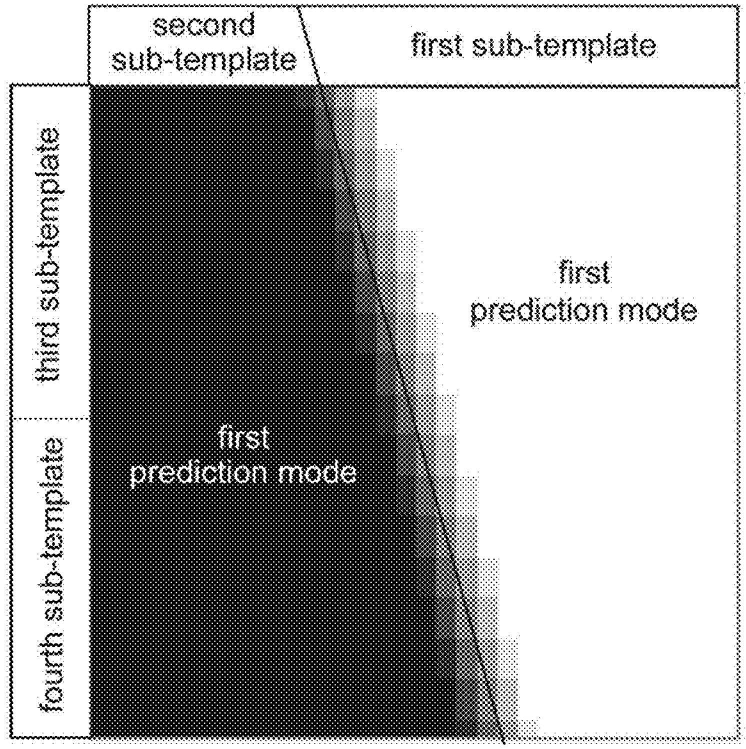

Specifically, the weight boundary line is determined based on the weight derivation mode. As described in the above embodiments, this boundary line is a straight line (or curve) composed of points where the weight changes in the weight matrix of the current block, which is derived by the weight derivation mode, such as the diagonal line in FIG. 17E. By extending this boundary line into the template of the current block, the top part of the template of the current block is partitioned into two parts. In this way, M sub-templates can be determined based on the template partitioned by the weight boundary line. For example, as shown in FIG. 17E, the area to the right of the boundary line in the top template of the current block is partitioned into the first sub-template, and the area to the left is partitioned into the second sub-template. The left template of the current block is partitioned into the third sub-template; thus the template of the current block is partitioned into three sub-templates. Another example, as shown in FIG. 17F, is that the left template of the current block can be partitioned into multiple sub-templates, such as two sub-modules, thus partitioning the template of the current block into four sub-templates. In some embodiments, other rules can also be applied to further partition the template after the boundary line based partitioning, obtaining M sub-templates.

In some embodiments, the first and second templates partitioned according to the aforementioned method may not be rectangular. For instance, as shown in FIG. 17E and FIG. 17F, the first and second sub-templates have diagonal edges, making the template matching computation for irregular templates more complex.

Figure 17G:
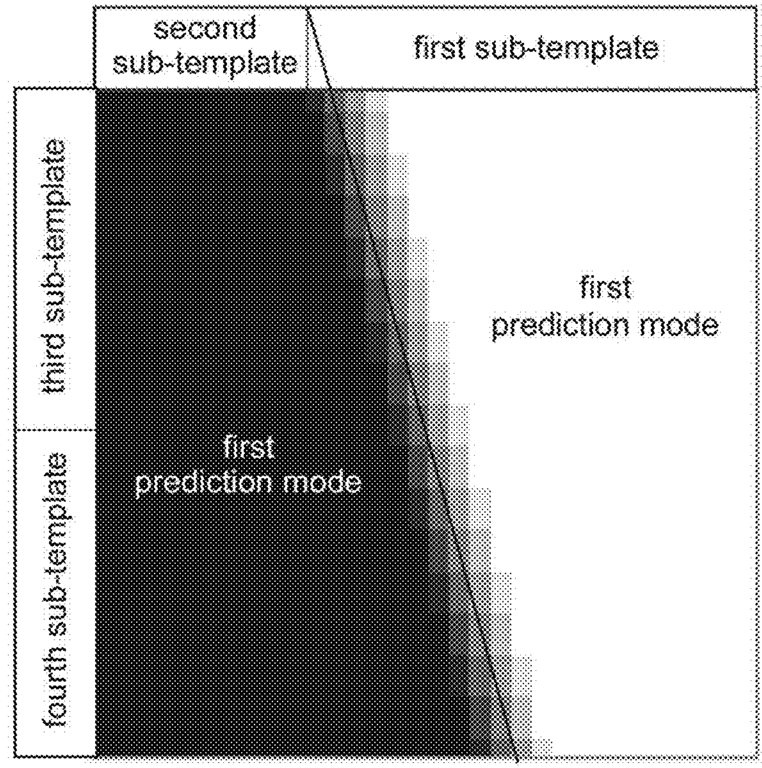

To reduce the computational complexity of template matching, in some embodiments, the boundary line is extended into the template of the current block to obtain an extended line of the boundary line in the template of the current block. Using this extended line, the template of the current block is partitioned into M rectangular sub-templates. For example, as illustrated in FIG. 17G, the first and second sub-templates are partitioned into rectangles by the extended line. The boundary line between the first and second sub-templates illustrated in FIG. 17G passes through the left endpoint of the extended line and is perpendicular to the long side of the current block. Optionally, the boundary line between the first and second sub-templates passes through the right endpoint of the extended line and is perpendicular to the long side of the current block, or the boundary line between the first and second sub-templates passes through the midpoint of the extended line and is perpendicular to the long side of the current block. Alternatively, the boundary line between the first and second sub-templates does not intersect with the extended line and is perpendicular to the long side of the current block.

In addition to partitioning the template of the current block into M sub-templates according to the weight derivation mode, the template of the current block can be partitioned into M sub-templates in the following Manner 2. As detailed below.

Figure 14D:
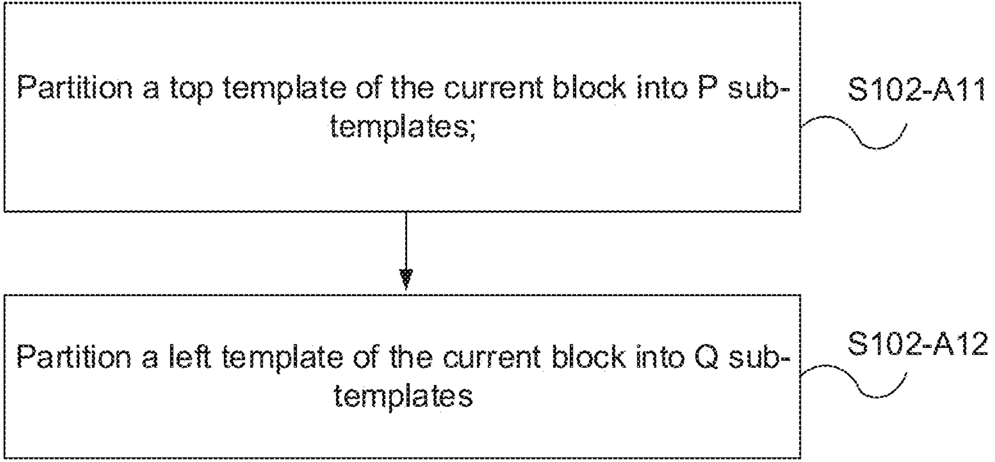
FIG. 14D is a schematic sub-flowchart of a step S102-A1 of the FIG. 14C provided in an embodiment of the disclosure.

In possible implementation 2 of Manner 2, the template of the current block is partitioned into M sub-templates according to the preset rule, that is, as shown in FIG. 14D S102-A1 includes the following steps.

S102-A11, the top template of the current block is partitioned into P sub-templates; and/or S102-A12, the left template of the current block is partitioned into Q sub-templates.

P and Q are integers less than or equal to M, and the sum of P and Q is less than M.

In the embodiments of the disclosure, the template of the current block includes several decoded rows of sample rows above the current block and several decoded columns of sample columns to the left of the current block. For ease of description, in embodiments of the disclosure, the several decoded sample rows above the current block are denoted as the top template of the current block, and the several decoded sample columns to the left of the current block are denoted as the left template of the current block. In some embodiments, the template of the current block also includes the decoded area in the upper left corner of the current block, and/or includes the decoded area in the lower left corner of the current block, etc. Embodiments of the disclosure do not limit the specific template of the current block. Embodiments mainly illustrates the partitioning of the top template and the left template in the template of the current block.

In some embodiments, it is possible to partition only the top template of the current block, without partitioning the left template of the current block. For instance, the top template of the current block can be partitioned into M−1 sub-templates, which means P=M−1, while the left template of the current block is considered as one sub-template. In this way, a total of M sub-templates are obtained.

In some embodiments, it is possible to partition only the left template of the current block, without partitioning the top template of the current block. For instance, the left template of the current block can be partitioned into M−1 sub-templates, which means Q=M−1, while the top template of the current block is considered as one sub-template. In this way, a total of M sub-templates are obtained.

In some embodiments, partitioning is applied to both the top template and the left template of the current block. For instance, the top template of the current block is partitioned into P sub-templates, and the left template of the current block is partitioned into Q sub-templates, M=P+Q. This results in the partitioning of the current block's template into M sub-templates.

In implementation 2, there is no restriction on how to partition the top template of the current block into P sub-templates and/or the left template of the current block into Q sub-templates. For example, the partition can be equal, or it can be done according to preset ratios, or based on a predetermined number of samples, or by a preset number of sample rows or columns, etc.

In some embodiments, in S102-A11, the left template of the current block is partitioned into P sub-templates in the following manners.

Manner 1, the top template is partitioned into P sub-templates along a vertical direction.

Figure 18A:
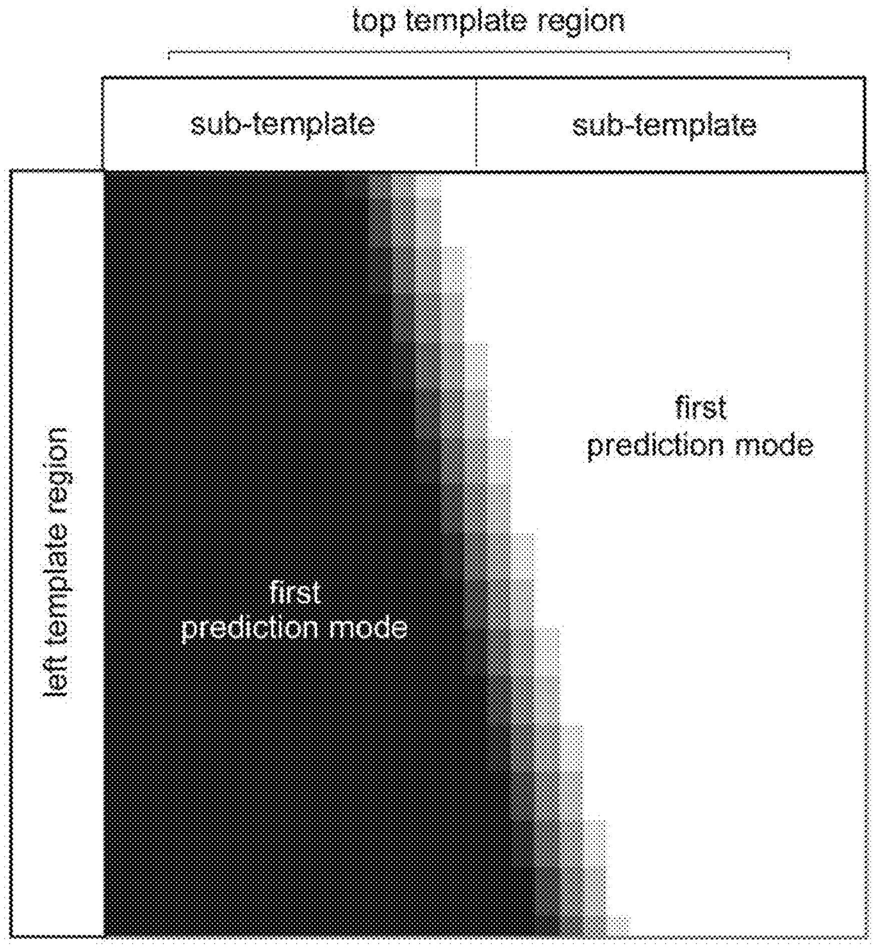
FIG. 18A-18D is another schematic diagram illustrating template partitioning.

In an example, along the vertical direction, the top template of the current block is evenly partitioned into P equal parts. For instance, as illustrated in FIG. 18A, the top template of the current block is evenly partitioned into two equal parts, resulting in two sub-templates, i.e., P=2. Optionally, the top template of the current block can also be evenly partitioned into three, four, or five equal parts, etc. That is to say, embodiments of the disclosure do not restrict the specific value of P, which should be determined based on actual needs. It should be noted that if the number of sample columns included in the top template of the current block is not a multiple of P, then P−1 sub-templates can have the same size, and the size of the remaining one sub-template will be inconsistent with the above P−1 sub-templates. For example, the size of the remaining one sub-template is smaller than the size of each of the above P−1 sub-templates, or the size of the remaining one sub-template is larger than the size of each of the above P−1 sub-templates.

In another example, along the vertical direction, the top template of the current block is partitioned into P sub-templates according to a preset sub-template ratio. For instance, the top template is partitioned into two sub-templates in the ratio of a1:a2. Exemplarily, a1:a2=1:1.5, then the top template is partitioned into two sub-templates according to the ratio of 1:1.5, denoted as sub-template 1 and sub-template 2, with the size ratio of sub-template 1 to sub-template 2 being 1:1.5. Furthermore, the top template is partitioned into three sub-templates according to the ratio of a1:a2:a3. For example, if a1:a2:a3=1:1.5:2, then the top template is partitioned into three sub-templates according to the ratio of 1:1.5:2, denoted as sub-template 1, sub-template 2, and sub-template 3, with the size ratio of sub-template 1, sub-template 2, and sub-template 3 being 1:1.5:2.

Manner 2: The top template is partitioned into P sub-templates according to a preset number of samples.

In manner 2, the top template of the current block is partitioned into P sub-templates using a preset number of samples as the smallest unit for partition. This disclosure does not restrict the specific arrangement of the preset samples, for example, the preset number of samples can be arranged into a rectangle, and this rectangular block is used as the smallest unit for partition for the top template.

In some embodiment, n columns of pixels are used as the smallest unit to partition the top template into P sub-templates, where n is a positive integer. For instance, assume the size of the top template of the current block is 3*16, meaning the top template of the current block includes 3 rows of pixel rows and 16 columns of pixel columns. If n=4, then every 4 columns of pixels in top template of the current block can be partitioned into a unit, resulting in 4 units. Based on these 4 units, P sub-templates can be obtained. For example, if each of the 4 units is taken as a sub-template, 4 sub-templates are obtained. That is to say, in embodiments of the disclosure, when partitioning the top template of the current block using n columns of samples as the smallest unit for partition, each template obtained by partitioning with the smallest unit can be taken as a sub-template. Another example is to take every two units from the aforementioned 4 units as a sub-template, resulting in 2 sub-templates. That is to say, in embodiments of the disclosure, when partitioning the top template of the current block using n columns of samples as the smallest unit for partition, multiple templates obtained by partitioning with the smallest unit can be taken as a sub-template. For instance, adjacent two or more areas obtained by partitioning with the smallest unit can be taken as a sub-template.

The value of n is not restricted herein, for example, n can be a preset value.

Optionally, the length of the top template of the current block is the same as the length of the current block, and the value of n can be determined according to the length of the current block, for example, the length of the current block is a multiple of n. For example, when the length of the current block is 16, n can be 2, 4, 8 or other values.

In embodiments of the disclosure, if partitioning of the left template of the current block is needed, the manner for partitioning the left template can be the same as or different from that of the top template of the current block.

In some embodiments, in S102-A11, the manner for partitioning the left template of the current block into Q sub-templates includes but not limited to the following.

Manner 1: the left template is partitioned into Q sub-templates along the horizontal direction.

Figure 18B:
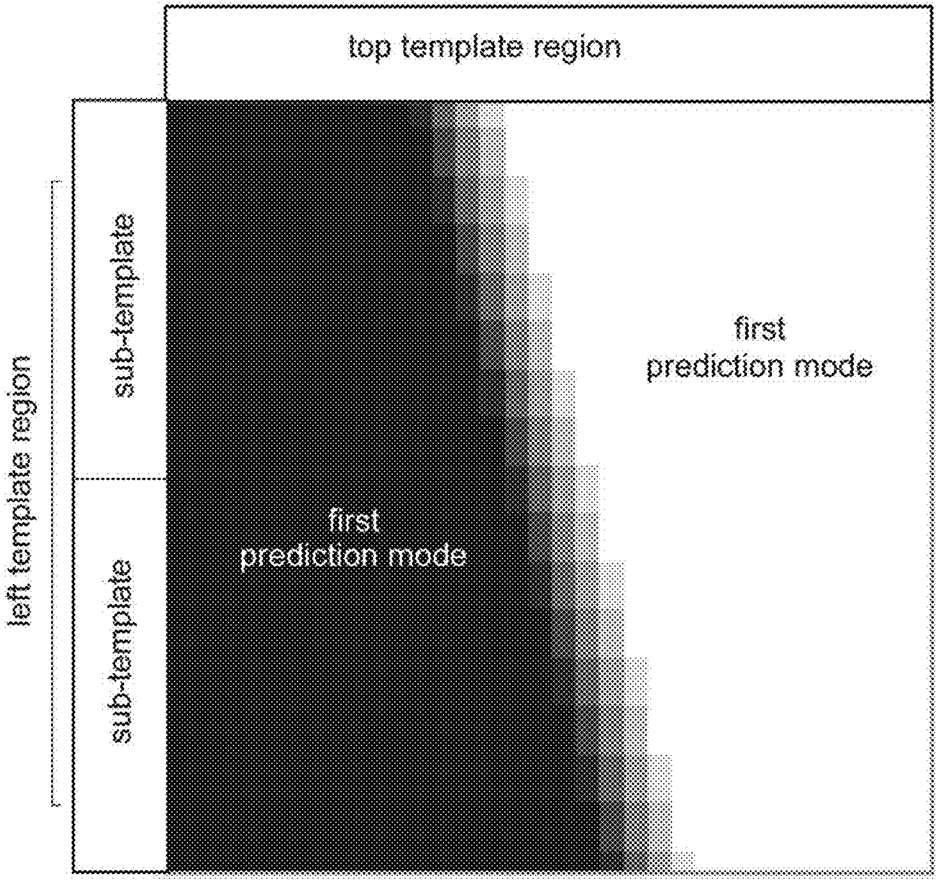

In an example, along the horizontal direction, the left template of the current block is evenly partitioned into Q equal parts, for example, as illustrated in FIG. 18B, the left template of the current block is evenly partitioned into two equal parts, resulting in two sub-templates, i.e., Q=2. Optionally, the left template of the current block can also be evenly partitioned into three, four, or five equal parts, etc. That is to say, embodiments of the disclosure do not restrict the specific value of Q, which should be determined based on actual needs. It should be noted that if the number of sample rows included in the left template of the current block is not a multiple of Q, then Q−1 sub-templates can have the same size, and the size of the remaining one sub-template will be inconsistent with the above Q−1 sub-templates. For example, the size of the remaining one sub-template may be smaller than the size of each of the above Q−1 sub-templates, or the size of the remaining one sub-template may be larger than the size of each of the above Q−1 sub-templates.

In another example, along the horizontal direction, the left template of the current block is divided into Q sub-templates according to a preset sub-template ratio. For instance, the left template is partitioned into two sub-templates in the ratio of b1:b2. Exemplarily, if b1:b2=1:1.5, then the left template is partitioned into two sub-templates according to the ratio of 1:1.5, denoted as sub-template 3 and sub-template 4, with the size ratio of sub-template 4 to sub-template 3 being 1:1.5. Furthermore, if the partition is made according to the ratio of b1:b2:b3, the left template is partitioned into three sub-templates. For example, if b1:b2:b3=1:1.5:2, then the left template is partitioned into three sub-templates according to the ratio of 1:1.5:2, denoted as sub-template 3, sub-template 4, and sub-template 5, with the size ratio of sub-template 3, sub-template 4, and sub-template 5 being 1:1.5:2.

Manner 2: The left template is partitioned into Q sub-templates according to a preset number of samples.

In Manner 2, a preset number of samples are used as the smallest unit of to partition the left template of the current block into Q sub-templates. This application does not restrict the specific arrangement of the preset samples; for example, these preset samples can be arranged into a rectangular shape, and this rectangular block is used as the smallest unit for partitioning the left template.

In some implementation examples, m rows of samples are used as the smallest unit to partition the left template into Q sub-templates, where m is a positive integer. For instance, assuming the size of the current block's left template is 16*3, which means the left template of the current block includes 16 rows of pixel rows and 3 columns of pixel columns. If m=4, then every 4 rows of pixels in the current block's left template can be partitioned into one unit, resulting in 4 units. Based on these 4 units, Q sub-templates are obtained. For example, if each of the 4 units is taken as a sub-template, 4 sub-templates are obtained. That is to say, in embodiments of the disclosure, when m rows of samples are used as the smallest unit to partition the left template of the current block, each template obtained by partitioning with the smallest unit can be taken as a sub-template. Furthermore, if every two units from the aforementioned 4 units are taken as a sub-template, 2 sub-templates are obtained. That is to say, in embodiments of the disclosure, when m rows of samples are used as the smallest unit to partition the left template of the current block, multiple templates obtained through partitioning by the smallest unit can be taken as a sub-template, such as grouping adjacent two or more areas partitioned by the smallest unit as a sub-template.

The value of m is not restricted herein, for example, m can be a preset value.

Optionally, the width of the left template of the current block is the same as the width of the current block, as such, m can be determined according to the width of the current block. For example, the width of the current block is multiple of m. For example, when the width of the current block is 16, the value of m can be 2, 4, 8 or other values.

In the above manner, after the template of the current block is partitioned into M sub-templates, S102-A2 is performed, that is, M sub-templates are mapped into K templates according to the weight derivation mode.

In embodiments of the disclosure, first, according to the above step, the template of the current block is partitioned into multiple sub-templates, that is, the template of the current block is partitioned into M sub-templates. Then determine a corresponding template for each of the M sub-templates, and map the M sub-templates into K templates, so as to achieve fine and accurate partitioning of the template.

In S102-A2, the manner for mapping the M sub-templates into K templates according to the weight derivation mode includes but not limited to the following.

Manner 1: M sub-templates are mapped into K templates according to a boundary line of a weight matrix.

Figure 18C:
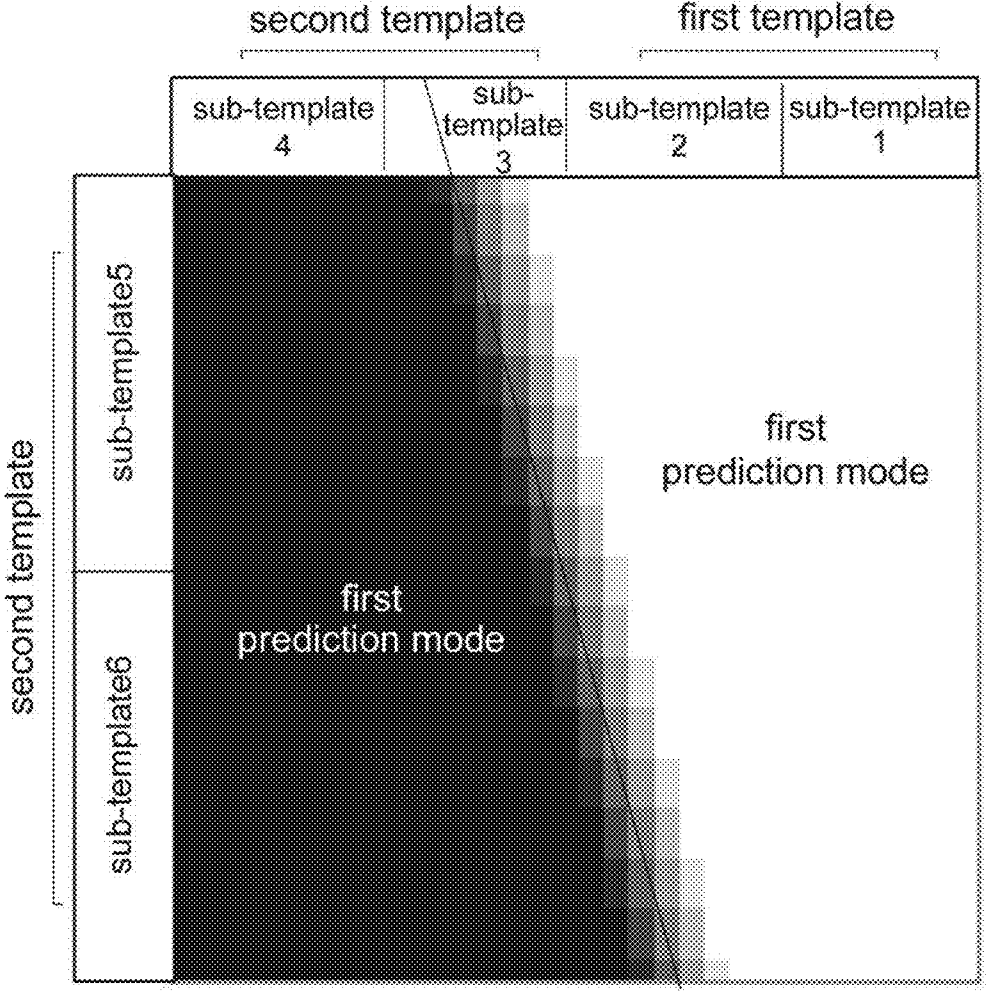

Specially, assuming K=2, the sub-templates that are close to the first prediction mode are mapped to the first template, and the sub-templates that are close to the second prediction mode are mapped to the second template. For example, as shown in FIG. 18C, the top template of the current block is partitioned into 4 sub-templates, namely sub-template 1, sub-template 2, sub-template 3, and sub-template 4, and the left template of the current block is partitioned into 2 sub-templates, namely sub-template 5 and sub-template 6. As illustrated in FIG. 18C, sub-template 1 and sub-template 2 are close to the first prediction mode; therefore, sub-template 1 and sub-template 2 are mapped to the first template. Sub-template 3, sub-template 4, sub-template 5, and sub-template 6 are close to the second prediction mode; hence, they are mapped to the second template. In this way, the first template includes sub-template 1 and sub-template 2, and during template matching, sub-template 1 and sub-template 2 are used as templates to determine the first prediction mode of the current block. Correspondingly, the second template includes sub-template 3, sub-template 4, sub-template 5, and sub-template 6, and during template matching, they are used as templates to determine the second prediction mode of the current block, thereby achieving accurate determination of the first and second prediction modes.

Figure 18D:
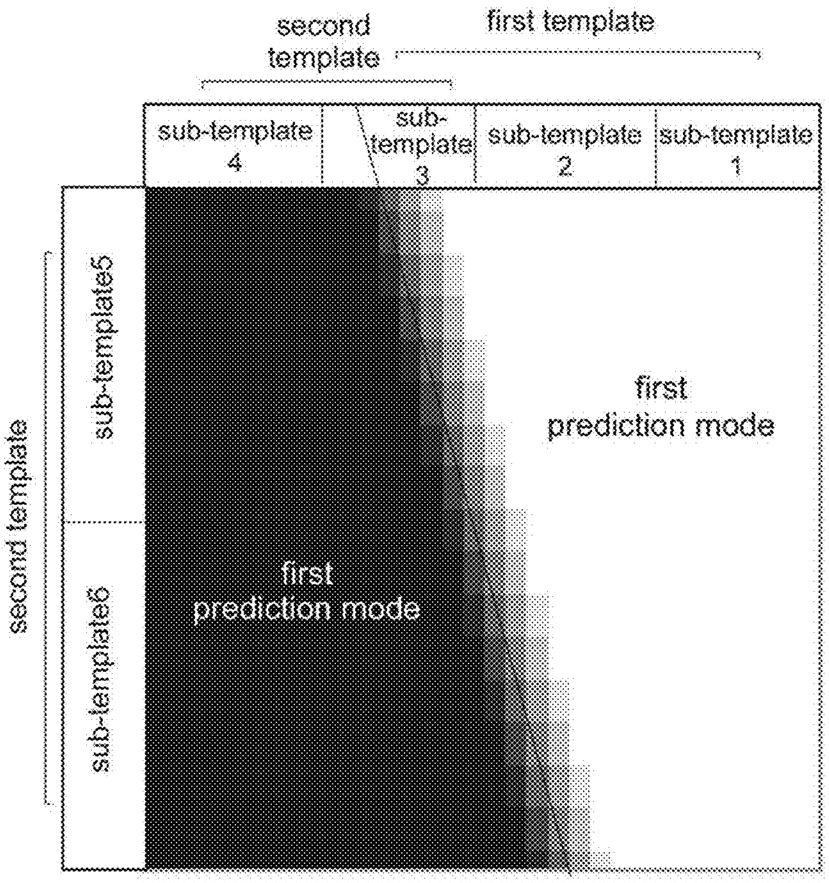

In some embodiments, if the weight boundary line partitions a sub-template into two parts, that sub-template can be mapped to both the first and the second templates, resulting in an overlap between the first and second templates. For example, as illustrated in FIG. 18D, the top template of the current block is partitioned into 4 sub-templates, namely sub-template 1, sub-template 2, sub-template 3, and sub-template 4, and the left template of the current block is partitioned into 2 sub-templates, namely sub-template 5 and sub-template 6. Moreover, the weight boundary line partitions sub-template 3 into two parts, meaning that the weight boundary line intersects with sub-template 3. In this case, in some embodiments, as illustrated in the aforementioned FIG. 18C, sub-template 3 can be mapped to the second template, resulting in the first template and the second template having no overlapping parts. In some embodiments, as illustrated in FIG. 18D, sub-template 3 can be mapped to both the first and the second templates. That is, the first template includes sub-template 1, sub-template 2, and sub-template 3, while the second template includes sub-template 3, sub-template 4, sub-template 5, and sub-template 6. Thus, the first template and the second template have overlapping parts. In this way, during subsequent template matching, Sub-template 3 can be used to determine both the first prediction mode and the second prediction mode, thereby enriching the method of template partitioning.

In some embodiments, if the weight boundary line partitions a sub-template into two parts, the sub-template is defaulted to be mapped to the first or the second template. For example, as shown in FIG. 18C, the weight boundary line partitions sub-template 3 into two parts, and by default, sub-template 3 is mapped to the second template. In a possible implementation, if the weight boundary line partitions a sub-template into two parts, the sub-template is mapped to the smaller of the two templates. For instance, as shown in FIG. 18E, aside from Sub-template 3, the first template includes Sub-template 1 and Sub-template 2, while the second template includes sub-template 4, sub-template 5, and sub-template 6. The area of the second template is significantly larger than that of the first template. To enhance the accuracy of template matching, sub-template 3 is mapped to the smaller first template to increase its area, thereby improving the accuracy of determining the first prediction mode based on the first template.

In some embodiments, the weight boundary line partitions a sub-template into two parts, and if the area of the sub-template in the first prediction mode is larger than the area of the sub-template in the second prediction mode, then the sub-template is mapped to the first template. For example, as shown in FIG. 18C, the area of sub-template 3 in the first prediction mode is larger than its area in the second prediction mode; hence, sub-template 3 is mapped to the first template. Optionally, if the area of the sub-template in the second prediction mode is larger than the area of the sub-template in the first prediction mode, then the sub-template is mapped to the second template.

Manner 2: The M sub-templates are mapped to K templates according to the weights of sample points in the sub-template. Specifically, S102-A2 includes the following steps.

S102-A21, for a $j^{th}$ sub-template in M sub-templates, the weight of a first point in the $j^{th}$ template with respect to the $i^{th}$ prediction mode is determined according to the weight derivation mode, and the $i^{th}$ prediction mode is any of the K prediction modes.

In manner 2, by determining the weights of the sample points within a sub-template, determine which template the sub-template should be assigned to. For instance, if the weights of the sample points in the sub-template are the same as or substantially the same as the weights corresponding to the first prediction mode, then the sub-template is assigned to the first template. Conversely, if the weights of the sample points in the sub-template are the same as or substantially the same as the weights corresponding to the second prediction mode, then the sub-template is assigned to the second template.

Since the process of determining which template each of the M sub-templates corresponds to is the same, for ease of description, embodiments of the disclosure use the $j^{th}$ sub-template among the M sub-templates as an example for illustration. The process of determining which template the other sub-templates correspond to can be done by referring to this $j^{th}$ sub-template.

In some embodiments, the template that the $j^{th}$ sub-template maps to is determined based on the weights of several sample points within the $j^{th}$ sub-template. For instance, the weights of multiple sample points at different locations within the $j^{th}$ sub-template are calculated, and the average weight of these sample points is determined. Based on this average weight, it is determined which template the $j^{th}$ sub-template should be mapped to.

In some embodiments, to reduce computational complexity, the process involves determining the weight of a single sample point within the j-th sub-template, such as the weight of the first sample point. Based on the weight of this first sample point, it is then determined which template the $j^{th}$ sub-template should be mapped to.

In an example, the first point is any point in the $j^{th}$ sub-template.

In an example, the first point is one point on a boundary line between the $j^{th}$ sub-template and the current block. For example, the first point can be any point on the boundary line, or can be the middle point of the boundary line.

In some embodiments, the template that the $j^{th}$ sub-template is to be mapped can be determined by determining the weight of the first point in the $j^{th}$ sub-template with respect to any of the K prediction modes.

In some embodiments, the template that the $j^{th}$ sub-template is to be mapped can be determined by determining the weight of the first point in the $j^{th}$ sub-template with respect to each of the K prediction modes.

The manner for determining the weight of the first point in the $j^{th}$ sub-template with respect to each of the K prediction modes is the same, and in embodiments of the disclosure, determining the weight of the first point with respect to the $i^{th}$ prediction mode is taken as an example for illustration.

In S102-21, the manner for determining the first point in the $j^{th}$ sub-template with respect to the $i^{th}$ prediction mode includes but not limited to the following examples.

In one example, the weight matrix of the current block is extended towards the $j^{th}$ sub-template to ensure that the weight matrix of the current block covers at least the first point within the $j^{th}$ sub-template, thereby obtaining the weight of the first point. For illustrative purposes, let's assume the $j^{th}$ sub-template is sub-template 2, and the first point is the midpoint of the boundary line between sub-template 2 and the current block. The weight matrix shown in FIG. 18D is extended towards Sub-template 2 to cover the first point within sub-template 2, thereby obtaining the weight of the first point with respect to the first prediction mode. Suppose the maximum weight is 8 and the minimum weight is 0. Since the prediction value in the white area of the current block comes 100% from the prediction value corresponding to the first prediction mode, and the prediction value in the black area comes 100% from the prediction value of the second prediction mode, it can be determined that the weight of the first point with respect to the first prediction mode is 8, and the weight of the first point with respect to the second prediction mode is 0.

In another example, the weight of the first point in the $j^{th}$ sub-template with respect to the $i^{th}$ prediction mode is determined through S102-A211 and S102-A212. That is, S102-A21 includes the following steps.

S102-A211, an angle index and a distance index are determined according to the weight derivation mode.

S102-A212, the weight of the first point in the jth sub-template with respect the $i^{th}$ prediction mode is determined according to the angle index and the distance index.

In the implementation, the weight of the first point in the jth sub-template with respect the $i^{th}$ prediction mode is determined according to the weight derivation mode. Specifically, the angle index and the distance index are determined according to the weight derivation mode, where the angle index may be understood as an angle index of a boundary line of each weight derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the weight of the first point in the jth sub-template with respect the $i^{th}$ prediction mode is determined according to the angle index and the distance index.

In some embodiments, S102-A212 includes the following steps.

S102-A2121, a first parameter of a first point is determined according to the angle index, the distance index, and the size of the current block.

S102-A2122, the weight of the first point with respect the $i^{th}$ prediction mode is determined according to the first parameter of the first point.

In this implementation, the weights of points in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

In a possible implementation, an offset and the first parameter may be determined in the following manner.

The template in the following example is applied to Y component, it should be noted that, the template can be applied to any component, such as Y, Cb, Cr or R, G, B components.

The first point is (x, y), and the weight of the first point with respect to the $i^{th}$ prediction mode is derived as follows.

Figure 19:
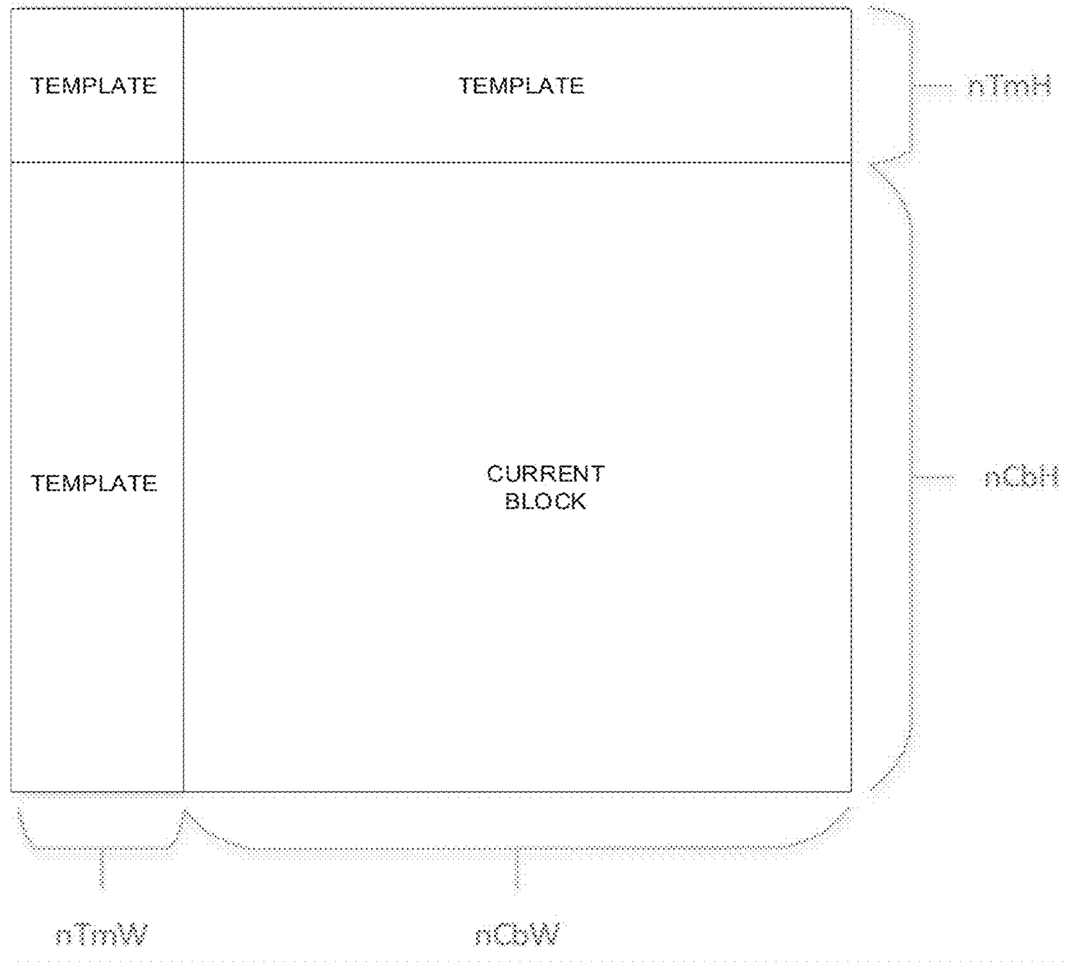
FIG. 19 is a schematic diagram illustrating a size of a template.

Inputs for the process are: the width nCbW of the current block, the height nCbH of the current block, specifically, as illustrated in FIG. 19, a "partition" angle index variable angleIdx of GPM, a distance index variable distanceIdx of GPM, a component index variable cIdx. In the disclosure, luma is taken as an example, and therefore cIdx=0, which indicates the luma component.

Variables nW, nH, shift1, offset1, displacementX, displacementY, partFlip, and shiftHor are derived as follows:

```
nW = ( cIdx = = 0 ) ? nCbW : nCbW * SubWidthC
nH = ( cIdx = = 0 ) ? nCbH : nCbH * SubHeightC
shift1 = Max( 5, 17 − BitDepth ), where BitDepth represents a coding bit
depth;
offset1 = 1 << ( shift1 − 1 )
displacementX = angleIdx
displacementY = ( angleIdx + 8 ) % 32
partFlip = ( angleIdx >= 13 && angleIdx <= 27 ) ? 0 : 1
shiftHor = ( angleIdx % 16 = = 8 | | ( angleIdx % 16 != 0 && nH >=
nW ) ) ? 0 : 1
```

Variables offsetX and offsetY are derived as follows:

```
if shiftHor = 0:
  offsetX = ( −nW ) >> 1
  offsetY = ( ( −nH ) >> 1 ) + ( angleIdx < 16 ? ( distanceIdx * nH ) >>
3 : −( ( distanceIdx * nH ) >> 3 ) )
otherwise (i.e. shiftHor = 1):
  offsetX = ( ( −nW ) >> 1 ) + ( angleIdx < 16 ? ( distanceIdx * nW ) >>
3 : −( ( distanceIdx * nW ) >> 3 )
  offsetY = ( − nH ) >> 1
```

The weight wValue of position (x, y) with respect to the first prediction mode is derived as follows. Where variables xL and yL are derived as follows:

```
xL = ( cIdx = = 0 ) ? x : x * SubWidthC
yL = ( cIdx = = 0 ) ? y : y * SubHeightC
```

disLut is determined according to Table 6;

| idx | 0 | 2 | 3 | 4 | 5 | 6 | 8 | 10 | 11 | 12 | 13 | 14 |
|---|---|---|---|---|---|---|---|---|---|---|---|---|
| disLut[ idx ] | 8 | 8 | 8 | 4 | 4 | 2 | 0 | −2 | −4 | −4 | −8 | −8 |
| Idx | 16 | 18 | 19 | 20 | 21 | 22 | 24 | 26 | 27 | 28 | 29 | 30 |
| disLut[ idx ] | −8 | −8 | −8 | −4 | −4 | −2 | 0 | 2 | 4 | 4 | 8 | 8 |

the first parameter weightIdx of the first point is derived as follows:

```
weightIdx = ( ( ( xL + offsetX ) << 1 ) + 1 ) * disLut[ displacementX ]
  ( ( ( yL + offsetY ) << 1 ) + 1 ) * disLut[ displacementY ]
```

After the first parameter weightIdx of the first point is determined according to the foregoing method, a weight of the first point (x, y) with respect to the $i^{th}$ prediction mode is determined according to weightIdx.

In the disclosure, in S102-A2122, the manner for determining the weight of the first point with respect to the $i^{th}$ prediction mode according to the first parameter of the first point includes, but is not limited to, the following manners.

In one manner, a second parameter of the first point is determined according to the first parameter of the first point, and the weight of the first point with respect to the $i^{th}$ prediction mode is determined according to the second parameter of the first point.

The second parameter is also used for determining weight. In some embodiments, the second parameter is also referred to a weight index of the first component, and the first component can be a chroma component or a luma component.

For example, the weight of the first point with respect to the $i^{th}$ prediction mode is determined according to the following formula:

```
weightIdxL = partFlip ? 32 + weightIdx : 32 − weightIdx
wTemplateValue[x][y] = Clip3( 0, 8, ( weightIdxL + 4 ) >> 3 )
```

Wherein wTemplateValue[x][y] is the weight of the first point (x, y) with respect to the $i^{th}$ prediction mode, weightIdxL is the second parameter of the first point (x, y), and is the weight index of the first point with respect to the first component (such as luma component), partFlip is an intermediate variable and is determined according to angle index angleIdx, as mentioned before, partFlip=(angleIdx>=13 && angleIdx<=27)?0:1, that is, partFlip=1 or 0. If partFlip=0, weightIdxL=32−weightIdx; and if partFlip=1, weightIdxL=32+weightIdx. It should be noted that, 32 herein is merely an example, and the disclosure is not limited thereto.

In another manner: The weight of the first point with respect to the $i^{th}$ prediction mode is determined according to the first parameter of the first point, a first preset value, and a second preset value.

In order to reduce complexity of calculating the weight of the first point, in one manner, the weight of the first point with respect to the $i^{th}$ prediction mode is limited to the first preset value or the second preset value, that is, the weight of the first point with respect to the $i^{th}$ prediction mode is either the first preset value or the second preset value, thereby reducing complexity of calculating the weight of the first point with respect to the $i^{th}$ prediction mode.

The value of each of the first preset value and the second preset value is not limited in the disclosure.

Optionally, the first preset value is 1.

Optionally, the second preset value is 0.

In an example, the weight of the first point with respect to the $j^{th}$ prediction mode may be determined according to the following formula:

```
wTemplateValue[x][y]=(partFlip?weightIdx:−weightIdx)>0?1:0
```

wTemplateValue[x][y] is the weight of the first point (x, y). In the foregoing "1:0", 1 is the first preset value and 0 is the second preset value.

After the weight of the first point in the $j^{th}$ sub-template with respect to the $i^{th}$ prediction mode is determined according to the above method, S102-A22 is performed.

S102-A22, the $j^{th}$ sub-template is mapped to K templates according to the weight of the first point in the $j^{th}$ template with respect to the $i^{th}$ prediction mode.

In this manner, the weight of the first point in the jth sub-template with respect to the $i^{th}$ prediction mode is determined, and the template that the jth sub-template to be mapped to is determined according to the weight of the first point with respect to the $i^{th}$ prediction mode.

In one possible implementation, if the weight of the first point with respect to the $i^{th}$ prediction mode and the weight of the $i^{th}$ prediction mode is the same or substantially the same, the jth sub-template is mapped to the $i^{th}$ template.

In another possible implementation, if the weight of the first point with respect to the $i^{th}$ prediction mode is greater than a first preset value, the jth sub-template is mapped to the $i^{th}$ template, and the $i^{th}$ template is one of the K templates. For example, the weight of the first point in the $j^{th}$ sub-template with respect to the first prediction mode is greater than the first preset value, and the jth sub-template is mapped to a first template. Still another example, the weight of the first point in the jth sub-template with respect to the first prediction mode is less than or equal to the first preset value, and the jth sub-template is mapped to a second template.

The value of the first preset value is not limited.

Optionally, the first preset value is 0.

Optionally, the first preset value is any positive integer less than a median of weight. For example, if the maximum value of the weight is 8, then the median of the weigh is 4.

In some embodiments, if the weight of the first point with respect to the $i^{th}$ prediction mode is greater than the first preset value, and the weight of the first point with respect to the $(i+1)^{th}$ prediction mode is also greater than the first preset value, then the $j^{th}$ sub-template can be mapped to the $i^{th}$ template and also to the $(i+1)^{th}$ template, where the $i^{th}$ template and the $(i+1)^{th}$ template have an overlapping part. Taking K=2 and the first prediction value as 0 as an example, assuming the jth sub-template is sub-template 3 in FIG. 18D, the first point is the midpoint of the lower edge of sub-template 3. According to the above method, it is determined that the weight of the first point with respect to the first prediction mode is greater than 0, and the weight of the first point with respect to the second prediction mode is also greater than 0. At this time, sub-template 3 can be mapped to both the first template and the second template.

In some embodiments, if K=2 and i=1, the aforementioned S102-A22 includes the following examples:

Example 1: If the weight of the first point with respect to the first prediction mode is greater than or equal to the second preset value, then the $j^{th}$ sub-template is mapped to the first template.

For instance, if the second preset value is the median weight, and the maximum weight is 8, then the median weight is 4. If the weight of the first point in the $j^{th}$ sub-template with respect to the first prediction mode is greater than or equal to the median weight, then the $j^{th}$ sub-template is mapped to the first template. Taking sub-template 2 in FIG. 18D as an example, according to the aforementioned method, it is determined that the weight of the first point in sub-template 2 with respect to the first prediction mode is 8, which is greater than the second preset value (for example, 4), thus sub-template 2 can be mapped to the first template.

Example 2: If the weight of the first point with respect to the first prediction mode is less than the second preset value, then the $j^{th}$ sub-template is mapped to the second template.

Taking sub-template 4 in FIG. 18D as an example, according to the aforementioned method, it is determined that the weight of the first point in sub-template 4 with respect to the first prediction mode is 0, which is less than the second preset value (for example, 4), thus sub-template 4 can be mapped to the second template.

The above examples, combined with specific instances, introduce the implementation method for determining K templates based on the weight derivation mode in case 1. For example, by using the boundary line of the weight matrix corresponding to the weight derivation mode, the template of the current block is divided into K templates, or the template of the current block is divided into M sub-templates, and based on the weight derivation mode, the M sub-templates are mapped to the K templates.

In embodiments of the disclosure, in addition to determining K templates according to the method of case 1, the K templates can also be determined in the manner of case 2.

Case 2: S102 includes the following steps.

S102-B1, determining a target first correspondence for the current block from preset first correspondences corresponding to different block sizes, the first correspondence includes a correspondence between K templates and different angle indexes or different weight derivation modes.

S102-B2, determining K templates corresponding to the weight derivation mode from the target first correspondence.

Figure 20A:
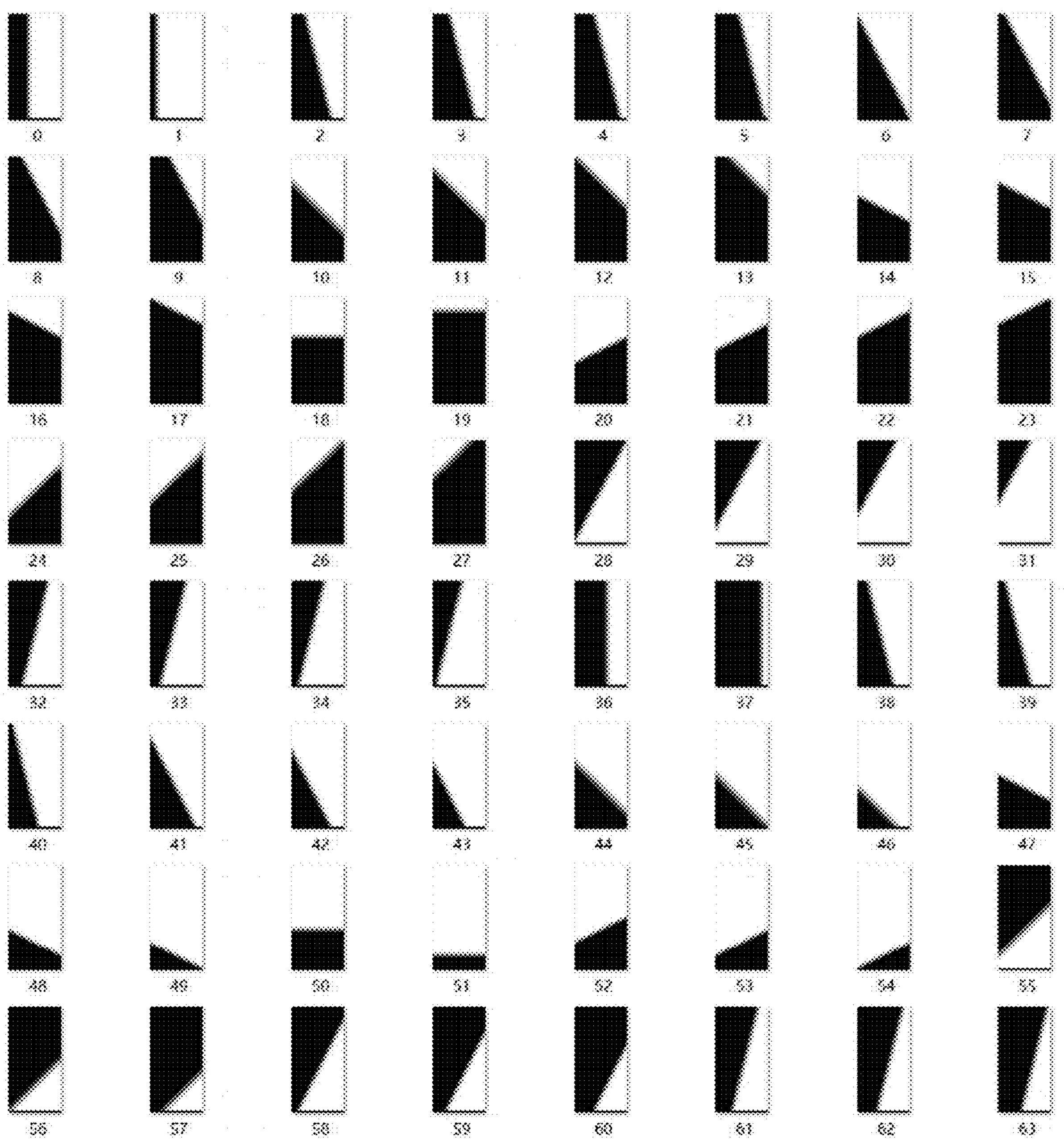
FIG. 20A is a schematic diagram illustrating weight allocation.
Figure 20B:
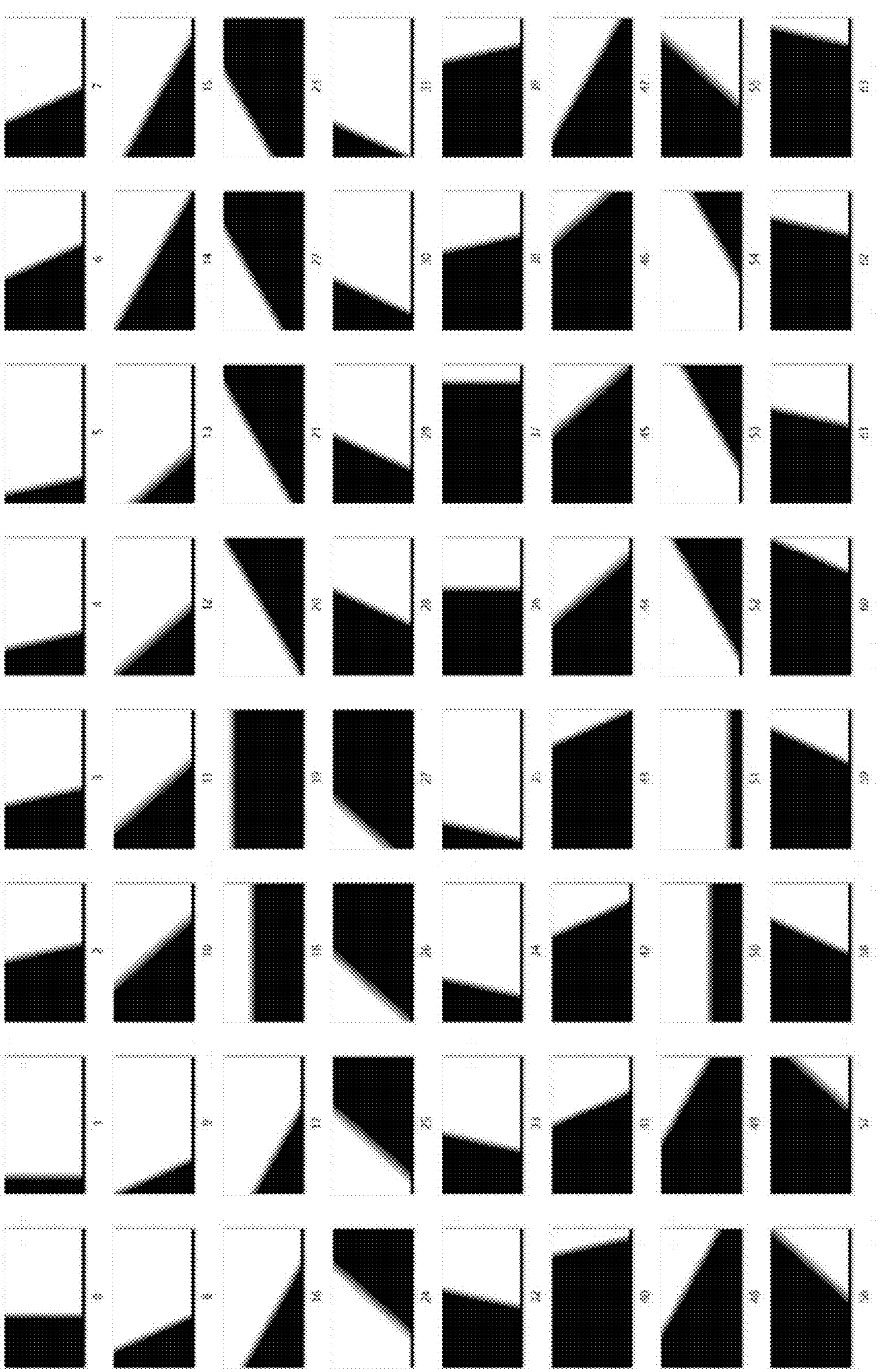
FIG. 20B is another schematic diagram illustrating weight allocation.
Figure 21:
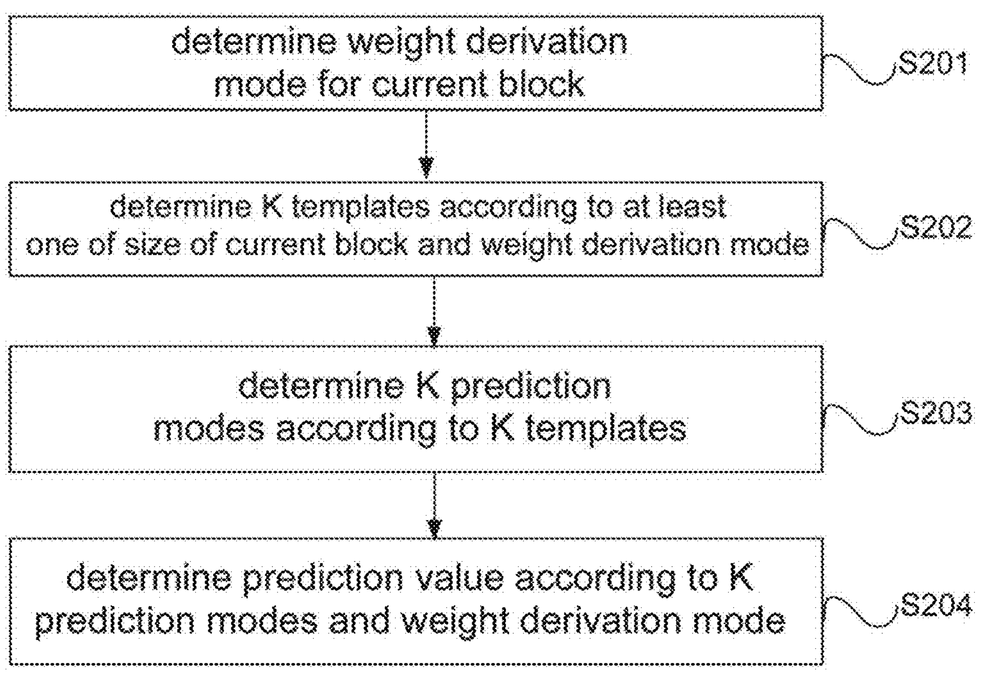
FIG. 21 is a schematic flowchart of a prediction method provided in an embodiment of the disclosure.

Since the current block may be a square or a rectangle, it may have a length greater than its width or vice versa, and the aspect ratios could be 1:2, 1:4, and so on. FIG. 20A and FIG. 20B illustrate the weight matrices of GPM for 32×64 and 64×32 blocks, it can be seen that the for boundary lines corresponding to different shapes, their intersections with the block boundary are different. This is because although the block shape changes, the angle of the boundary line do not change according to the block shape.

For example, the mode with an index of 52 intersects with the left boundary of the current block in a 32×64 block, but it does not intersect with the left boundary in a 64×32 block; instead, the corresponding intersection is on the bottom boundary. This means that in a 32×64 block, the black part of mode 52 is adjacent to the left template of the current block, whereas in a 64×32 block, the black part of mode 52 is not adjacent to the left template of the current block.

To enhance the accuracy of template selection, the embodiment of the disclosure establishes different rules based on the length and width of the current block.

For instance, different first correspondences are set for the following three scenarios: when the length is equal to the width, when the length is greater than the width, and when the length is less than the width. Each first correspondence can be as shown in the aforementioned Table 5, which includes the correspondence between different angle indexes or different weight derivation modes and the K templates for that specific case.

Furthermore, classifications can be made according to the aspect ratio, such as 1:4, 1:2, 1:1, 2:1, 4:1, etc., and a first correspondence is set for each category. This first correspondence includes the correspondence between different angle indexes or different weight derivation modes and the K templates within that category.

In this way, during the decoding process, the decoding end can determine the target first correspondence for the current block based on the size of the current block, such as its length and width, from the preset first correspondences that correspond to different block sizes. Then, based on the weight derivation mode, K templates corresponding to this weight derivation mode can be determined from the target first correspondence.

In some embodiments, if the target first correspondence relationship includes the correspondence between different angle indexes and the K templates, it is necessary to determine the target angle index based on the weight derivation mode. Subsequently, the K templates corresponding to this target angle index can be retrieved from the target first correspondence.

In embodiments of the disclosure, after determining the K templates according to the above steps at the decoding end, the following S103 is performed to determine K prediction modes according to the K templates.

S103, the K prediction modes are determined according to K templates.

In the embodiment of the disclosure, each of the K templates is used to determine a prediction mode. For example, the first template among the K templates is used to determine the first prediction mode, and the second template among the K templates is used to determine the second prediction mode.

The process of determining the corresponding prediction mode using each template from the K templates is consistent in the embodiment of the disclosure. For illustration, the example of using the $i^{th}$ template among the K templates to determine the $i^{th}$ prediction mode is provided below.

S103 includes the following steps S103-A1 to S103-A4.

S103-A1, for $i^{th}$ prediction mode in K prediction modes, at least one candidate prediction mode is obtained.

The at least one candidate prediction mode may be understood as a candidate prediction mode corresponding to the $i^{th}$ prediction mode. In some embodiments, different prediction modes may correspond to different candidate prediction modes. In some embodiments, if two prediction modes are of the same type, for example, the two prediction modes each are an intra prediction mode, the two prediction modes may correspond to the same candidate prediction mode.

In the embodiment of the disclosure, at the decoding end, before determining the $i^{th}$ prediction mode, whether the $i^{th}$ prediction mode is determined through template matching is firstly determined.

In a possible implementation, the bitstream carries flag A, where flag A indicates whether the $i^{th}$ prediction mode is determined through template matching. Exemplarily, if the value of flag A is 1, it indicates that the $i^{th}$ prediction mode is determined through template matching; and if the value of the flag is 0, it indicates that the $i^{th}$ prediction mode is not determined through template matching.

Based on this, at the decoding end, the bitstream is decoded to obtain flag A, and the value of flag A is determined. If the value of flag A is 1, it is determined that the $i^{th}$ prediction mode is determined through template matching. In this case, at the decoding end, the method according to the embodiment of the disclosure is performed, that is, the at least one candidate prediction mode is obtained, a cost of the candidate prediction mode is determined, and the $j^{th}$ prediction mode is determined according to the cost of the candidate prediction mode.

In a possible implementation, both the encoding end and the decoding end determine by default that the $j^{th}$ prediction mode is determined through template matching. In this way, at the decoding end, when determining the $j^{th}$ prediction mode, the $j^{th}$ prediction mode is determined through template matching by default. Then at least one candidate prediction mode is obtained, a cost of the candidate prediction mode is determined, and the $j^{th}$ prediction mode is determined according to the cost of the candidate prediction mode.

In some embodiments, if the $j^{th}$ prediction mode is an inter prediction mode, the at least one candidate prediction mode includes one or more inter prediction modes, for example, includes at least one of skip, merge, a common inter prediction mode, unidirectional prediction, bidirectional prediction, or multi-hypothesis prediction.

In some embodiments, if the $j^{th}$ prediction mode is an intra prediction mode, the at least one candidate prediction mode includes at least one of a DC mode, a planar mode, or an angular mode. Optionally, the at least one candidate prediction mode includes an intra prediction mode in an MPM list.

In some embodiments, the at least one candidate prediction mode may further include modes such as IBC, palette, etc.

There is no limitation on the type(s) and the number of prediction modes in the at least one candidate prediction mode in the disclosure.

Optionally, the at least one candidate prediction mode is a preset mode.

Optionally, the at least one candidate prediction mode is a mode in the MPM list.

Optionally, the at least one candidate prediction mode is a set of candidate prediction modes determined according to some rules, such as equidistant selection.

S103-A2, a prediction value(s) of the $i^{th}$ template is obtained by predicting the $i^{th}$ template with the candidate prediction mode.

Exemplarily, for each candidate prediction mode in the at least one candidate prediction mode, the $i^{th}$ template is predicted with the candidate prediction mode to determine the prediction value of the $i^{th}$ template.

In some embodiments, the prediction value of the $i^{th}$ template can also be understood as a matrix composed of the prediction values of each sample within the $i^{th}$ template.

S103-A3, a cost of the candidate prediction mode is determined according to the prediction value of the $i^{th}$ template and a reconstructed value of the $i^{th}$ template.

Exemplarily, for each candidate prediction mode in the at least one candidate prediction mode, the cost of the candidate prediction mode is determined according to a prediction value of each candidate prediction mode with respect to the $i^{th}$ template and the reconstructed value of the template. For example, a loss of the candidate prediction mode with respect to the $i^{th}$ template is determined according to the prediction value of the candidate prediction mode with respect to the $i^{th}$ template and the reconstructed value of the $i^{th}$ template, and the cost of the candidate prediction mode is determined according to the loss of the candidate prediction mode with respect to the $i^{th}$ template.

In some embodiments, determining the cost of the candidate prediction mode in S103-A3 includes the following.

Manner I: The cost of the candidate prediction mode is determined by means of a matrix. Specifically, a loss sample is determined according to the prediction value of the candidate prediction mode with respect to the $i^{th}$ template and the reconstructed value of the $i^{th}$. Since the prediction value of the candidate prediction mode with respect to the $i^{th}$ template are matrices, the loss sample obtained is a matrix, for example, an absolute value of a difference between the prediction value of the candidate prediction mode with respect to the $i^{th}$ template is determined as the loss sample. Then, the cost of the candidate prediction mode with respect to the $i^{th}$ template is determined according to the loss sample, for example, the sum of the loss of each point in the loss sample is determined as the cost of the candidate prediction mode with respect to the $i^{th}$ template.

Manner II: The cost of the candidate prediction mode is determined on a point basis, that is, the foregoing S103-A32 includes the following.

S103-A321, for an $i^{th}$ point in the $i^{th}$ template, a loss between an $i^{th}$ prediction value corresponding to the $i^{th}$ point in the prediction value of the $i^{th}$ template and an $i^{th}$ reconstructed value corresponding to the $i^{th}$ point in the reconstructed value of the $i^{th}$ template is determined.

S103-A322, a cost of the candidate prediction mode at the $i^{th}$ point is determined according to the loss corresponding to the $i^{th}$ point.

S103-A323, the cost of the candidate prediction mode is determined according to costs of the candidate prediction mode at points in the $i^{th}$ template.

The $i^{th}$ point may be understood as any point in the template, that is, the process of determining a cost at each point in the $i^{th}$ template is the same, and reference can be made to the $i^{th}$ point. Specifically, the prediction value of the candidate prediction mode with respect to the $i^{th}$ template is obtained by predicting the $i^{th}$ template with the candidate prediction mode, the prediction value corresponding to the $i^{th}$ point in the prediction value of the $i^{th}$ template is recorded as an $i^{th}$ prediction value, and the reconstructed value corresponding to the $i^{th}$ point in the reconstructed value of the $i^{th}$ template is recorded as an $i^{th}$ reconstructed value. Then, the loss of the candidate prediction mode at the $i^{th}$ point is determined according to the $i^{th}$ prediction value and the $i^{th}$ reconstructed value. The cost of the candidate prediction model at the $i^{th}$ point is determined based on the loss of the candidate prediction model at the $i^{th}$ point, for example, by setting the loss of the candidate prediction model at the $i^{th}$ point as the cost of the candidate prediction model at the $i^{th}$ point. According to the above method, cost of the candidate prediction mode at each point or at multiple points in the $i^{th}$ template is determined, and then the cost of the candidate prediction mode with respect to the $j^{th}$ template is determined according to the cost at each point or the multiple points in the $i^{th}$ template. For example, a sum of costs of the candidate prediction mode at points in the $i^{th}$ template is determined as the cost of the candidate prediction mode with respect to the $i^{th}$ template, or an average value of costs of the candidate prediction mode at points in the $i^{th}$ template is determined as the cost of the candidate prediction mode with respect to the $i^{th}$ template. Determination of the cost of the candidate prediction mode respect to the $i^{th}$ template according to the cost at at least one point in the $i^{th}$ template is not limited in the disclosure.

Exemplarily, taking an SAD cost as an example, the cost of the candidate prediction mode at the $i^{th}$ point (x, y) in the $i^{th}$ template may be determined according to the following formula (1):

--- tempValueA[x][y]= abs(predTemplateSamplesCandA[x][y]−recTemplateSamples[x][y]) (1)

---

Exemplarily, the cost of the candidate prediction mode is determined according to the following formula (2):

$$costCandA = \sum tempValueA[x][y] \quad (2)$$

abs(predTemplateSamplesCandA[x][y]−recTemplateSamples[x][y]) is an absolute value of a difference between the prediction value predTemplateSamplesCandA of point (x, y) in the $i^{th}$ template and a reconstructed value recTemplateSamples. The absolute value of the difference is referred to as the cost corresponding to point (x, y). tempValueA[x][y] may be considered as the cost of the candidate prediction mode at point (x, y). A total cost costCandA of the candidate prediction mode in the $i^{th}$ template is a sum of a cost at each sample in the $i^{th}$ template.

It should be noted that, the cost of the candidate prediction mode is determined exemplarily according to the SAD. Optionally, the cost of the candidate prediction mode with respect to the $i^{th}$ template may also be determined according to cost calculation methods such as SATD and MSE.

According to the foregoing method, the cost of the candidate prediction mode with respect to the $i^{th}$ template may be determined, and then the following step S103-A4 is performed.

S103-A4, the $i^{th}$ prediction mode is determined according to the cost of the at least one candidate prediction mode.

In the embodiment of the disclosure, if the $i^{th}$ prediction mode is determined through template matching, then according to the foregoing method, a cost of the candidate prediction mode is determined, and the $i^{th}$ prediction mode is determined according to the cost of the candidate prediction mode.

Example 1: A candidate prediction mode with the minimum cost among the at least one candidate prediction mode is determined as the $i^{th}$ prediction mode.

Example 2: One or more candidate prediction modes are selected from the at least one candidate prediction mode according to the cost of the candidate prediction mode, and the $j^{th}$ prediction mode is determined from the one or more candidate prediction modes.

In a possible implementation of example 2, at the decoding end, one candidate prediction mode is selected from the one or more candidate prediction modes as the $j^{th}$ prediction mode.

Specifically, the $i^{th}$ prediction mode is determined from the one or more candidate prediction modes according to an indication from the encoding end. For example, the number of the one or more candidate prediction modes is M, and the encoding end sorts the M candidate prediction modes according to costs. For example, the M candidate prediction modes are sorted in an ascending order of cost, or the M candidate prediction modes are sorted in a descending order of cost. One candidate prediction mode B is determined from the sorted M candidate prediction modes as the $i^{th}$ prediction mode. Then, at the encoding end, an identifier of candidate prediction mode B is signalled into the bitstream, where the identifier of candidate prediction mode B may be a sequence number of candidate prediction mode B in the M candidate prediction modes, or may be a mode index number of candidate prediction mode B. In this way, at the decoding end, the identifier of candidate prediction mode B is obtained by decoding the bitstream, and then according to the identifier of candidate prediction mode B, a candidate prediction mode corresponding to the identifier of candidate prediction mode Bin the M determined candidate prediction modes is determined as the $i^{th}$ prediction mode.

In another possible implementation of example 2, at the decoding end, an alternative prediction mode of the current block is obtained, a cost for predicting the $i^{th}$ template with the alternative prediction mode is determined, and according to the cost of the candidate prediction mode when predicting the $i^{th}$ template and the cost of the above one or more candidate prediction modes with respect to the $i^{th}$ template, one prediction mode is selected from the alternative prediction mode and the one or more candidate prediction modes as the $j^{th}$ prediction mode.

Optionally, the alternative prediction mode of the current block includes one or more of a prediction mode of a reconstructed coding block neighbouring the current block and/or a preset prediction mode.

It can be understood that, in the disclosure, the preset prediction mode may include one or more of multiple different modes such as a DC mode, a bilinear mode, and a planar mode.

Specifically, at the decoding end, the alternative prediction mode of the current block is obtained, for example, one or more of the prediction mode of a reconstructed coding block neighbouring the current block and/or the preset prediction mode is taken as the alternative prediction mode of the current block. Then, a cost for predicting the template with each alternative prediction mode is determined, for example, the current block is predicted with the alternative prediction mode to obtain a prediction value, and the prediction value is compared with the reconstructed value of the template to obtain a cost of the alternative prediction mode, where the cost of the alternative prediction mode may be a cost such as an SAD or an SATD. According to the cost of the alternative prediction mode and costs of the one or more candidate prediction modes, one prediction mode is selected from the alternative prediction mode and the one or more candidate prediction modes as the $j^{th}$ prediction mode, for example, a prediction mode with the minimum cost among the alternative prediction mode and the one or more candidate prediction modes is determined as the $j^{th}$ prediction mode.

It should be noted that, the alternative prediction mode of the current block is different from the one or more candidate prediction modes determined. That is, at the decoding end, a prediction mode which is the same as the one or more candidate prediction modes is removed from the prediction mode of a reconstructed coding block neighbouring the current block and/or the preset prediction mode, and the rest of the prediction modes is determined as the alternative prediction mode of the current block.

It can be understood that, for inter prediction, during template matching, "searching" may be performed on the basis of initial motion information. For each prediction mode, one motion information needs to be determined.

Some pieces of motion information may be determined within a certain range around the initial motion information, so as to determine some prediction modes. For example, one initial motion information is given, where a motion vector thereof is (xInit, yInit). A search range is set, for example, a rectangular region from xInit−sR to xInit+sR in a horizontal direction and from yInit−sR to yInit+sR in a vertical direction, where sR may be 2, 4, 8, etc. Each motion vector in the rectangular region may be combined with other information, such as a reference picture index and a prediction list flag, of the initial motion information to determine one motion information, thereby determining one prediction mode. The at least one candidate prediction mode may include the determined prediction mode. For example, if GPM is used in a merge mode and the first prediction mode is determined through template matching, merge_gpm_idx0 may be used to determine one initial motion information from mergeCandList. Then (2*sR+1)*(2*sR+1) pieces of motion information are determined according to the foregoing method, so as to determine some prediction modes, where these prediction modes each are a merge mode or are referred to as a template matching-based merge mode.

It should be noted that, if a set consisting of the at least one candidate prediction mode includes a large number of prediction modes, considering complexity, cost determination may not be performed for each candidate prediction mode in the at least one candidate prediction mode. In some embodiments, the process of determining the $j^{th}$ prediction mode according to the cost of the at least one candidate prediction mode may be extended to several rounds of processes from coarse selection to fine selection. For example, in an inter prediction mode, the motion vector supports fractional-sample accuracy, such as ¼, ⅛, or 1/16 accuracy. Therefore, a prediction mode with the lowest cost among a prediction mode with an integer-sample motion vector may be firstly chosen, and then a prediction mode with the lowest cost is selected from the prediction mode chosen and a prediction mode with a fractional-sample motion vector whose motion vector is near a motion vector of the mode chosen. For example, in an intra prediction mode, one or more intra prediction modes are firstly selected at a certain granularity according to the cost of the candidate prediction mode, and then screening is performed on the one or more intra prediction modes and neighbouring intra prediction modes of finer granularity.

In the embodiment of the disclosure, if the $i^{th}$ prediction mode in the K prediction modes is determined through template matching, at least one candidate prediction mode is obtained, a prediction value of the template in the candidate prediction mode is obtained by predicting the template with the candidate prediction mode, the cost of the candidate prediction mode is obtained according to a prediction value of the template and a reconstructed value of the template in the candidate prediction mode, and the $j^{th}$ prediction mode is obtained according to the cost of the candidate prediction mode.

In the foregoing embodiment, the process of determining the $i^{th}$ prediction mode in the K prediction modes is taken as an example for illustration, and the process of determining other prediction modes in the K prediction modes is consistent with the process of determining the $i^{th}$ prediction mode, and reference can be made thereto. For example, K=2. The first prediction mode and the second prediction mode are determined according to the method. Then, at the decoding end, the first prediction value is obtained according to the first prediction mode, the second prediction value is obtained according to the second prediction mode, and the first prediction value and the second prediction value are weighted to obtain a new prediction value.

According to the embodiment of the disclosure, K prediction modes can be determined according to K templates and can be used for prediction of the current block to obtain the prediction value of the current block, for details, refer to step S104.

S104, a prediction value is determined according to the K prediction modes and the weight derivation mode.

Specifically, weights are determined according to the weight derivation mode, K prediction values are determined according to the K prediction modes, the K prediction values are weighted according to the weights, and a weighted result is determined as the final prediction value.

In the disclosure, the weight derivation mode is used to determine weights for weighting the prediction values of the current block. Specifically, the weight derivation mode may be a mode for deriving the weights. For a block of a given length and width, each weight derivation mode may be used to derive one weight matrix. For blocks of the same size, weight matrices derived from different weight derivation modes may be different.

Exemplarily, in the disclosure, there are 56 weight derivation modes for AWP in AVS3 and 64 weight derivation modes for GPM in VVC.

It can be understood that, in the embodiment of the disclosure, at the decoding end, when determining the prediction value based on the K prediction modes and the weights, for each of the K prediction modes, the corresponding prediction value for each prediction mode can be determined, then, the prediction values for each mode are weighted to obtain the final prediction value. For example, if K=2, use the first prediction mode to determine the first prediction value and the second prediction mode to determine the second prediction value. Subsequently, weights can be applied to the first and second predicted values to calculate the final predicted value through weighting computation.

In some embodiments, the foregoing prediction process is performed on a sample basis, and accordingly, the weight is a weight corresponding to a sample. In this case, when predicting the current block, sample A in the current block is predicted with each of the K prediction modes, so as to obtain K prediction values at sample A for the K prediction modes; the K prediction values are weighted according to weights of sample A so as to obtain a final prediction value of sample A. The foregoing steps are performed on each sample in the current block, and a final prediction value of each sample in the current block can be obtained, where the final prediction value of each sample in the current block forms a final prediction value of the current block. For example, K=2, sample A in the current block is predicted with the first prediction mode, to obtain a first prediction value of sample A; sample A is predicted with the second prediction mode, to obtain a second prediction value of sample A; and the first prediction value and the second prediction value are weighted according to weights corresponding to sample A, to obtain a final prediction value of sample A.

In an example, for example, K=2, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to prediction weights to obtain a new prediction value. For example, sample A is predicted with the first intra prediction mode to obtain a first prediction value of sample A, sample A is predicted with the second intra prediction mode to obtain a second prediction value of sample A, and the first prediction value and the second prediction value are weighted according to prediction weights corresponding to sample A, so as to obtain the final prediction value of sample A.

In some embodiments, if the $i^{th}$ prediction mode in the K prediction modes is an inter prediction mode, determining the prediction value according to the K prediction modes and the weight derivation mode includes the following steps.

S104-AB21, motion information is determined according to the $i^{th}$ prediction mode.

S104-AB22, a $i^{th}$ prediction value is determined according to the motion information.

S104-AB23, (K−1) prediction values are determined according to prediction modes other than the $i^{th}$ prediction mode in the K prediction modes.

S104-AB24, weights are determined according to the weight derivation mode.

S104-AB25, a prediction value is determined according to the $i^{th}$ prediction value, the (K−1) prediction values, and the weights.

For example, K=2, if the first prediction mode is an intra prediction mode and the second prediction mode is an inter prediction mode, the intra prediction mode is used for prediction to obtain a first prediction value, the inter prediction mode is used for prediction to obtain a second prediction value, and the first prediction value and the second prediction value are weighted according to prediction weights to obtain a new prediction value. In this example, the intra prediction mode is used for prediction of each sample in the current block, so as to obtain a prediction value of each sample in the current block, and the prediction value of each sample in the current block constitutes a first prediction value of the current block. The inter prediction mode is used to determine motion information, a best matching block of the current block is determined according to the motion information, and the best matching block is determined as a second prediction value of the current block. With regard to prediction weights of each sample in the current block, the first prediction value and the second prediction value of the current block are weighted on a sample basis, so as to obtain a new prediction value of the current block. For example, for sample A in the current block, a first prediction value corresponding to sample A in the first prediction value of the current block and a second prediction value corresponding to sample A in the second prediction value of the current block are weighted according to prediction weights of sample A, so as to obtain a final prediction value of sample A.

In some embodiments, if K>2, prediction weights of two prediction modes in the K prediction modes may be determined according to the weight derivation mode, and a prediction weight(s) of other prediction mode(s) in the K prediction modes may be a preset value(s). For example, K=3, a prediction weight of the first prediction mode and a prediction weight of the second prediction mode are derived according to the weight derivation mode, and a prediction weight corresponding to a third prediction mode is a preset value. In some embodiments, if a total prediction weight of corresponding to the K prediction modes is constant, for example, is 8, a prediction weight of each of the K prediction modes may be determined according to a preset weight proportion. Assuming that the prediction weight of the third prediction mode accounts for ¼ of the total prediction weight, it may be determined that the prediction weight of the third prediction mode is 2, and the remaining ¾ of the total prediction weight is allocated to the first prediction mode and the second prediction mode. Exemplarily, if a prediction weight of the first prediction mode derived according to the weight derivation mode is 3, it is determined that the prediction weight of the first prediction mode is (¾)*3, and the prediction weight of the second prediction mode is (¾)*5.

In some embodiments, at the decoding end, before performing the method in the embodiment of the disclosure, whether template matching is applicable to the current block needs to be determined. If it is determined at the decoding end that template matching is applicable to the current block, steps S101 to S104 are performed. If it is determined at the decoding end that template matching is not applicable to the current block, the K prediction modes are determined in other manners.

Exemplarily, at the decoding end, whether template matching is applicable to the current block is determined in the following manners.

Manner I: At the decoding end, whether template matching is applicable to the current block is determined according to the number of points includes in the K templates.

Since a current coding order is from left to right and from top to bottom, a template that is available for the current block is on the left and the top of the current block, while the right and the bottom are unavailable, and the top-right and the bottom-left are available in some cases but unavailable in other cases. It can be noted that in some weight derivation modes of GPM, a corresponding template or a reconstructed neighbouring region does not exist for a prediction mode. For example, in a weight matrix with a GPM index of 55, 56, or 57 for a square block, a white area in the weight matrix exists only at a bottom-right corner, and there is no template neighbouring the white area directly or there is no reconstructed region neighbouring the white area. In addition, there are also some modes for which there is a directly neighbouring template or a neighbouring reconstructed region, but the neighbouring region is very small, such as a white area in a weight matrix with a GPM index of 59, or 60 for a square block. In the embodiment of the disclosure, a template neighbouring the current block directly or a reconstructed region neighbouring the current block directly is referred to as an available region. If there is no available region or the available region is very small, application of template matching or texture characteristics to a corresponding prediction mode will lead to adverse effect in addition to failure to improve compression efficiency. The reason is that this prediction mode is different from characteristics of the whole or most of a template or a neighbouring reconstructed region.

That is, in the embodiment of the disclosure, template matching or texture characteristics of neighbouring reconstructed samples is applied to a prediction mode with a relatively large available template, and is not applied to a prediction mode with a relatively small available template. For example, in FIG. 17B, an available template corresponding to the first prediction mode is a white area and a gray area in the template, and an available template corresponding to the second prediction mode is a black area and a gray area in the template. It can be seen from FIG. 17B that if the available template corresponding to the first prediction mode is large, for example, greater than a preset value, it is determined at the decoding end that template matching is applicable to the first prediction mode. Similarly, it can be seen from FIG. 17B that if the available template corresponding to the second prediction mode is relatively large, for example, greater than a preset value, it is determined at the decoding end that template matching is also applicable to the second prediction mode.

In a possible implementation, whether template matching is applicable to the current block may be determined according to the number of points included in the K templates.

In an example, if the number of points included in each of the K templates is greater than a preset threshold, it is determined that template matching is applicable to the current block, and then step S103 is performed to determine the K prediction modes according to the K templates.

Optionally, the preset threshold may be 0.

Optionally, the preset threshold is a median value of weigh, for example, 4.

Optionally, the preset threshold is a fixed value.

Optionally, the preset threshold is determined according to the size of the current block, for example, 1/m1 of the total number of samples in the current block, where m1 is a positive number.

Optionally, the preset threshold is determined according to the size of the template of the current block, for example, 1/m2 of the total number of points in the template of the current block, where m2 is a positive number.

In another example, if the number of points included in at least one of the K templates is less than the preset threshold, the K prediction modes is determined according to the weight derivation mode.

In the embodiment of the disclosure, at the decoding end, after determining the K templates according to at least one of the size of the current block and the weight derivation mode according to the above step S102, whether template matching is applicable to the current block is determined according to the number of points included in the K templates. Exemplarily, for the $i^{th}$ template in the K templates, if the number of samples included in the $i^{th}$ template is greater than the preset threshold, it indicates that an available template for determining the ith prediction mode in the $i^{th}$ template is large, and if the $i^{th}$ prediction mode is determined through the $i^{th}$ template, prediction effect may be improved. if the number of samples included in the $i^{th}$ template is less than the preset threshold, it indicates that an available template for determining the $i^{th}$ prediction mode in the $i^{th}$ template is small or does not exit. In this case, if the $i^{th}$ prediction mode is determined through template matching, it will lead to adverse effect in addition to failure to improve compression efficiency.

Manner II: At the decoding end, the bitstream is decoded to obtain a first flag, where the first flag indicates whether to use template matching to derive a prediction mode; and whether to use template matching to derive a prediction mode for the current block is determined according to the first flag.

In manner II, if the first flag is signalled into the bitstream at the encoding end, the first flag indicates whether to use template matching to derive the prediction mode for the current block. If it is determined at the encoding end that template matching is used to derive the prediction mode for the current block, the first flag is set to 1, and the first flag set to 1 is signalled into the bitstream. If it is determined at the encoding end that template matching is not used to derive the prediction mode for the current block, the first flag is set to 0, and the first flag set to 0 is signalled into the bitstream. In this way, at the decoding end, after obtaining the bitstream, the first flag is obtained by decoding the bitstream, and whether to use template matching to derive the prediction mode for the current block is determined according to the first flag.

Exemplarily, if the first flag indicates to use template matching to derive the prediction mode, the K prediction modes are determined according to the weight derivation mode. For example, at the decoding end, the bitstream is decoded to obtain the first flag, and if the value of the first flag is 1, it is determined at the decoding end that template matching is to be used to derive the prediction mode for the current block, and then S102 is performed to determine the K prediction modes according to the weight derivation mode.

Exemplarily, if the first flag indicates not to use template matching to derive the prediction mode, the at least one of the K prediction modes of the current block is determined according to the weight derivation mode. For example, at the decoding end, the bitstream is decoded to obtain the first flag. If the value of the first flag is 0, it is determined at the decoding end that template matching is not to be used to derive the prediction mode for the current block, and then the K prediction modes are determined in other manners, for example, the at least one of the K prediction modes of the current block is determined according to the weight derivation mode.

In the disclosure, the positions where the weight values change form a straight line (or curved line), or in the blending area as illustrated in FIG. 4 and FIG. 5, the positions where the weight values are the same form a straight line (or curved line). Such straight line may be called a boundary line (or partition lien or segmentation line). The boundary line itself also has an angle. The angle horizontal to the right may be set to 0 degrees, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a block, the corresponding texture is likely to show different characteristics on two sides of the boundary line, such as textures with two different angles on two sides of the boundary line respectively, or an angular texture on one side of the boundary line and a flat texture on the other side of the boundary line. Since the boundary line itself also has an angle, it may be assumed that the boundary line is obtained through angular prediction with a point, which may be close to some textures of the current block, so there is correlation between this straight line and the two prediction modes for the current block.

Specifically, in the disclosure, assuming that the boundary line is obtained through angular prediction with a point, at least one angular prediction mode may be found, which may be used to approximately create the boundary line. For example, a horizontal boundary line matches a horizontal prediction mode, such as mode 18 in VVC. A vertical boundary line matches a vertical intra prediction mode, such as mode 50 in VVC. A 45-degree boundary line may match a 45-degree intra prediction mode from bottom-left to top-right such as mode 66 in VVC, or a 225-degree intra prediction mode from top-right to bottom-left such as mode 2 in VVC. Thus, the weight derivation mode may match some intra prediction mode(s).

It should be noted that, in the disclosure, the weight derivation mode may also be the index of the weight, for example, the 56 modes of AWP may be considered as 56 weight derivation modes, and the 64 modes of GPM in VVC may be considered as 64 weight derivation modes.

In some embodiments, in addition to the intra angular prediction mode corresponding to the weight boundary line, some intra angular prediction modes related to the weight boundary line are also more likely to be used, such as intra prediction modes corresponding to angles near the boundary line or perpendicular to the boundary line.

In some embodiments, if the K prediction values each are obtained by predicting with an intra prediction mode, K different intra prediction modes should be used in GPM.

In some embodiments, if at least one of the K prediction values is obtained by predicting with an intra prediction mode and at least one of the K prediction values is obtained by predicting with another prediction method, one or a small number of intra prediction modes need to be used in GPM. In this case, a smaller range of intra prediction modes may be provided for GPM to select from, thus saving overhead of a flag indicating which intra prediction mode is selected.

In some embodiments, in GPM, one prediction value is derived from intra prediction, and another prediction value is derived from inter prediction. Assume the intra prediction mode used in the disclosure is determined according to the weight derivation mode by default. For example, if the boundary line of the weight derivation mode is in the horizontal direction, such as modes with indexes 18, 19, 50, and 51 of GPM as illustrated in FIG. 4, the intra prediction mode is determined to be the horizontal mode 18. For another example, if the boundary line of the weight derivation mode is in the vertical direction, such as modes with indexes 0, 1, 36, and 37 of GPM as illustrated in FIG. 4, the intra prediction mode is determined to be the vertical mode 50.

In other words, in the disclosure, before determining the at least one of the K prediction modes according to the weight derivation mode, types of the K prediction modes need to be determined. The prediction mode can be determined according to the weight derivation mode only if the prediction mode is an intra prediction mode.

Based on the above, before determining the at least one of the K prediction modes according to the weight derivation mode, the method in the embodiment of the disclosure further includes the following.

Step 11-0, the bitstream is decoded to obtain a type flag, where the type flag indicates whether the K prediction modes each are an intra prediction mode.

Step 11-1, types of the K prediction modes are determined according to the type flag.

Hereinafter, K=2 is taken as an example.

Exemplarily, if the value of the type flag is a first value, it indicates that the first prediction mode and the second prediction mode are inter prediction modes. In this case, mode0IsInter=1, mode1IsInter=1, where mode0IsInter indicates whether the first prediction mode is an inter prediction mode, and mode1IsInter indicates whether the second prediction mode is an inter prediction mode. If the first prediction mode is an inter prediction mode, mode0IsInter=1. If the second prediction mode is an inter prediction mode, mode1IsInter=1.

Exemplarily, if the value of the type flag is a second value, it indicates that the first prediction mode is an intra prediction mode and the second prediction mode is an inter prediction mode, and in this case, mode0IsInter=0 and mode1IsInter=1.

Exemplarily, if the value of the type flag is a third value, it indicates that the first prediction mode is an inter prediction mode and the second prediction mode is an intra prediction mode, and in this case, mode0IsInter=1 and mode1IsInter=0.

Exemplarily, if the value of the type flag is a fourth value, it indicates that the first prediction mode and the second prediction mode are intra prediction modes, and in this case, mode0IsInter=0 and mode1IsInter=0.

The value of each of the first value, the second value, the third value, and the fourth value is not limited in the disclosure.

Optionally, the first value is 0.

Optionally, the second value is 1.

Optionally, the third value is 2.

Optionally, the fourth value is 3.

In an example, the type flag may be represented by the field "intra_mode_idx".

In the disclosure, at the encoding end, after determining the type of the first prediction mode and the type of the second prediction mode according to the type flag, the type flag needs to be signalled into the bitstream during encoding. At the decoding end, the bitstream is decoded to obtain the type flag, and the type of the first prediction mode and the type of the second prediction mode are determined according to the type flag.

Optionally, in the manner as illustrated in Table 4, merge_gpm_partition_idx is the weight derivation mode or a weight derivation index, intra_mode_idx is the type flag, merge_gpm_idx0 is an index value of $1^{st}$ motion information in a candidate list, and merge_gpm_idx1 is an index value of $2^{nd}$ motion information in the candidate list.

In the disclosure, at the decoding end, after determining the type of K prediction modes according to the type flag, if at least one of the K prediction modes is an intra prediction mode, the intra-frame prediction mode is determined according to the weight derivation mode.

That is, in the disclosure, an intra prediction mode is determined according to the weight derivation mode. For example, if the first prediction mode and the second prediction mode are intra prediction modes, the first prediction mode and the second prediction mode are determined according to the weight derivation mode. For another example, if one of the first prediction mode and the second prediction mode is an intra prediction mode, the intra prediction mode is determined from the first prediction mode and the second prediction mode according to the weight derivation mode.

In the disclosure, the manner for determining the at least one of the K prediction modes according to the weight derivation mode includes, but is not limited to, the following manners.

Manner I: If the at least one of the K prediction modes is an intra prediction mode, an angle index is determined according to the weight derivation mode, and an intra prediction mode corresponding to the angle index is determined as one of the K prediction modes.

The angle index indicates an angle index of a boundary line of weights.

In some embodiments, the angle index is represented by the field "angleIdx".

Table 2 above shows a correspondence between merge_gpm_partition_idx and angleIdx. With reference to Table 2, the angle index may be derived according to the weight derivation mode.

In the disclosure, there is a correspondence between angle indices and intra prediction modes, that is, different angle indices correspond to different intra prediction modes.

Exemplarily, the correspondence between angle indices and intra prediction modes is that as illustrated in Table 7.

TABLE 7

| angleIdx | Intra prediction mode |
|---|---|
| 0 | 50 |
| 2 | 42 |
| 3 | 38 |
| 4 | 34 |
| 5 | 30 |
| . . . | . . . |

In manner I, taking K=2 as an example, if the first prediction mode or the second prediction mode is an intra prediction mode, the angle index is determined according to the weight derivation mode, for example, the angle index corresponding to the weight derivation mode is derived according to Table 2. Then, the intra prediction mode corresponding to the angle index is determined according to Table 7 above, for example, the angle index is 2, and the intra prediction mode corresponding to the angle index is 42, and then the intra prediction mode 42 is determined as the first prediction mode or the second prediction mode.

Manner II: If the at least one of the K prediction modes is an intra prediction mode, an intra prediction mode corresponding to the weight derivation mode is determined, and the at least one of the K prediction modes is determined from the intra prediction mode corresponding to the weight derivation mode.

In manner II, taking K=2 as an example, if the first prediction mode and/or the second prediction mode is an intra prediction mode, the first prediction mode and/or second prediction mode is determined from the intra prediction mode corresponding to the weight derivation mode. For example, the first second prediction mode and/or the second prediction mode may be an intra prediction mode that is on or near the same line as a weight partition line (also known as the boundary line). Alternatively, the first prediction mode and/or second prediction mode may be an intra prediction mode that is perpendicular or near perpendicular to the weight partition line. For example, if the weight boundary line is horizontal, such as mode 18, 19, 50, or 51 in GPM in FIG. 4, the first prediction mode and/or second prediction mode may be horizontal mode 18 and vertical mode 50.

As can be seen from the above, there are many types of intra prediction modes corresponding to the weight derivation mode, including an intra prediction mode parallel to the boundary line of weights, an intra prediction mode perpendicular to the boundary line, and the like. In the disclosure, a flag(s) may be used to indicate which mode in the intra prediction modes corresponding to the weight derivation mode is selected as an intra prediction mode in the first prediction mode and/or the second prediction mode.

Exemplarily, taking K=2 as an example, if the first prediction mode is an intra prediction mode, a second flag is used to indicate a correspondence between the first prediction mode and the intra prediction modes corresponding to the weight derivation mode. For example, the second flag indicates that the first prediction mode is the intra prediction mode parallel to the boundary line of weights, or indicates that the first prediction mode is the intra prediction mode perpendicular to the boundary line of weights.

Exemplarily, if the second prediction mode is an intra prediction mode, a third flag is used to indicate a correspondence between the second prediction mode and the intra prediction modes corresponding to the weight derivation mode. For example, the third flag indicates that the second prediction mode is the intra prediction mode parallel to the boundary line of weights, or indicates that the second prediction mode is the intra prediction mode perpendicular to the boundary line of weights.

Based on this, in manner II, the manner for determining the first prediction mode and/or the second prediction mode according to the intra prediction mode corresponding to the weight derivation mode includes, but is not limited to, the following examples.

Example 1, if the first prediction mode is an intra prediction mode, the second flag is obtained, and an intra prediction mode corresponding to the second flag in the intra prediction modes corresponding to the weight derivation mode is determined as the first prediction mode.

Example 2, if the second prediction mode is an intra prediction mode, the third flag is obtained, and an intra prediction mode corresponding to the third flag in the intra prediction modes corresponding to the weight derivation mode is determined as the second prediction mode.

In some embodiments, the intra prediction mode corresponding to the weight derivation mode includes at least one of the intra prediction mode parallel to the boundary line of weights or the intra prediction mode perpendicular to the boundary line.

Optionally, if the second flag has a fifth value, such as 0, it indicates that the first prediction mode is the intra prediction mode parallel to the boundary line of weights in the intra prediction modes corresponding to the weight derivation mode. If the second flag has a sixth value, such as 1, it indicates that the first prediction mode is the intra prediction mode perpendicular to the boundary line of weights in the intra prediction modes corresponding to the weight derivation mode.

Optionally, if the third flag has the fifth value, such as 0, it indicates that the second prediction mode is the intra prediction mode parallel to the boundary line of weights in the intra prediction modes corresponding to the weight derivation mode. If the third flag has the sixth value, such as 1, it indicates that the second prediction mode is the intra prediction mode perpendicular to the boundary line of weights in the intra prediction modes corresponding to the weight derivation mode.

In some embodiments, the intra prediction mode corresponding to the weight derivation mode includes at least one of: the intra prediction mode parallel to the boundary line of weights, the intra prediction mode perpendicular to the boundary line, or a planar mode.

Optionally, if the second flag has the fifth value, such as 0, it indicates that the first prediction mode is the intra prediction mode parallel to the boundary line of weights in the intra prediction modes corresponding to the weight derivation mode. If the second flag has the sixth value, such as 1, it indicates that the first prediction mode is the intra prediction mode perpendicular to the boundary line of weights in the intra prediction modes corresponding to the weight derivation mode. If the second flag has a seventh value, such as 2, it indicates that the first prediction mode is the planar mode.

Optionally, if the third flag has the fifth value, such as 0, it indicates that the second prediction mode is the intra prediction mode parallel to the boundary line of weights in the intra prediction modes corresponding to the weight derivation mode. If the third flag has the sixth value, such as 1, it indicates that the second prediction mode is the intra prediction mode perpendicular to the boundary line of weights in the intra prediction modes corresponding to the weight derivation mode. If the third flag has the seventh value, such as 2, it indicates that the second prediction mode is the planar mode.

In an example, the field "intra_gpm_idx0" is used to represent the second flag.

In an example, the field "intra_gpm_idx1" is used to represent the third flag.

In the disclosure, if the first prediction mode is an intra prediction mode, the first prediction mode is determined according to the second flag as described above. If the second prediction mode is an intra prediction mode, the second prediction mode is determined according to the third flag as described above.

Exemplarily, the second flag (intra_gpm_idx0) and/or the third flag (intra_gpm_idx1) are those as illustrated in Table 8.

TABLE 8

| | |
|---|---|
| { | |
| merge_gpm_partition_idx[x0][y0] | ae(v) |
| intra_mode_idx[x0][y0] | ae(v) |
| if( mode0IsInter ) | |
| merge_gpm_idx0[x0][y0] | ae(v) |
| if( (!mode0IsInter && mode1IsInter) \|\| (MaxNumGpmMergeCand > 2 && mode0IsInter && mode1IsInter)) | |
| merge_gpm_idx1[x0][y0] | ae(v) |
| if(! mode0IsInter) | |
| intra_gpm_idx0[x0][y0] | ae(v) |
| if(! mode1IsInter) | |
| intra_gpm_idx1[x0][y0] | ae(v) |
| } | |

At the decoding end, the bitstream illustrated in Table 8 is decoded to obtain the second flag and/or the third flag, the first prediction mode is determined according to the second flag and/or the second prediction mode is determined according to the third flag, and then a prediction value is determined according to the first prediction mode, the second prediction mode, and weights.

In some embodiments, if the first prediction mode and the second prediction mode each are an intra prediction mode, the second flag and the third flag have different values. To ensure that the value of the second flag is different from the value of the third flag, a feasible way is to set the value of the second flag (intra_gpm_idx1) to be 0 or 1, and if intra_gpm_idx1 is greater than intra_gpm_idx0, intra_gpm_idx1 is incremented by 1.

With reference to the foregoing method, the at least one of K prediction modes is determined according to the weight derivation mode, the K preset values are weighted, and a final prediction value is obtained.

In the prediction method provided in the embodiment of the disclosure, at the decoding end, the bitstream is decoded to determine the weight derivation mode of the current block, the K templates are determined according to at least one of the size of the current block and the weight derivation mode, K prediction modes are determined according to the K templates, and the prediction value is determined according to the K prediction modes and the weight derivation mode. That is, in the disclosure, the K templates are determined based on the size of the current block and/or the weight derivation mode, as such, the K templates determined are more in line with the actual situation. When using the K templates to determine the prediction modes, the accuracy of prediction mode determination can be improved, and accurate prediction of the current block can be realized with the accurately determined K prediction modes.

A decoding end is taken as an example above to introduce the prediction method in the disclosure, and an encoding end is taken as an example for illustration below.

FIG. 19 is a schematic flowchart of a prediction method according to an embodiment of the disclosure. The embodiment of the disclosure is applied to the video encoder illustrated in FIG. 1 and FIG. 2. As illustrated in FIG. 19, the method according to the embodiment of the disclosure includes the following.

S201, a weight derivation mode of a current block is determined.

It should be noted that, in the disclosure, the weight derivation mode is used to determine a weight used for the current block. Specifically, the weight derivation mode may be a mode for deriving a weight. For a block of a given length and width, each weight derivation mode may be used to derive one weight matrix. For blocks of the same size, weight matrices derived from different weight derivation modes may be different.

Exemplarily, in the disclosure, AWP has 56 weight derivation modes, and GPM has 64 weight derivation modes.

In the disclosure, the manner in which the weight derivation mode of the current block is determined at the encoding end includes, but is not limited to, the following manners.

Manner 1: The weight derivation mode is a default mode, for example, at the encoding end, it is determined by default that the weight derivation mode is a weight derivation mode with an index of 44.

Manner 2: The weight derivation mode is determined according to a cost. For example, at the encoding end, all possible combinations of K prediction modes and the weight derivation mode are attempted, where K is a positive integer and K>1, and a weight derivation mode corresponding to the minimum cost is selected and determined as the weight derivation mode of the current block.

Taking K=2 as an example, the K prediction modes include a first prediction mode and a second prediction mode. Assuming that there are 66 available prediction modes, then there are 66 possibilities for the first prediction mode, and since the second prediction mode is different from the first prediction mode, there are 65 possibilities for the second prediction mode. Assuming that there are 64 weight derivation modes (taking GPM as an example), then in the disclosure, any two different prediction modes and any one weight derivation mode may be used, and there are totally 66×65×64 possibilities. If it is specified that a PCM prediction mode is not used, there are 65×64×63 possibilities. As can be seen, in the disclosure, the prediction modes that can be selected from and the number of weight derivation modes that can be used may also be restricted, and then the number of such possible combinations is reduced accordingly.

Further, in the embodiment of the disclosure, the encoding end may perform cost calculation on all the possible combinations to determine a combination with the minimum cost.

If K=2, each combination includes K prediction modes and one weight derivation mode.

Optionally, in order to reduce the time consumption of cost calculation, preliminary selection may be made on all the foregoing possible combinations, for example, preliminary selection is made by using an SAD, an SATD, etc. as an approximate cost to determine a specified number of combinations of the candidate prediction mode, and the weight derivation mode. Then, cost calculation may be used for fine selection, to determine a combination of one prediction mode and weight derivation mode with the minimum cost. In this way, the number of attempts is reduced by using some fast algorithms during preliminary selection. For example, if an angular prediction mode leads to high cost, several neighbouring prediction modes of the prediction mode will not be attempted.

In some embodiments, at the encoding end, before determining the weight derivation mode of the current block, whether to use K different prediction modes for weighted prediction of the current block needs to be determined. If it is determined at the encoding end that K different prediction modes are used for weighted prediction of the current block, the foregoing S201 is performed to determine the weight derivation mode of the current block.

In a possible implementation, at the encoding end, whether to use K different prediction modes for weighted prediction of the current block may be determined by determining a prediction mode parameter of the current block.

Optionally, in an implementation of the disclosure, the prediction mode parameter may indicate whether a GPM mode or an AWP mode can be used for the current block, that is, indicate whether K different prediction modes can be used for prediction of the current block.

It can be understood that, in the embodiment of the disclosure, the prediction mode parameter may be understood as a flag bit indicating whether the GPM mode or the AWP mode is used. Specifically, the encoder may use a variable as the prediction mode parameter, so that the prediction mode parameter may be set by setting a value of the variable. Exemplarily, in the disclosure, if the GPM mode or the AWP mode is used for the current block, the encoder may set a value of the prediction mode parameter to indicate that the GPM mode or the AWP mode is used for the current block. Specifically, the encoder may set the value of the variable to 1. Exemplarily, in the disclosure, if the GPM mode or the AWP mode is not used for the current block, the encoder may set the value of the prediction mode parameter to indicate that the GPM mode or the AWP mode is not used for the current block. Specifically, the encoder may set the value of the variable to 0. Further, in the embodiments of the disclosure, after setting of the prediction mode parameter is completed, the encoder may signal the prediction mode parameter into a bitstream and transmit the bitstream to a decoder, so that the decoder can obtain the prediction mode parameter after parsing the bitstream.

It should be noted that, in the embodiment of the disclosure, the GPM mode or the AWP mode is a prediction method. Specifically, K different prediction modes are determined for the current block, K prediction values are determined according to the K different prediction modes, and then weights are determined to combine the K prediction values according to the weights, so as to obtain a new prediction value.

It should be noted that, there is no limitation on the types of the foregoing K different prediction modes in embodiments of the disclosure.

FIG. 15 is a schematic diagram illustrating prediction of the current block by using two prediction modes. As illustrated in FIG. 15, when predicting the current block, the first prediction mode may be used to determine the first prediction value, the second prediction mode may be used to determine the second prediction value, and then the first prediction value and the second prediction value may be combined based on weights, so as to obtain a new prediction value.

In some embodiments, limitations may be imposed on a size of the current block when applying the GPM mode or the AWP mode.

In embodiments of the disclosure, the GPM mode or the AWP mode may not be used for blocks with certain sizes in the embodiment of the disclosure. Therefore, in the disclosure, at the encoding end, a size parameter of the current block may be firstly determined, and then whether to use the GPM mode or the AWP mode for the current block is determined according to the size parameter.

Further, in the embodiments of the disclosure, limitation on the size of a block for which the GPM mode or the AWP mode can be used may also be implemented through limitations on the sample parameter.

Exemplarily, in the disclosure, a flag at a picture level may be used to determine whether the disclosure is applied to the current encoding picture. For example, it may be configured that the disclosure is applied to an intra frame (such as I frame) but is not applied to an inter frame (such as B frame or P frame). Alternatively, it may be configured that the disclosure is applied to the inter frame but is not applied to the intra frame. Alternatively, it may be configured that the disclosure is applied to some inter frames but is not applied to other inter frames. Since intra prediction may be used for an inter frame, the disclosure may be applied to an inter frame.

In some embodiments, a flag below the picture level but above a CU level (such as tile, slice, patch, LCU, etc.) may be used to determine whether the disclosure is applied to that region.

Implementation of S201 may refer to S101 and will not be repeated herein.

S202, K templates are determined according to at least one of the size of the current block and the weight derivation mode.

K is a positive integer greater than 1.

There is no limitation on the shape of the template of the current block in the disclosure.

In some embodiments, the template of the current block includes at least one of a top encoded region and a left encoded region of the current block.

Optionally, a width of the top encoded region is the same as a width of the current block, a height of the left encoded region is the same as a height of the current block.

Currently, template partitioning is not fine enough, and as a result, if a prediction mode is determined based on a template that is not fine enough, prediction mode determination will be inaccurate and prediction error will be high.

In order to solve the technical problem, in the disclosure, fine partitioning of the templates is achieved according to at least one of the size of the current block and the weight derivation mode. The process of determining the K templates according to at least one of the size of the current block and the weight derivation mode in S202 will be detailed below with reference to the method proposed in the following case 1 and case 2.

Case 1: a finer partitioning of template can be achieved with aid of the weight derivation mode. Specifically, S202 includes the following steps.

S202-A, the template of the current block id partitioned into K templates according to the weight derivation mode.

The manner for partitioning the template of the current block into K templates according to the weight derivation mode in S202-A includes but not limited to the following.

Manner 1: The template of the current block is partitioned into K templates according to the boundary line of a weight matrix corresponding to the weight derivation mode.

For example, as illustrated in FIG. 17A, in the disclosure, a boundary line of a weight matrix corresponding to the weight derivation mode of the current block is extended to a template of the current block for template partitioning. For example, K=2, a template to the right of the boundary line is referred to as a first template, and a template to the left of the boundary line is referred to as a second template. The first template corresponds to the first prediction mode, the second prediction mode corresponds to the second template During template matching, the first template may be used to derive the first prediction mode, and the second template may be used to derive the second prediction mode, thereby determining a prediction mode accurately and improving encoding effect.

In some embodiments, the first template and the second template partitioned according to the above method may not be rectangular. For example, as illustrated in FIG. 17A, the first template and the second template each have an oblique edge, and cost calculation for an irregular template is relatively complex.

In order to reduce complexity of template matching, in some embodiments, the first template and the second template can be partitioned into rectangles.

In some embodiments, if K>2, the template portioned according to the weight derivation mode can be further partitioned according to a preset partitioning mode. For example, K=3, take the templates obtained after partitioning according the weigh derivation as an example, the left template can be partitioned into two parts, for example, the lower part of the left template is partitioned into a third template, the remaining upper part of the left template and the left part of the original top template is partitioned into a second template, and the left part of the top template is partitioned into a first template, as such, the template of the current block is partitioned into three templates.

In manner 1, the template of the current block is partitioned into K templates according to the boundary line of the weight matrix, which is simple and can realize accurate template partitioning.

In some embodiments, the template of the current block can be partitioned into K templates in the following manner 2.

Manner 2: S202-A includes the following S202-A1 and S202-A2.

S202-A1, the template of the current block is partitioned into M sub-templates, S202-A2, the M sub-templates are mapped to K templates according to the weight derivation mode.

In Manner 2, the template of the current block is partitioned into multiple sub-templates, such as partitioned into M sub-templates, then determine the template that each sub-template mapped to, thus achieve partitioning of the K templates.

The manner for sub-template partitioning is not restricted in embodiments of the disclosure.

In a possible implementation 1 of Manner 2, S202-A1 includes: the template of the current block is partitioned into M sub-templates.

Example 1: a weight matrix is determined according to a weight derivation mode, the weight matrix is extended to a template of the current block, for example, extended leftwards and upwards to cover the template of the current block. For example, as illustrated in FIG. 17D, the template of the current block includes the left region and the top region of the current block, and a bottom-right rectangular region is the current block. The weight matrix of the current block is extended to the template of the current block to cover the template of the current block, as such, the template of the current block can be partitioned into M sub-templates according to the coverage status of the template of the current block by the weight matrix.

Exemplary, in FIG. 17D, the black template on the left is partitioned into a first sub-template, and the black template on the top is partitioned into a second sub-template, the grey template on the top is partitioned into a third sub-template, and the white template on the top is partitioned into a fourth sub-template.

The shape of the M sub-template is not limited herein.

In some embodiments, in the above Example 1, the M sub-templates are rectangles in shape to reduce the complexity of subsequent pattern matching calculations.

Example 2, a weight boundary line is determined according to the weight derivation mode, the boundary line is extended to the template of the current block, to partition the template of the current block into M sub-templates.

Specifically, the weight boundary line is determined according to the weight derivation mode, the boundary line is extended to the template of the current block to partition the top template of the current block into two parts. As such, M sub-templates can be determined according to the templates obtained through partitioning according to the weight boundary line.

In some embodiments, the first template and the second template partitioned according to the above method may not be rectangular. In order to reduce the computational complexity of template matching, in some embodiments, the boundary line is extended to the template of the current block to obtain the extended line of the boundary line in the template of the current block; the template of the current block is partitioned into M rectangular sub templates with the extended line. For example, as shown in FIG. 17G, the first and second sub templates are partitioned into rectangles with the extended line.

In Manner 2, in addition to partitioning the template of the current block into M sub-templates according to the weight derivation mode, the template of the current block can also be partitioned into M sub-templates in following implementation 2. As detailed below.

In possible implementation 2 in Manner 2, the template of the current block is partitioned into M sub-templates according to a preset rule, that is, S202-A1 includes the following steps.

S202-A11, the top template of the current block is partitioned into P sub-templates; and/or S202-A12, the left template of the current block is partitioned into Q sub-templates. Where P and Q are integers less than or equal to M, and the sum of P and Q equals to M.

In the present embodiment, the template of the current block includes several rows of encoded samples on the top of the current block and several columns of encoded samples on the left of the current block. For ease of description, in embodiments of the disclosure, the rows of encoded samples on the top of the current block is referred to as the top template of the current block, and the columns of encoded samples on the left of the current block is referred to as the left template of the current block. In some embodiments, the template of the current block also includes an encoded area in the upper left corner of the current block, and/or includes an encoded area in the lower left corner of the current block, etc. The embodiment does not limit the specific template of the current block. The embodiment mainly illustrates the partitioning of the top template and the left template of the template of the current block as an example.

In implementation 2, the manner for partitioning the top template of the current block into P sub-templates and/or partitioning the left template of the current block into Q sub-templates is not limited, for example, the partitioning can be equal partitioning, or can be done according to a preset proportion, or according to a preset number of samples, or according to a preset number of sample rows or columns.

In some embodiments, in S202-A11, the manner in which the left template of the current block is partitioned into P sub-templates includes but not limited to the following.

Manner 1: the top template is partitioned into P sub-templates along a vertical direction.

In one example, the top template of the current block is evenly partitioned into equal P parts along the vertical direction.

In another example, the top template of the current block is partitioned into P sub templates along the vertical direction according to a preset sub-template ratio.

Manner 2: the top template is partitioned into P sub-templates according to a preset number of samples.

In Manner 2, the top template of the current block is partitioned into P sub-templates by using a preset number of samples as a minimum partition unit. The arrangement of the preset number of samples is not limited herein.

In some embodiments, with n columns of samples being a minimum partition unit, the top template is partitioned into P sub-templates, n is a positive integer.

The value of n is not limited, for example, n can be a preset value.

Optionally, the length of the top template of the current block is the same as the length of the current block, as such, n can be determined according to the length of the current block. For example, the length of the current block is a positive multiple of n. For example, the length of the current block is 16, and n can be 2, 4, 8, or other values.

In embodiments of the disclosure, if the left template of the current block needs to be partitioned, the manner for partitioning the left template of the current block can be the same as or different from the manner for partitioning the top template of current block.

In some embodiments, in S202-A11, the manner in which the left template of the current block is partitioned into Q sub-templates includes but not limited to the following.

Manner 1: the left template is partitioned into Q sub-templates along the horizontal direction.

In one example, the left template of the current block is evenly partitioned into equal Q parts along the horizontal direction.

In another example, the left template of the current block is partitioned into Q sub templates along the horizontal direction according to a preset sub-template ratio.

Manner 2: the left template is partitioned into Q sub-templates according to a preset number of samples.

In Manner 2, the left template of the current block is partitioned into Q sub-templates by using a preset number of samples as a minimum partition unit.

In some embodiments, with m rows of samples being a minimum partition unit, the left template is partitioned into Q sub-templates, m is a positive integer.

The value of n is not limited, for example, m can be a preset value.

Optionally, the width of the left template of the current block is the same as the width of the current block, as such, m can be determined according to the width of the current block. For example, the width of the current block is a positive multiple of m. For example, the width of the current block is 16, and n can be 2, 4, 8, or other values.

As such, after the template of the current block is partitioned into M sub-templates, S202-A2 is performed, that is, the M sub-templates are mapped to K templates according to the weight derivation mode.

In embodiments of the disclosure, the template of the current block is partitioned into multiple sub-templates according to the above step first, for example, the template of the current block is partitioned into M sub-templates. Then, the template that each of the M sub-templates mapped to is determined, and the M sub-templates are mapped to the K templates, so as to achieve fine and accurate template partitioning.

In S202-A2, the manner in which the M sub-templates are mapped to the K templates according to the weight derivation mode includes but not limited to the following.

Manner 1: the M sub-templates are mapped to K templates according to a boundary line of a weight matrix.

In some embodiments, if the weight boundary line partitions a sub template into two parts, the sub template can be mapped to the first template and the second template by default. At this time, the first template and the second template have overlapping parts.

In some embodiments, if the weight boundary line partitions a sub template into two parts, the sub template can be mapped to the first template or the second template by default.

In some embodiments, if the weight boundary line partitions a sub template into two parts, and if the region of the sub-template in a first prediction mode is greater than the region of the sub-template in a second prediction mode, the sub-template is mapped to the first template.

Manner 2: M sub-templates are mapped to K templates according to the weight of samples in the sub-template. Specifically, S202-A2 includes the following.

S202-A21, for $j^{th}$ sub-template in the M sub-templates, determine the weight of a first point in the $j^{th}$ sub-template with respect to an $i^{th}$ prediction mode according to the weight derivation mode, where the $i^{th}$ prediction mode is any one of the K prediction modes.

In manner 2, determine the template to which the sub-template is partitioned by determining the weight of the samples in the sub-template. For example, if the weight of the samples in the sub-template is the same or basically the same as the weight corresponding to the first prediction mode, the sub-template is mapped to the first template. If the weight of the samples in the sub-template is the same or basically the same as the weight corresponding to the second prediction mode, the sub-template is mapped to the second template.

Since the process of determining which template each sub-template maps to in the M sub-templates is the same, for ease of description, in embodiments of the disclosure, the $j^{th}$ sub-template in the M sub-templates is taken as an example for illustration. The process of determining which template other sub templates map to can refer to the $j^{th}$ sub-template.

In some embodiments, the template that the $j^{th}$ sub-template maps to can be determined according to weights of several samples in the $j^{th}$ sub-template.

In some embodiments, in order to reduce computational complexity, the weight of one sample, for example, a first point in the $j^{th}$ sub-template, is determined, and the template that the jth sub-template maps to is determined according to the weight of the first point.

In an example, the first point is any point in the $j^{th}$ sub-template.

In an example, the first point is one point on the boundary line between the $j^{th}$ sub-template and the current block. For example, the first point is any point on the boundary line, or can be the middle point of the boundary line.

In some embodiments, the template that the $j^{th}$ sub-template maps to can be determined by determining the weight of the first point in the $j^{th}$ sub-template with respect to any prediction mode in the K prediction modes.

In some embodiments, the template that the $j^{th}$ sub-template maps to can be determined by determining the weight of the first point in the $j^{th}$ sub-template with respect to each prediction mode in the K prediction modes.

The manner for determining the weight of the first point in the $j^{th}$ sub-template with respect to each prediction mode in the K prediction modes is the same for each prediction mode, here determining the weight of the first point with respect to the $i^{th}$ prediction mode is taken as an example.

In the above S202-A21, the manner for determining the first point in the $j^{th}$ sub-template with respect to the $i^{th}$ prediction mode includes but not limited to the following examples.

In one example, the weight matrix of the current block is extended to the template of the $j^{th}$ sub-template, in such a manner that the weight matrix of the current block at least covers the first point in the $j^{th}$ sub-template, then the weight of the first point can be obtained.

In another example, the first point in the jth sub-template with respect to the $i^{th}$ prediction mode is determined in S202-A211 and S202-A212, that is, S202-A21 includes the following steps.

S202-A211, an angle index and a distance index are determined according to a weight derivation mode.

S202-A212, the weight of the first point in the $j^{th}$ sub-template with respect to the $i^{th}$ prediction mode is determined according to the angle index and the distance index.

In this implementation, the weight of the first point in the $j^{th}$ sub-template with respect to the $i^{th}$ prediction mode is derived according to the weight derivation mode. Specifically, the angle index and the distance index are firstly determined according to the weight derivation mode, where the angle index may be understood as an angle index of a boundary line of each weight derived from the weight derivation mode. Exemplarily, the angle index and the distance index corresponding to the weight derivation mode may be determined according to Table 2 above. For example, if the weight derivation mode is 27, a corresponding angle index is 12 and a corresponding distance index is 3. Then, the weight of the first point in the $j^{th}$ sub-template with respect to the $i^{th}$ prediction mode is determined according to the angle index and the distance index.

In some embodiments, S202-A212 includes the following steps.

S202-A2121, a first parameter of a first point is determined according to the angle index, the distance index, and the size of the current block.

S202-A2122, the weight of the first point with respect to the $i^{th}$ prediction mode is determined according to the first parameter of the first point.

In this implementation, the weight of points in the template is determined according to the angle index, the distance index, the size of the template, and a size of the current block, and then a weight matrix formed by a weight of each sample in the template is determined as the template weight.

The first parameter of the disclosure is used to determine a weight. In some embodiments, the first parameter is also referred to as a weight index.

After the first parameter weightIdx of the first point is determined, a weight of the first point (x, y) with respect to the $i^{th}$ prediction mode is determined according to weightIdx.

In the disclosure, the manner for determining the weight of the first point with respect to the $i^{th}$ prediction mode according to the first parameter of the first point in S202-A2122 is not limited to the following manners.

In one manner, a second parameter of the first point is determined according to the first parameter of the first point, and the weight of the first point with respect to the $i^{th}$ prediction mode is determined according to the second parameter of the first point.

The second parameter is also used for determining a weight. In some embodiments, the second parameter is also referred to as a weight index for a first component, and the first component may be a luma component, a chroma component, or the like.

For example, the weight of the first point with respect to the $i^{th}$ prediction mode is determined according to the following formula:

```
weightIdxL = partFlip ? 32 + weightIdx : 32 − weightIdx
wTemplateValue[x][y] = Clip3( 0, 8, ( weightIdxL + 4 ) >> 3 )
```

wTemplateValue[x][y] is the weight of the first point (x, y) with respect to the $i^{th}$ prediction mode. weightIdxL is the second parameter of the first point (x, y), partFlip is an intermediate variable, and is determined according to the angle index angleIdx, for example, partFlip=(angleIdx>=13 && angleIdx<=27)?0:1 as described above, that is, partFlip=1 or 0. If partFlip=0, weightIdxL=32−weightIdx; and if partFlip=1, weightIdxL=32+weightIdx. It should be noted that, 32 herein is merely an example, and the disclosure is not limited thereto.

In another manner, the weight of first point with respect to the $i^{th}$ prediction mode is determined according to the first parameter of the first point, a first preset value, and a second preset value.

In order to reduce complexity of calculating the weight of the first point, in a manner, the weight of the first point with respect to the $i^{th}$ prediction mode is limited to the first preset value or the second preset value, that is, the weight of the first point with respect to the $i^{th}$ prediction mode is either the first preset value or the second preset value, thereby reducing complexity of calculating the weight of the first point with respect to the $i^{th}$ prediction mode.

The value of each of the first preset value and the second preset value is not limited in the disclosure.

Optionally, the first preset value is 1.

Optionally, the second preset value is 0.

In an example, the weight of the first point with respect to the $j^{th}$ prediction mode may be determined according to the following formula:

$$wTemplateValue[x][y]=(partFlip?weightIdx:-weightIdx)>0?1:0$$

wTemplateValue[x][y] is the weight of the first point (x, y). In the foregoing "1:0", 1 is the first preset value and 0 is the second preset value.

According to the above method, after determining the weight of the first point in the $j^{th}$ sub-template with respect to the $i^{th}$ prediction mode, the following S202-A22 is performed.

S202-A22, according to the weight of the first point in the $j^{th}$ sub-template with respect to the $i^{th}$ prediction mode, the $i^{th}$ sub-template is mapped to K templates.

In this manner, the weight of the first point in the $j^{th}$ sub-template with respect to the $i^{th}$ prediction mode is determined, and the template that the $j^{th}$ sub-template maps to is determined according to the weight of the first point with respect to the $i^{th}$ prediction mode.

In one possible implementation, if the weight of the first point with respect to the $i^{th}$ prediction mode is the same or substantially the same as the weight of the $i^{th}$ prediction mode, the $j^{th}$ sub-template is mapped to the $i^{th}$ template.

In another possible implementation, if the weight of the first point with respect to the $i^{th}$ prediction mode is greater than the first preset value, the $j^{th}$ sub template is mapped to the $i^{th}$ template, which is one of the K templates. For example, if the weight of the first point in the $j^{th}$ sub template with respect to the first prediction mode is greater than the first preset value, the $j^{th}$ sub template is mapped to the first template. For another example, if the weight of the first point in the $j^{th}$ sub template with respect to the first prediction mode is less than or equal to the first preset value, the $j^{th}$ sub template will be mapped to the second template The value of the first prediction value is not limited.

Optionally, the first preset value is 0.

Optionally, the first preset value is a positive value greater than median weight, if the maximum weight is 8, the median weight is 4.

In some embodiments, if the weight of the first point with respect to the $i^{th}$ prediction mode is greater than the first preset value, and the weight of the first point with respect to the $(i+1)^{th}$ prediction mode is also greater than the first preset value, the $j^{th}$ sub-template can be mapped to the $i^{th}$ template, and the $j^{th}$ sub-template can be mapped to the $(i+1)^{th}$ template. At this time, the $i^{th}$ template and the $(i+1)^{th}$ template have an overlapping part. Taking K=2 and the first predictive value=0 as an example, assuming that the $j^{th}$ sub-template is sub-template 3 in FIG. 18D, and the first point is the midpoint of lower edge of sub-template 3, according to the above method, it is determined that the weight of the first point with respect to the first prediction mode is greater than 0, and the weight of the first point with respect to the second prediction mode is also greater than 0. At this time, sub-template 3 can be mapped to the first template and the second template.

In some embodiments, if K=2, i=1, S202-A22 includes the following examples.

Example 1, if the weight of the first point with respect to the first prediction mode is greater than or equal to the second prediction value, the $j^{th}$ sub-template is to be mapped to the first template.

Example 2, if the weight of the first point with respect to the first prediction mode is less than the second prediction value, the $j^{th}$ sub-template is to be mapped to the second template.

The above, combined with specific examples, introduce the implementation of determining K templates based on the weight derivation mode in case 1. For example, by partitioning the template of the current block into K templates based on the boundary of the weight matrix corresponding to the weight derivation mode, or by partitioning the template of the current block into M sub-templates and mapping M sub-templates to K templates based on the weight derivation mode.

In embodiments of the disclosure, in addition to determining the K templates by using the method of case 1, the K templates can also be determined in the manner of Case 2.

Case 2: S202 includes the following steps.

S202-B1, determining a target first correspondence that the current block corresponds to from first correspondences corresponding to different preset block sizes, the first correspondence includes a correspondence between different angle indexes or different weight derivation modes between K templates.

S202-B2, determine K templates corresponding to the weight derivation mode from the target first correspondence.

Due to the current block being either a square or a rectangle, it may have a length greater than the width or a width greater than the length, and the ratio may also be 1:2, 1:4, etc. FIG. 10A and FIG. 10B illustrates the weight matrices of GPM in 32×64 and 64×32 blocks, and it can be seen that the intersection points of partition lines and block boundaries are not the same for different shapes. Because the shape of the block has changed, but the angle of the partition line does not change according to the shape of the block. For example, the mode with index 52 has an intersection with the left boundary of the current block in a 32×64 block, but has no intersection with the left boundary of the current block in a 64×32 block, and the corresponding intersection is at the lower boundary. That is to say, in the 32×64 block, the black part of mode 52 has adjacent parts to the left template of the current block, while in the 64×32 block, the black part of mode 52 has no adjacent parts to the left template of the current block.

In order to improve the accuracy for template selection, in embodiments of the disclosure, different rules are set according to the length and width of the current block.

For example, different first correspondences are set for three cases: length equal to width, length greater than width, and length less than width. Each first correspondence can be the Table 5 above, including the correspondence between different angle indexes or different weight derivation modes and K templates in this case.

Still another example, according to the aspect ratio, such as 1:4, 1:2, 1:1, 2:1, 4:1, etc., set a first correspondence for each classification, which includes the correspondence between different angle indexes or different weight derivation modes and K templates in the classification.

In this way, during encoding, the encoding end can determine the target first correspondence for the current block based on the size of the current block, such as the length and width of the current block, from the first correspondence for different preset block sizes, and according to the weight derivation mode, determine K templates corresponding to the weight derivation mode from the target first correspondence. In some embodiments, if the target first correspondence includes the correspondence between different angle indexes and K templates, it is necessary to determine the target angle index based on the weight derivation mode, and then query the K templates corresponding to the target angle index from the target first correspondence according to the target angle index.

For implementation of S202, reference can be made to the description of S102, and will not be repeated herein.

In embodiments of the disclosure, at the encoding end, after determining the K templates according to the above step, the following S203 is performed to determine K prediction modes of the current block according to the K templates.

S203, K prediction modes are determined according to the K templates.

S203-A1, at least one candidate prediction mode is obtained for the $i^{th}$ prediction mode in the K prediction modes.

The at least one candidate prediction mode may be understood as a candidate prediction mode corresponding to the $i^{th}$ prediction mode. In some embodiments, different prediction modes may correspond to different candidate prediction modes. In some embodiments, if two prediction modes are of the same type, for example, the two prediction modes each are an intra prediction mode, the two prediction modes may correspond to the same candidate prediction mode.

In the embodiment of the disclosure, at the encoding end, before determining the $i^{th}$ prediction mode, whether the $i^{th}$ prediction mode is determined through template matching is firstly determined.

In a possible implementation, enable flag A is obtained, where flag A indicates whether the $i^{th}$ prediction mode is determined through template matching.

Based on this, the encoding end determine the value of flag A, if the value of flag A is 1, it indicates that the kth prediction mode is determined through template matching. In this case, the encoding end perform the method in embodiments of the disclosure, the at least one candidate prediction mode is obtained, a cost of the candidate prediction mode is determined, and the $j^{th}$ prediction mode is determined according to the cost of the candidate prediction mode.

In another possible implementation, at the encoding end, it is determined by default that the $i^{th}$ prediction mode is determined through template matching. In this way, at the encoding end, when determining the $i^{th}$ prediction mode, the $i^{th}$ prediction mode is determined through template matching by default. Then at least one candidate prediction mode is obtained, a cost of the candidate prediction mode is determined, and the $j^{th}$ prediction mode is determined according to the cost of the candidate prediction mode.

In some embodiments, if the $i^{th}$ prediction mode is an inter prediction mode, the at least one candidate prediction mode includes one or more inter prediction modes, for example, includes at least one of skip, merge, a common inter prediction mode, unidirectional prediction, bidirectional prediction, or multi-hypothesis prediction.

In some embodiments, if the $j^{th}$ prediction mode is an intra prediction mode, the at least one candidate prediction mode includes at least one of a DC mode, a planar mode, or an angular mode. Optionally, the at least one candidate prediction mode includes an intra prediction mode in an MPM list.

In some embodiments, the at least one candidate prediction mode may further include modes such as IBC, palette, etc.

There is no limitation on the type(s) and the number of prediction modes in the at least one candidate prediction mode in the disclosure.

Optionally, the at least one candidate prediction mode is a preset mode.

Optionally, the at least one candidate prediction mode is a mode in the MPM list.

Optionally, the at least one candidate prediction mode is a set of candidate prediction modes determined according to some rules, such as equidistant selection.

S203-A2, a prediction value(s) of the $i^{th}$ template is obtained by predicting the $i^{th}$ template with the candidate prediction mode.

Exemplarily, for each candidate prediction mode in the at least one candidate prediction mode, the $i^{th}$ template is predicted with the candidate prediction mode to determine the prediction value of the $i^{th}$ template, where the prediction value of the $i^{th}$ template may be understood as a matrix formed by a prediction value of each sample in the $i^{th}$ template.

S203-A3, a cost of the candidate prediction mode is determined according to the prediction value of the $i^{th}$ template and a reconstructed value of the $i^{th}$ template.

In S203-A3, the manner for determining the cost of the candidate prediction mode includes but not limited to the following.

Manner I: The cost of candidate prediction mode is determined using a matrix.

Manner II: The cost of the candidate prediction mode is determined on a point basis, that is, the foregoing S203-A3 includes the following.

S203-A321, for an $i^{th}$ point in the $i^{th}$ template, a loss between an $i^{th}$ prediction value corresponding to the $i^{th}$ point in the prediction value of the $i^{th}$ template and an $i^{th}$ reconstructed value corresponding to the $i^{th}$ point in the reconstructed value of the $i^{th}$ sample is determined.

S203-A322, a cost of the candidate prediction mode at the $i^{th}$ point is determined according to the loss corresponding to the $i^{th}$ point.

S203-A323, the cost of the candidate prediction mode is determined according to costs of the candidate prediction mode at points in the $i^{th}$ template.

The $i^{th}$ point may be understood as any point in the $i^{th}$ template, that is, the process of determining a cost at each point in the $i^{th}$ template is the same, and reference can be made to the $i^{th}$ point. Specifically, the prediction value of the candidate prediction mode with respect to the $i^{th}$ template is obtained by predicting the $i^{th}$ template with the candidate prediction mode, the prediction value corresponding to the $i^{th}$ point in the prediction value of the $i^{th}$ template is recorded as an $i^{th}$ prediction value, and the reconstructed value corresponding to the $i^{th}$ point in the reconstructed value of the $i^{th}$ template is recorded as an $i^{th}$ reconstructed value. Then, the loss of the candidate prediction mode at the $i^{th}$ point is determined according to the $i^{th}$ prediction value and the $i^{th}$ reconstructed value, and the cost of the candidate prediction mode at the $i^{th}$ point is determined according to the loss of the candidate prediction mode at the $i^{th}$ point, for example, the loss of the candidate prediction mode at the $i^{th}$ point is determined as the cost of the candidate prediction mode at the $i^{th}$ point. According to the above method, the cost of the candidate prediction mode at each point or at multiple points in the $i^{th}$ template is determined, and then the cost of the candidate prediction mode with respect to the $i^{th}$ template is determined according to the cost at each point or the multiple points in the $i^{th}$ template. For example, a sum of costs of the candidate prediction mode at points in the $i^{th}$ template is determined as the cost of the candidate prediction mode with respect to the $i^{th}$ template, or an average value of costs of the candidate prediction mode at points in the $i^{th}$ template is determined as the cost of the candidate prediction mode with respect to the $i^{th}$ template. Determination of the cost of the candidate prediction mode with respect to the $i^{th}$ template according to the cost at at least one point in the $i^{th}$ template is not limited in the disclosure.

Exemplarily, taking an SAD cost as an example, the cost of the candidate prediction mode at the $i^{th}$ point (x, y) in the $i^{th}$ template may be determined according to the following formula (3):

| tempValueA[x][y]= abs(predTemplateSamplesCandA[x][y]−recTemplateSamples[x][y]) (3) |
|---|

Exemplarily, the cost of the candidate prediction mode is determined according to the following formula (4):

$$costCandA = \sum tempValueA[x][y] \quad (4)$$

abs(predTemplateSamplesCandA[x][y]-recTemplateSamples[x][y]) is an absolute value of a difference between the prediction value predTemplateSamplesCandA of point (x, y) in the $i^{th}$ template and a reconstructed value recTemplateSamples. The absolute value of the difference is referred to as the cost of point (x, y). tempValueA[x][y] may be considered as the cost of the candidate prediction mode at point (x, y). A total cost costCandA of the candidate prediction mode in the $i^{th}$ template is a sum of a cost at each point in the $i^{th}$ template.

It should be noted that, the cost of the candidate prediction mode is determined exemplarily according to the SAD. Optionally, the cost of the candidate prediction mode with respect to the $i^{th}$ template may also be determined according to cost calculation methods such as SATD and MSE.

According to the foregoing method, the cost of the candidate prediction mode with respect to the $i^{th}$ template may be determined, and then the following step S203-A4 is performed.

S203-A4, the $i^{th}$ prediction mode is determined according to the cost of the at least one candidate prediction mode.

In the embodiment of the disclosure, if the $i^{th}$ prediction mode is determined through template matching, then according to the foregoing method, a cost of the candidate prediction mode is determined, and the $i^{th}$ prediction mode is determined according to the cost of each candidate prediction mode.

Example 1: A candidate prediction mode with the minimum cost among the at least one candidate prediction mode is determined as the $i^{th}$ prediction mode.

Example 2: One or more candidate prediction modes are selected from the at least one candidate prediction mode according to the cost of the candidate prediction mode, and the $j^{th}$ prediction mode is determined from the one or more candidate prediction modes.

In a possible implementation of example 2, at the encoding end, one candidate prediction mode is selected from the one or more candidate prediction modes as the $j^{th}$ prediction mode.

For example, the number of the one or more candidate prediction modes is M, and the encoding end sorts the M candidate prediction modes according to costs. For example, the M candidate prediction modes are sorted in an ascending order of cost, or the M candidate prediction modes are sorted in a descending order of cost. One candidate prediction mode Bis determined from the sorted M candidate prediction modes as the $i^{th}$ prediction mode. Then, at the encoding end, an identifier of candidate prediction mode B is signalled into the bitstream, where the identifier of candidate prediction mode B may be a sequence number of candidate prediction mode B in the M candidate prediction modes, or may be a mode index number of candidate prediction mode B. As such, the decoding end decode the bitstream to obtain the identifier of candidate prediction mode B, and determine, from the determined M candidate prediction modes, a candidate prediction mode corresponding to the identifier of candidate prediction mode B as the $i^{th}$ prediction mode.

In another possible implementation of example 2, at the encoding end, an alternative prediction mode of the current block is obtained, a cost for predicting the $i^{th}$ template with the alternative prediction mode is determined, and according to the cost of predicting the $i^{th}$ template with the candidate prediction mode and the cost of the selected one or more candidate prediction modes with respect to the $i^{th}$ template, one prediction mode is selected from the alternative prediction mode and the one or more candidate prediction modes as the $i^{th}$ prediction mode.

Optionally, the alternative prediction mode of the current block includes one or more of a prediction mode of a reconstructed encoding block neighbouring the current block and/or a preset prediction mode.

It can be understood that, in the disclosure, the preset prediction mode may include one or more of multiple different modes such as a DC mode, a bilinear mode, and a planar mode.

Specifically, at the decoding end, the alternative prediction mode of the current block is obtained, for example, one or more of the prediction mode of a reconstructed decoding block neighbouring the current block and/or the preset prediction mode is taken as the alternative prediction mode of the current block. Then, a cost for predicting the template with each alternative prediction mode is determined, for example, the current block is predicted with the alternative prediction mode to obtain a prediction value, and the prediction value is compared with the reconstructed value of the template to obtain a cost of the alternative prediction mode, where the cost of the alternative prediction mode may be a cost such as an SAD or an SATD. According to the cost of the alternative prediction mode and costs of the one or more candidate prediction modes, one prediction mode is selected from the alternative prediction mode and the one or more candidate prediction modes as the $j^{th}$ prediction mode, for example, a prediction mode with the minimum cost among the alternative prediction mode and the one or more candidate prediction modes is determined as the $j^{th}$ prediction mode.

It should be noted that, the alternative prediction mode of the current block is different from the one or more candidate prediction modes determined. That is, at the decoding end, a prediction mode which is the same as the one or more candidate prediction modes is removed from the prediction mode of a reconstructed decoding block neighbouring the current block and/or the preset prediction mode, and the rest of the prediction modes is determined as the alternative prediction mode of the current block.

It can be understood that, for inter prediction, during template matching, "searching" may be performed on the basis of initial motion information. For each prediction mode, one motion information needs to be determined. Some pieces of motion information may be determined within a certain range around the initial motion information, so as to determine some prediction modes. For example, one initial motion information is given, where a motion vector thereof is (xInit, yInit). A search range is set, for example, a rectangular region from xInit−sR to xInit+sR in a horizontal direction and from yInit−sR to yInit+sR in a vertical direction, where sR may be 2, 4, 8, etc. Each motion vector in the rectangular region may be combined with other information, such as a reference picture index and a prediction list flag, of the initial motion information to determine one motion information, thereby determining one prediction mode. The at least one candidate prediction mode may include the determined prediction mode. For example, if GPM is used in a merge mode and the first prediction mode is determined through template matching, merge_gpm_idx0 may be used to determine one initial motion information from mergeCandList. Then (2*sR+1)*(2*sR+1) pieces of motion information are determined according to the foregoing method, so as to determine some prediction modes, where these prediction modes each are a merge mode or are referred to as a template matching-based merge mode.

It should be noted that, if a set consisting of the at least one candidate prediction mode includes a large number of prediction modes, considering complexity, cost determination may not be performed for each candidate prediction mode in the at least one candidate prediction mode. In some embodiments, the process of determining the $j^{th}$ prediction mode according to the cost of the at least one candidate prediction mode may be extended to several rounds of processes from coarse selection to fine selection. For example, in an inter prediction mode, the motion vector supports fractional-sample accuracy, such as ¼, ⅛, or 1/16 accuracy. Therefore, a prediction mode with the lowest cost among a prediction mode with an integer-sample motion vector may be firstly chosen, and then a prediction mode with the lowest cost is selected from the prediction mode chosen and a prediction mode with a fractional-sample motion vector whose motion vector is near a motion vector of the mode chosen. For example, in an intra prediction mode, one or more intra prediction modes are firstly selected at a certain granularity according to the cost of the candidate prediction mode, and then screening is performed on the one or more intra prediction modes and neighbouring intra prediction modes of finer granularity.

In the embodiment of the disclosure, if the $i^{th}$ prediction mode in the K prediction modes is determined through template matching, at least one candidate prediction mode is obtained, a prediction value of the template in the candidate prediction mode is obtained by predicting the template with the candidate prediction mode, the cost of the candidate prediction mode is obtained according to a prediction value of the template and a reconstructed value of the template in the candidate prediction mode, and the $j^{th}$ prediction mode is obtained according to the cost of the candidate prediction mode.

In the foregoing embodiment, the process of determining the $i^{th}$ prediction mode in the K prediction modes is taken as an example for illustration, and the process of determining other prediction modes in the K prediction modes is consistent with the process of determining the $i^{th}$ prediction mode, and reference can be made thereto. For example, K=2. The first prediction mode and the second prediction mode are determined according to the method. Then, at the encoding end, the first prediction value is obtained according to the first prediction mode, the second prediction value is obtained according to the second prediction mode, and the first prediction value and the second prediction value are weighted to obtain a new prediction value.

For implementations of S203, reference can be made to the description of S103, and will not be repeated herein.

According to the embodiment of the disclosure, K prediction modes can be determined according to K templates, and the K prediction modes are used for prediction of the current block to obtain the prediction value of the current block, as described with reference to S204 below.

S204, a prediction value is determined according to the K prediction modes and the weight derivation mode.

Here, the weights are determined according to the weight derivation mode, K prediction values are determined according to the K prediction modes, the K prediction values are weighted according to the weights, and a weighted result is determined as a final prediction value.

In the disclosure, the weight derivation mode is used to determine weights for weighting the prediction values of the current block. Specifically, the weight derivation mode may be a mode for deriving the weights. For a block of a given length and width, each weight derivation mode may be used to derive one weight matrix. For blocks of the same size, weight matrices derived from different weight derivation modes may be different.

Exemplarily, in the disclosure, there are 56 weight derivation modes for AWP in AVS3 and 64 weight derivation modes for GPM in VVC.

It can be understood that, in the embodiment of the disclosure, at the encoding end, when determining the prediction value based on the K prediction modes and the weights, the prediction value for each prediction mode may be firstly determined according to each of the K prediction modes.

In some embodiments, the foregoing prediction process is performed on a sample basis, and accordingly, the weight is a weight corresponding to a sample. In this case, when predicting the current block, sample A in the current block is predicted with each of the K prediction modes, so as to obtain K prediction values at sample A for the K prediction modes; the K prediction values are weighted according to the weights of sample A, so as to obtain a final prediction value of sample A. The foregoing steps are performed on each sample in the current block, and a final prediction value of each sample in the current block can be obtained, where the final prediction value of each sample in the current block forms a final prediction value of the current block. For example, K=2, sample A in the current block is predicted with the first prediction mode, to obtain a first prediction value of sample A; sample A is predicted with the second prediction mode, to obtain a second prediction value of sample A; and the first prediction value and the second prediction value are weighted according to weights corresponding to sample A, to obtain a final prediction value of sample A.

In an example, for example, K=2, if the first prediction mode and the second prediction mode are intra prediction modes, a first intra prediction mode is used for prediction to obtain a first prediction value, a second intra prediction mode is used for prediction to obtain a second prediction value, and the first prediction value and the second prediction value are weighted according to prediction weights to obtain a new prediction value. For example, sample A is predicted with the first intra prediction mode to obtain a first prediction value of sample A, sample A is predicted with the second intra prediction mode to obtain a second prediction value of sample A, and the first prediction value and the second prediction value are weighted according to prediction weights corresponding to sample A, so as to obtain a final prediction value of sample A.

In some embodiments, if the $i^{th}$ prediction mode in the K prediction modes is an inter prediction mode, determining the prediction value according to the K prediction modes and the weight derivation mode includes the following steps.

S204-AB21, motion information is determined according to the $i^{th}$ prediction mode.

S204-AB22, a $i^{th}$ prediction value is determined according to the motion information.

S204-AB23, (K−1) prediction values are determined according to prediction modes other than the $i^{th}$ prediction mode in the K prediction modes.

S204-AB24, weights are determined according to the weight derivation mode.

S204-AB25, a prediction value is determined according to the $i^{th}$ prediction value, the (K−1) prediction values, and the weights.

For example, K=2, if the first prediction mode is an intra prediction mode and the second prediction mode is an inter prediction mode, the intra prediction mode is used for prediction to obtain a first prediction value, the inter prediction mode is used for prediction to obtain a second prediction value, and the first prediction value and the second prediction value are weighted according to prediction weights to obtain a new prediction value. In this example, the intra prediction mode is used for prediction of each sample in the current block, so as to obtain a prediction value of each sample in the current block, and the prediction value of each sample in the current block constitutes a first prediction value of the current block. The inter prediction mode is used to determine motion information, a best matching block of the current block is determined according to the motion information, and the best matching block is determined as a second prediction value of the current block. With regard to prediction weights of each sample in the current block, the first prediction value and the second prediction value of the current block are weighted on a sample basis, so as to obtain a new prediction value of the current block. For example, for sample A in the current block, a first prediction value corresponding to sample A in the first prediction value of the current block and a second prediction value corresponding to sample A in the second prediction value of the current block are weighted according to prediction weights of sample A, so as to obtain a new prediction value of sample A.

In some embodiments, at the encoding end, before performing the method in the embodiment of the disclosure, whether template matching is applicable to the current block needs to be determined. If it is determined at the encoding end that template matching is applicable to the current block, steps S201 to S204 are performed. If it is determined at the encoding end that template matching is not applicable to the current block, the K prediction modes are determined in other manners.

Exemplarily, at the encoding end, whether template matching is applicable to the current block is determined according to the number of points included in the K templates.

In embodiments of the disclosure, template matching or adjacent reconstructed pixel texture characteristics are used for a prediction mode with a larger available template, while template matching or adjacent reconstructed pixel texture characteristics are not used for a prediction mode with a smaller available template.

In a possible implementation, whether template matching is applicable to the current block is determined according to the number of points included in the K templates.

In an example, if the number of points included in each of the K templates is greater than a preset threshold, it is determined that template matching is applicable to the current block, and then step S203 is performed to determine the K prediction modes according to the K templates.

Optionally, the preset threshold may be 0.

Optionally, the preset threshold is a median value of weigh, for example, 4.

Optionally, the preset threshold is a fixed value.

Optionally, the preset threshold is determined according to the size of the current block, for example, 1/m1 of the total number of samples in the current block, where m1 is a positive number.

Optionally, the preset threshold is determined according to the size of the template of the current block, for example, 1/m2 of the total number of points in the template of the current block, where m2 is a positive number.

In another example, if the number of points included in as least one template in the K templates is less than the preset threshold, the K prediction modes is determined according to the weight derivation mode.

In the embodiment of the disclosure, at the encoding end, after determining K templates according to at least one of the size of the current block and the weight derivation mode according to the above step S202, whether template matching is applicable to the current block is determined according to the number of points included in the K templates. Specifically, for the $i^{th}$ template in the K templates, if the number of samples included in the $i^{th}$ template is greater than the preset threshold, it indicates that an available template for determining the $i^{th}$ prediction mode in the $i^{th}$ template is large, and if the $i^{th}$ prediction mode is determined through the $i^{th}$ template, prediction effect may be improved. If the number of samples included in the $i^{th}$ template is less than the preset threshold, it indicates that the available template for determining the $i^{th}$ prediction mode in the $i^{th}$ template is relatively small or does not exist. In this case, if the $i^{th}$ prediction mode is determined through template matching, it will lead to adverse effect in addition to failure to improve compression efficiency.

In some embodiments, at the encoding end, a first flag is signalled into the bitstream, the first flag indicates whether to use template matching to derive the prediction mode for the current block.

If it is determined at the encoding end that template matching is to be used to derive the prediction mode for the current block, the first flag is set to 1, and the first flag set to 1 is signalled into the bitstream. If it is determined at the encoding end that template matching is not to be used to derive the prediction mode for the current block, the first flag is set to 0, and the first flag set to 0 is signalled into the bitstream. In this way, at the decoding end, after obtaining the bitstream, the first flag is obtained by decoding the bitstream, and whether to use template matching to derive the prediction mode for the current block is determined according to the first flag.

In some embodiments, if it is determined that template matching is not applicable to the current block, at last one of the K prediction modes is determined according to the weight derivation mode.

In the disclosure, the positions where the weight values change form a straight line (or curved line), or in the blending area as illustrated in FIG. 4 and FIG. 5, the positions where the weight values are the same form a straight line (or curved line). Such straight line may be called a boundary line (partition line or segmentation line). The boundary line itself also has an angle. The angle horizontal to the right may be set to 0 degrees, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a block, the corresponding texture is likely to show different characteristics on two sides of the boundary line, such as textures with two different angles on two sides of the boundary line respectively, or an angular texture on one side of the boundary line and a flat texture on the other side of the boundary line. Since the boundary line itself also has an angle, it may be assumed that the boundary line is obtained through angular prediction with a point, which may be close to some textures of the current block, so there is correlation between this straight line and the two prediction modes for the current block.

Specifically, in the disclosure, assuming that the boundary line is obtained through angular prediction with a point, at least one angular prediction mode may be found, which may be used to approximately create the boundary line.

It should be noted that, in the disclosure, the weight derivation mode may also be the index of the weight, for example, the 56 modes of AWP may be considered as 56 weight derivation modes, and the 64 modes of GPM in VVC may be considered as 64 weight derivation modes.

In some embodiments, in addition to the intra angular prediction mode corresponding to the weight boundary line, some intra angular prediction modes related to the weight boundary line are also more likely to be used, such as intra prediction modes corresponding to angles near the boundary line or perpendicular to the boundary line.

In some embodiments, in GPM, one prediction value is derived from intra prediction, and another prediction value is derived from inter prediction. Assume the intra prediction mode used in the disclosure is determined according to the weight derivation mode by default. For example, if the boundary line of the weight derivation mode is in the horizontal direction, such as modes with indexes 18, 19, 50, and 51 of GPM as illustrated in FIG. 4, the intra prediction mode is determined to be the horizontal mode 18. For another example, if the boundary line of the weight derivation mode is in the vertical direction, such as modes with indexes 0, 1, 36, and 37 of GPM as illustrated in FIG. 4, the intra prediction mode is determined to be the vertical mode 50.

That is, in the disclosure, before determining the at least one of the K prediction modes according to the weight derivation mode, types of the K prediction modes need to be determined. The prediction mode can be determined according to the weight derivation mode only if the prediction mode is an intra prediction mode.

Based on the above, before determining the at least one of the K prediction modes according to the weight derivation mode, the method in the embodiment of the disclosure further includes the following.

Step 21-0, a type flag is obtained, where the type flag indicates whether the K prediction modes each are an intra prediction mode.

Step 21-1, types of the K prediction modes are determined according to the type flag.

Exemplarily, K=2. If the value of the type flag is a first value, it indicates that the first prediction mode and the second prediction mode are inter prediction modes. Here, mode0IsInter=1, and mode1IsInter=1, where mode0IsInter indicates whether the first prediction mode is an inter prediction mode, and mode1IsInter indicates whether the second prediction mode is an inter prediction mode. When the first prediction mode is an inter prediction mode, mode0IsInter=1; when the second prediction mode is an inter prediction mode, mode1IsInter=1.

Exemplarily, if the value of the type flag is a second value, it indicates that the first prediction mode is an intra prediction mode and the second prediction mode is an inter prediction mode, and in this case, mode0IsInter=0 and mode1IsInter=1.

Exemplarily, if the value of the type flag is a third value, it indicates that the first prediction mode is an inter prediction mode and the second prediction mode is an intra prediction mode, and in this case, mode0IsInter=1 and mode1IsInter=0.

Exemplarily, if the value of the type flag is a fourth value, it indicates that the first prediction mode and the second prediction mode are intra prediction modes, and in this case, mode0IsInter=0 and mode1IsInter=0.

The value of each of the first value, the second value, the third value, and the fourth value is not limited in the disclosure.

Optionally, the first value is 0.

Optionally, the second value is 1.

Optionally, the third value is 2.

Optionally, the fourth value is 3.

In an example, the type flag may be represented by the field "intra_mode_idx".

In the disclosure, at the encoding end, after determining the type of the first prediction mode and the type of the second prediction mode according to the type flag, the type flag needs to be signalled the bitstream during encoding, so as to determine the type of the first prediction mode and the type of the second prediction mode according to the type flag.

In the disclosure, at the encoding end, after determining the type of K prediction modes according to the type flag, if at least one of the K prediction modes is an intra prediction mode, the intra prediction mode is determined according to the weight derivation mode.

That is, in the disclosure, an intra prediction mode is determined according to the weight derivation mode. For example, if the first prediction mode and the second prediction mode are intra prediction modes, the first prediction mode and the second prediction mode are determined according to the weight derivation mode. For another example, if one of the first prediction mode and the second prediction mode is an intra prediction mode, the intra prediction mode is determined from the first prediction mode and the second prediction mode according to the weight derivation mode.

In the disclosure, the manner for determining the at least one of the K prediction modes according to the weight derivation mode includes, but is not limited to, the following manners.

Manner I: If the at least one of the K prediction modes is an intra prediction mode, an angle index is determined according to the weight derivation mode, and an intra prediction mode corresponding to the angle index is determined as one of the K prediction modes.

In some embodiments, the angle index is represented by the field "angleIdx".

Table 2 above shows a correspondence between merge_gpm_partition_idx and angleIdx. With reference to Table 2, the angle index may be derived according to the weight derivation mode.

In the disclosure, there is a correspondence between angle indices and intra prediction modes, that is, different angle indices correspond to different intra prediction modes.

Exemplarily, the correspondence between angle indices and intra prediction modes is that as illustrated in the foregoing Table 7.

In manner I, taking K=2 as an example, if the first prediction mode or the second prediction mode is an intra prediction mode, the angle index is determined according to the weight derivation mode. Then, the intra prediction mode corresponding to the angle index is determined according to Table 7 above, for example, the angle index is 2, and the intra prediction mode corresponding to the angle index is 42, and then the intra prediction mode 42 is determined as the first prediction mode or the second prediction mode.

Manner II: If the at least one of the K prediction modes is an intra prediction mode, an intra prediction mode corresponding to the weight derivation mode is determined, and the at least one of the K prediction modes is determined from the intra prediction mode corresponding to the weight derivation mode.

In manner II, taking K=2 as an example, if the first prediction mode and/or the second prediction mode is an intra prediction mode, the first prediction mode and/or second prediction mode is determined from the intra prediction mode corresponding to the weight derivation mode. For example, the first second prediction mode and/or the second prediction mode may be an intra prediction mode that is on or near the same line as a weight partition line (also known as the boundary line). Alternatively, the first prediction mode and/or second prediction mode may be an intra prediction mode that is perpendicular or near perpendicular to the weight partition line.

As can be seen from the above, there are many types of intra prediction modes corresponding to the weight derivation mode, including an intra prediction mode parallel to the boundary line of weights, an intra prediction mode perpendicular to the boundary line, and the like. In the disclosure, a flag(s) may be used to indicate which mode in the intra prediction modes corresponding to the weight derivation mode is selected as an intra prediction mode in the first prediction mode and/or the second prediction mode.

Exemplarily, taking K=2 as an example, if the first prediction mode is an intra prediction mode, a second flag is used to indicate a correspondence between the first prediction mode and the intra prediction modes corresponding to the weight derivation mode. For example, the second flag indicates that the first prediction mode is the intra prediction mode parallel to the boundary line of weights, or indicates that the first prediction mode is the intra prediction mode perpendicular to the boundary line of weights.

Exemplarily, if the second prediction mode is an intra prediction mode, a third flag is used to indicate a correspondence between the second prediction mode and the intra prediction modes corresponding to the weight derivation mode. For example, the third flag indicates that the second prediction mode is the intra prediction mode parallel to the boundary line of weights, or indicates that the second prediction mode is the intra prediction mode perpendicular to the boundary line of weights.

Based on this, in manner II, the manner for determining the first prediction mode and/or the second prediction mode according to the intra prediction mode corresponding to the weight derivation mode includes, but is not limited to, the following examples.

Example 1, if the first prediction mode is an intra prediction mode, the second flag is obtained, and an intra prediction mode corresponding to the second flag in the intra prediction modes corresponding to the weight derivation mode is determined as the first prediction mode.

Example 2, if the second prediction mode is an intra prediction mode, the third flag is obtained, and an intra prediction mode corresponding to the third flag in the intra prediction modes corresponding to the weight derivation mode is determined as the second prediction mode.

In some embodiments, the intra prediction mode corresponding to the weight derivation mode includes at least one of the intra prediction mode parallel to the boundary line of weights or the intra prediction mode perpendicular to the boundary line.

In some embodiments, the intra prediction mode corresponding to the weight derivation mode includes at least one of: the intra prediction mode parallel to the boundary line of weights, the intra prediction mode perpendicular to the boundary line, or a planar mode.

Exemplarily, the second flag (intra_gpm_idx0) and/or the third flag (intra_gpm_idx1) may be signalled into the bitstream in the manner illustrated in Table 8 above.

At the encoding end, the second flag and/or the third flag is signalled into the bitstream in the manner illustrated in Table 8 above. At the decoding end, the bitstream is decoded to obtain the second flag and/or the third flag, the first prediction mode is determined according to the second flag and/or the second prediction mode is determined according to the third flag, and then a prediction value is determined according to the first prediction mode, the second prediction mode, and weights.

With reference to the foregoing method, the at least one of K prediction modes is determined according to the weight derivation mode, the K prediction values are determined according to the K prediction modes, and a final prediction value is obtained by weighting the K prediction values.

For implementation of S204, reference can be made to the description of S104, and will not be repeated herein.

In the prediction method provided in the embodiment of the disclosure, at the encoding end, the weight derivation mode of the current block is determined; based on at least one of the size of the current block and the weight derivation mode, determine K templates; determine K prediction modes based on the K templates; determine the prediction value based on the K prediction modes and the weight derivation mode. That is, in this disclosure, the K templates is determined based on the size of the current block and/or the weight derivation mode, so that the determined K templates are more in line with the actual situation. Therefore, when using these K templates to determine the prediction mode, the accuracy of determination of the prediction mode can be improved, and the accurately determined K prediction modes can be used to achieve accurate prediction of the current block, improving the encoding effect.

It should be understood that, FIG. 14 to FIG. 21 are merely examples of the disclosure, and should not be construed as limitations on the disclosure.

Preferable implementations of the disclosure have been described in detail above with reference to the accompanying drawings. However, the disclosure is not limited to the details described in the foregoing implementations. Within the scope of the technical concept of the disclosure, various simple modifications can be made to the technical solutions of the disclosure, and these simple modifications all fall within the protection scope of the disclosure. For example, various technical features described in the foregoing implementations may be combined in any suitable manner without contradiction, and in order to avoid unnecessary redundancy, various possible combinations are not further described in the disclosure. For another example, various implementations of the disclosure may also be combined in any manner, and as long as the combinations do not depart from the idea of the disclosure, they should also be considered as contents disclosed in the disclosure.

It should also be understood that, in various method embodiments of the disclosure, the magnitude of a sequence number of each of the foregoing processes does not mean an execution order, and an execution order of each process should be determined according to a function and an internal logic of the process, which shall not constitute any limitation on an implementation process of embodiments of the disclosure. In addition, the term "and/or" herein only describes an association between associated objects, which means that there can be three relationships. Specifically, A and/or B can mean A alone, both A and B exist, and B alone. Besides, the character "/" herein generally indicates that the associated objects are in an "or" relationship.

The method embodiments of the disclosure are described in detail above with reference to FIG. 14 to FIG. 21, and the apparatus embodiments of the disclosure are described in detail below with reference to FIG. 22 to FIG. 25.

Figure 22:
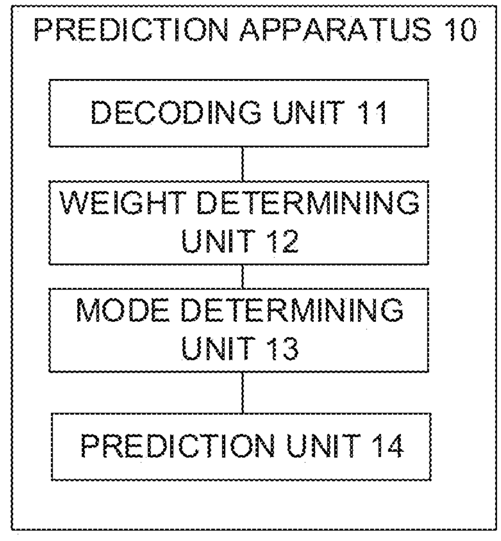
FIG. 22 is a schematic block diagram of a prediction apparatus provided in an embodiment of the disclosure.

FIG. 22 is a schematic block diagram of a prediction apparatus provided in an embodiment of the disclosure. The prediction apparatus 10 is applied to the foregoing video decoder.

As illustrated in FIG. 20, the prediction apparatus 10 includes a decoding unit 11, a template determining unit 12, a mode determining unit 13, and a prediction unit 14. The decoding unit 11 is configured to decode a bitstream to determine a weight derivation mode of a current block. The template determining unit 12 is configured to determine K templates according to at least one of the size of the current block and the weight derivation mode. K is a positive integer greater than 1. The mode determining unit 13 is configured to determine K prediction modes according to the K templates. The prediction unit 14 is configured to determine a prediction value according to the K prediction modes and the weight derivation mode.

In some embodiments, the template determining unit 12 is specifically configured to: partition a template of the current block into the K templates according to the weight derivation mode.

In some embodiments, the template determining unit 12 is configured to partition the template of the current block into M sub-templates, M is a positive integer greater than or equal to K; and map the M sub-templates into the K templates according to the weight derivation mode.

In some embodiments, the template determining unit 12 is configured to partition the template of the current block into the M sub-templates according to the weight derivation mode.

In some embodiments, the template determining unit 12 is configured to determine a boundary line of weights according to the weight derivation mode; and partition the template of the current block into the M sub-templates by extending the boundary line into the template of the current block.

In some embodiments, the template determining unit 12 is configured to obtain an extended line of the boundary line in the template of the current block by extending the boundary line into the template of the current block; and partition the template of the current block into M rectangular sub-templates with the extended line.

In some embodiments, the template determining unit 12 is configured to partition a top template of the current block into P sub-templates; and/or partition a left template of the current block into Q sub-templates; where P and Q are integers less than or equal to M, and a sum of P and Q equals to M.

In some embodiments, the template determining unit 12 is configured to partition the top template into the P sub-templates along a vertical direction.

In some embodiments, the template determining unit 12 is configured to partition the top template into the P sub-templates according to a preset number of samples.

In some embodiments, the template determining unit 12 is configured to partition the top template into the P sub-templates with n columns of samples being a minimum partitioning unit, n is a positive integer.

Optionally, n is determined according to a length of the current block.

In some embodiments, the template determining unit 12 is configured to partition the left template into the Q sub-templates along a horizontal direction.

In some embodiments, the template determining unit 12 is configured to partition the left template into the Q sub-templates according to a preset number of samples.

In some embodiments, the template determining unit 12 is configured to partition the left template into the Q sub-templates with m rows of samples being a minimum partitioning unit, m is a positive integer.

Optionally, m is determined according to a width of the current block.

In some embodiments, the template determining unit 12 is configured to, for a $j^{th}$ sub-template in the M sub-templates, determine a weight of a first point in the $j^{th}$ sub-template with respect to an $i^{th}$ prediction mode according to the weight derivation mode, wherein the $i^{th}$ prediction mode is any one of the K prediction modes; and map the $j^{th}$ sub-template into the K templates according to the weight of the first point in the $j^{th}$ sub-template with respect to the $i^{th}$ prediction mode.

In some embodiments, the template determining unit 12 is configured to determine an angle index and a distance index according to the weight derivation mode; and determine the weight of the first point in the $j^{th}$ sub-template with respect to the $i^{th}$ prediction mode according to the angle index and the distance index.

In some embodiments, the first point is one point on a boundary line between the $j^{th}$ sub-template and the current block.

In some embodiments, the first point is a middle point of the boundary line.

In some embodiments, the template determining unit 12 is configured to determine a first parameter of the first point according to the angle index, the distance index, and the size of the current block, wherein the first parameter is used for weight determination; and determine the weight of the first point with respect to the $i^{th}$ prediction mode according to the first parameter of the first point.

In some embodiments, the template determining unit 12 is configured to determine a second parameter of the first point according to the first parameter of the first point, wherein the second parameter is used for weight determination; and determine the weight of the first point with respect to the $i^{th}$ prediction mode according to the second parameter of the first point.

In some embodiments, the template determining unit 12 is configured to determine the weight of the first point with respect to the $i^{th}$ prediction mode according to the first parameter of the first point, a first preset value, and a second preset value.

In some embodiments, the weight of the first point with respect to the $i^{th}$ prediction mode is a first value of a second value.

In some embodiments, the template determining unit 12 is configured to map the $j^{th}$ sub-template into the $i^{th}$ template, and the $i^{th}$ template is one of the K templates, when the weight of the first point with respect to the $i^{th}$ prediction mode is greater than a first preset value.

In some embodiments, K=2 and i=1, the template determining unit 12 is configured to map the $j^{th}$ sub-template into a first template, when the weight of the first point with respect to a first prediction mode is greater than or equal to a second prediction value; map the $j^{th}$ sub-template into a second template, when the weight of the first point with respect to the first prediction mode is less than the second prediction value.

In some embodiments, the template determining unit 12 is configured to determine a target first correspondence for the current block from a first correspondence for different preset block-sizes, wherein the first correspondence comprises a correspondence between different angle indexes or different weight derivation modes and the K templates; and determine the K templates corresponding to the weight derivation mode from the target first correspondence.

In some embodiments, the mode determining unit 12 is configured to, for an $i^{th}$ prediction mode in the K prediction modes, obtain at least one candidate prediction modes; predict an $i^{th}$ template in the K templates by using the candidate prediction modes to obtain a prediction value of the $i^{th}$ template; determine a cost of the candidate prediction mode according to a prediction value and a reconstructed value of the $i^{th}$ template; and determine the $i^{th}$ prediction mode according to the cost of the at least one candidate prediction mode.

In some embodiments, the prediction unit 14 is specifically configured to: determine weight according to the weight derivation mode, determine K prediction values according to the K prediction modes, weight the K prediction values according to the weight, to obtain a final prediction value.

In some embodiments, the mode determining unit 13 is configured to determine the K prediction modes according to the K templates, when the number of samples comprises in each of the K templates is greater than a preset threshold In some embodiments, the mode determining unit 13 is configured to determine the K prediction modes according to the weight derivation mode, when the number of samples comprised in at least one of the K templates is less than the preset threshold.

In some embodiments, the template determining unit 12 is further configured to decode the bitstream to obtain a first flag, where the first flag indicates whether to use template matching to derive a prediction mode, determine the K templates according to at least one of the size of the current block and the weight derivation mode if the first flag indicates to use template matching to derive the prediction mode.

In some embodiments, the mode determining unit 13 is further configured to determine the K prediction modes of the current block according to the weight derivation mode, if the first flag indicates not to use template matching to derive the prediction mode.

In some embodiments, the at least one of the K prediction modes is an intra prediction mode, the mode determining unit 13 is further configured to: determine an angle index according to the weight derivation mode, and determine an intra prediction mode corresponding to the angle index as at least one of the K prediction modes.

In some embodiments, the at least one of the K prediction modes is an intra prediction mode, and the mode determining unit 13 is further configured to determine an intra prediction mode corresponding to the weight derivation mode, and determine the at least one of the K prediction modes according to the intra prediction mode corresponding to the weight derivation mode.

In some embodiments, the intra prediction mode corresponding to the weight derivation mode includes at least one of: an intra prediction mode parallel to a boundary line of weights, an intra prediction mode perpendicular to the boundary line, or a planar mode.

In some embodiments, an $i^{th}$ prediction mode in the K prediction modes is an inter prediction mode, and the prediction unit 14 is specifically configured to: determine motion information according to the $i^{th}$ prediction mode; determine an $i^{th}$ prediction value according to the motion information; determine (K−1) prediction values according to prediction modes other than the $i^{th}$ prediction mode in the K prediction modes; determine weights according to the weight derivation mode; and determine the final prediction value according to the $i^{th}$ prediction value, the (K−1) prediction values, and the weights.

It should be understood that, the apparatus embodiments and the method embodiments may correspond to each other, and for similar elaborations, reference can be made to the method embodiments, which will not be elaborated again herein to avoid redundancy. Specifically, the apparatus 10 illustrated in FIG. 22 may perform the prediction method at the decoding end in the embodiment of the disclosure, and the foregoing and other operations and/or functions of various units in the apparatus 10 are respectively intended to implement corresponding processes in the foregoing methods such as the prediction method at the decoding end, which are not described again herein for brevity.

Figure 23:
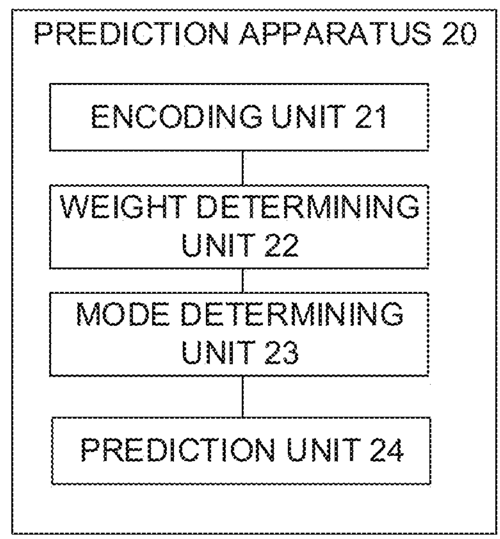
FIG. 23 is a schematic block diagram of a prediction apparatus provided in an embodiment of the disclosure.

FIG. 23 is a schematic block diagram of a prediction apparatus provided in an embodiment of the disclosure. The prediction apparatus is applied to the foregoing encoder.

As illustrated in FIG. 23, the prediction apparatus 20 may include a determining unit 21, a template determining unit 22, a mode determining unit 23, and a prediction unit 24. The determining unit 21 is configured to determine a weight derivation mode of a current block. The template determining unit 22 is configured to determine K templates according to at least one of the size of the current block and the weight derivation mode. The mode determining unit 23 is configured to determine K prediction modes according to the K templates, where K is a positive integer and K>1. The prediction unit 24 is configured to determine a prediction value according to the K prediction modes and the weight derivation mode.

In some embodiments, the template determining unit 22 is configured to partition a template of the current block into the K templates according to the weight derivation mode.

In some embodiments, the template determining unit 22 is configured to partition the template of the current block into M sub-templates, M is a positive integer greater than or equal to K; and map the M sub-templates into the K templates according to the weight derivation mode.

In some embodiments, the template determining unit 22 is configured to partition the template of the current block into the M sub-templates according to the weight derivation mode.

In some embodiments, the template determining unit 22 is configured to determine a boundary line of weights according to the weight derivation mode, and partition the template of the current block into the M sub-templates by extending the boundary line into the template of the current block.

In some embodiments, the template determining unit 22 is configured to obtain an extended line of the boundary line in the template of the current block by extending the boundary line into the template of the current block, and partition the template of the current block into M rectangular sub-templates with the extended line.

In some embodiments, the template determining unit 22 is configured to partition a top template of the current block into P sub-templates; and/or partition a left template of the current block into Q sub-templates, wherein P and Q are integers less than or equal to M, and a sum of P and Q equals to M.

In some embodiments, the template determining unit 22 is configured to partition the top template into the P sub-templates along a vertical direction.

In some embodiments, the template determining unit 22 is configured to partition the top template into the P sub-templates according to a preset number of samples.

In some embodiments, the template determining unit 22 is configured to partition the top template into the P sub-templates with n columns of samples being a minimum partitioning unit, n is a positive integer.

In some embodiments, n is determined according to a length of the current block.

In some embodiments, the template determining unit 22 is configured to partition the left template into the Q sub-templates along a horizontal direction.

In some embodiments, the template determining unit 22 is configured to partition the left template into the Q sub-templates according to a preset number of samples.

In some embodiments, the template determining unit 22 is configured to partition the left template into the Q sub-templates with m rows of samples being a minimum partitioning unit, m is a positive integer.

In some embodiments, m is determined according to a width of the current block.

In some embodiments, the template determining unit 22 is configured to, for a $j^{th}$ sub-template in the M sub-templates, determine a weight of a first point in the $j^{th}$ sub-template with respect to an $i^{th}$ prediction mode according to the weight derivation mode, wherein the $i^{th}$ prediction mode is any one of the K prediction modes; and map the $j^{th}$ sub-template into the K templates according to the weight of the first point in the $j^{th}$ sub-template with respect to the $i^{th}$ prediction mode.

In some embodiments, the template determining unit 22 is configured to determine an angle index and a distance index according to the weight derivation mode, and determine the weight of the first point in the $j^{th}$ sub-template with respect to the $i^{th}$ prediction mode according to the angle index and the distance index.

In some embodiments, the first point is one point on a boundary line between the $j^{th}$ sub-template and the current block.

In some embodiments, the first point is a middle point of the boundary line.

In some embodiments, the template determining unit 22 is configured to determine a first parameter of the first point according to the angle index, the distance index, and the size of the current block, wherein the first parameter is used for weight determination, and determine the weight of the first point with respect to the $i^{th}$ prediction mode according to the first parameter of the first point.

In some embodiments, the template determining unit 22 is configured to determine a second parameter of the first point according to the first parameter of the first point, and determine the weight of the first point with respect to the $i^{th}$ prediction mode according to the second parameter of the first point.

In some embodiments, the template determining unit 22 is configured to determine the weight of the first point with respect to the $i^{th}$ prediction mode according to the first parameter of the first point, a first preset value, and a second preset value.

In some embodiments, the weight of the first point with respect to the $i^{th}$ prediction mode is a first value of a second value.

In some embodiments, the template determining unit 22 is configured to map the $j^{th}$ sub-template into the $i^{th}$ template, and the $i^{th}$ template is one of the K templates, when the weight of the first point with respect to the $i^{th}$ prediction mode is greater than a first preset value.

In some embodiments, K=2 and i=1, the template determining unit 22 is configured to map the $j^{th}$ sub-template into a first template, when the weight of the first point with respect to a first prediction mode is greater than or equal to a second prediction value; and map the $j^{th}$ sub-template into a second template, when the weight of the first point with respect to the first prediction mode is less than the second prediction value.

In some embodiments, the template determining unit 22 is configured to determine a target first correspondence for the current block from a first correspondence for different preset block-sizes, wherein the first correspondence comprises a correspondence between different angle indexes or different weight derivation modes and the K templates; and determine the K templates corresponding to the weight derivation mode from the target first correspondence.

In some embodiments, the mode determining unit 23 is configured to, for an $i^{th}$ prediction mode in the K prediction modes, obtain at least one candidate prediction modes; predict an $i^{th}$ template in the K templates by using the candidate prediction modes to obtain a prediction sample of the $i^{th}$ template; determine a cost of the candidate prediction mode according to a prediction value and a reconstructed value of the $j^{th}$ template; and determine the $i^{th}$ prediction mode according to the cost of the at least one candidate prediction mode.

In some embodiments, the prediction unit 24 is configured to determine a weight according to the weight derivation mode, determine K prediction values according to the K prediction modes, and determine a final prediction value by weighting the K predicted values according to the weight.

In some embodiments, the template determining unit 23 is configured to determine the K prediction modes according to the K templates, when the number of samples comprises in each of the K templates is greater than a preset threshold.

In some embodiments, the template determining unit 23 is configured to determine the K prediction modes according to the weight derivation mode, when the number of samples comprised in at least one of the K templates is less than the preset threshold.

In some embodiments, the mode determining unit is further configured to signal a first flag into a bitstream, where the first flag indicates whether to use template matching to derive a prediction mode.

In some embodiments, the at least one of the K prediction modes is an intra prediction mode, and the mode determining unit 23 is specifically configured to: determine an angle index according to the weight derivation mode; and determine an intra prediction mode corresponding to the angle index as at least one of the K prediction modes.

In some embodiments, the at least one of the K prediction modes is an intra prediction mode, and the mode determining unit 23 is specifically configured to: determine an intra prediction mode corresponding to the weight derivation mode; and determine the at least one of the K prediction modes according to the intra prediction mode corresponding to the weight derivation mode.

In some embodiments, the intra prediction mode corresponding to the weight derivation mode includes at least one of: an intra prediction mode parallel to a boundary line of weights, an intra prediction mode perpendicular to the boundary line, or a planar mode.

In some embodiments, an $i^{th}$ prediction mode in the K prediction modes is an inter prediction mode, and the prediction unit 24 is specifically configured to: determine motion information according to the $i^{th}$ prediction mode; determine an $i^{th}$ prediction value according to the motion information; determine (K−1) prediction values according to prediction modes other than the $i^{th}$ prediction mode in the K prediction modes; determine weights according to the weight derivation mode; and determine the final prediction value according to the $i^{th}$ prediction value, the (K−1) prediction values, and the weights.

It should be understood that, the apparatus embodiments and the method embodiments may correspond to each other, and for similar elaborations, reference can be made to the method embodiments, which will not be described again herein to avoid redundancy. Specifically, the apparatus 20 illustrated in FIG. 23 may correspond to a corresponding entity for performing the prediction method at the encoding end according to the embodiment of the disclosure, and the foregoing and other operations and/or functions of various units in the apparatus 20 are respectively intended to implement corresponding processes of various methods such as the prediction method at the encoding end, which will not be repeated herein for brevity.

The apparatus and system of embodiments of the disclosure are described above from the perspective of functional units with reference to the accompanying drawings. It should be understood that, the functional unit may be implemented in the form of hardware, or may be implemented by an instruction in the form of software, or may be implemented by a combination of hardware and software unit. Specifically, each step of the method embodiments of the disclosure may be completed by an integrated logic circuit of hardware in a processor and/or an instruction in the form of software. The steps of the method disclosed in embodiments of the disclosure may be directly implemented by a hardware decoding processor, or may be performed by hardware and software units in the decoding processor. Optionally, the software unit may be located in a storage medium such as a random access memory (RAM), a flash memory, a read only memory (ROM), a programmable ROM (PROM), or an electrically erasable programmable memory, registers, and the like. The storage medium is located in a memory. The processor reads the information in the memory, and completes the steps of the foregoing method embodiments with the hardware of the processor.

Figure 24:
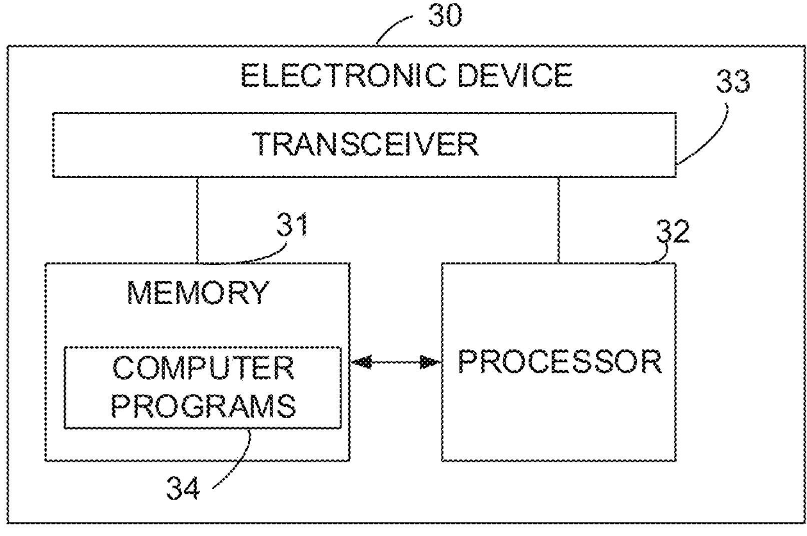
FIG. 24 is a schematic block diagram of an electronic device provided in embodiments of the disclosure.

FIG. 24 is a schematic block diagram of an electronic device provided in embodiments of the disclosure.

As illustrated in FIG. 24, the electronic device 30 may be a video encoder or a video decoder according to embodiments of the disclosure. The electronic device 30 may include a memory 31 and a processor 32. The memory 31 is configured to store computer programs 34 and transmit the program codes 34 to the processor 32. In other words, the processor 32 may call the computer programs 34 from the memory 31 to implement the method in embodiments of the disclosure.

For example, the processor 32 may be configured to perform the steps in the method 200 described above according to instructions in the computer programs 34.

In some embodiments of the disclosure, the processor 32 may include, but is not limited to: a general-purpose processor, a digital signal processor (DSP), an application specific integrated circuit (ASIC), a field programmable gate array (FPGA), or other programmable logic devices, discrete gates or transistor logic devices, discrete hardware components, etc.

In some embodiments of the disclosure, the memory 31 includes, but is not limited to: a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

In some embodiments of the disclosure, the computer program 34 may be divided into one or more units, and the one or more units are stored in the memory 31 and executed by the processor 32 to complete the method provided in the disclosure. The one or more units may be a series of computer program instruction segments capable of performing particular functions, where the instruction segments are used for describing the execution of the computer program 34 in the electronic device 30.

As illustrated in FIG. 24, the electronic device 30 may further include a transceiver 33. The transceiver 33 may be connected to the processor 32 or the memory 33.

The processor 32 can control the transceiver 33 to communicate with other devices, and specifically, can send information or data to other devices, or receive information or data sent by other devices. The transceiver 33 may further include an antenna, where one or more antennas may be provided.

It should be understood that, various components in the electronic device 30 are connected via a bus system. In addition to a data bus, the bus system further includes a power bus, a control bus, and a status signal bus.

Figure 25:
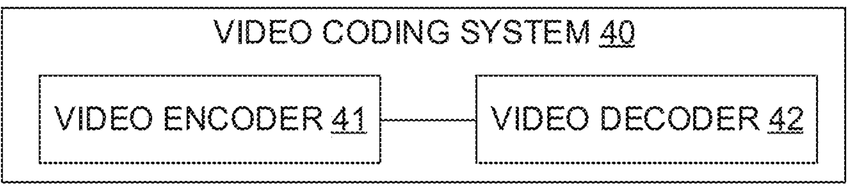
FIG. 25 is a schematic block diagram of a video coding system provided in embodiments of the disclosure.

FIG. 25 is a schematic block diagram of a video coding system provided in embodiments of the disclosure.

As illustrated in FIG. 25, the video coding system 40 may include a video encoder 41 and a video decoder 42. The video encoder 41 is configured to perform the video encoding method in embodiments of the disclosure, and the video decoder 42 is configured to perform the video decoding method in embodiments of the disclosure.

The disclosure further provides a computer storage medium. The computer storage medium is configured to store computer programs. The computer programs, when executed by a computer, are operable with the computer to perform the method in the foregoing method embodiments. Alternatively, embodiments of the disclosure further provide a computer program product. The computer program product includes instructions which, when executed by a computer, are operable with the computer to perform the method in the foregoing method embodiments.

The disclosure further provides a bitstream. The bitstream is generated according to the encoding method.

When implemented by software, all or some the above embodiments can be implemented in the form of a computer program product. The computer program product includes one or more computer instructions. When the computer instructions are applied and executed on a computer, all or some the operations or functions of the embodiments of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disk, a hard disk, or a magnetic tape), an optical medium (such as a digital video disc (DVD)), or a semi-conductor medium (such as a solid state disk (SSD)), etc.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure. For example, various functional units described in various embodiments of the disclosure may be integrated into one processing unit or may be present as a number of physically separated units, and two or more units may be integrated into one.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

I claim:

1. A prediction method, applied to a decoder and comprising:

decoding a bitstream to determine a weight derivation mode of a current block;

determining K templates according to at least one of a size of the current block and the weight derivation mode, wherein K is a positive integer and K>1;

determining K prediction modes according to the K templates; and determining a prediction value according to the K prediction modes and the weight derivation mode;

wherein determining the K templates according to at least one of the size of the current block and the weight derivation mode comprises:

partitioning the template of the current block into M sub-templates, M being a positive integer greater than or equal to K; and mapping the M sub-templates into the K templates according to the weight derivation mode.

2. The method of claim 1, wherein partitioning the template of the current block into the M sub-templates comprises:

partitioning the template of the current block into the M sub-templates according to the weight derivation mode.

3. The method of claim 2, wherein partitioning the template of the current block into the M sub-templates according to the weight derivation mode comprises:

determining a boundary line of weights according to the weight derivation mode; and partitioning the template of the current block into the M sub-templates by extending the boundary line into the template of the current block.

4. The method of claim 3, wherein partitioning the template of the current block into the M sub-templates by extending the boundary line into the template of the current block comprises:

obtaining an extended line of the boundary line in the template of the current block by extending the boundary line into the template of the current block; and partitioning the template of the current block into M rectangular sub-templates with the extended line.

5. The method of claim 1, wherein partitioning the template of the current block into the M sub-templates comprises at least one of:

partitioning a top template of the current block into P sub-templates; and partitioning a left template of the current block into Q sub-templates;

wherein P and Q are integers less than or equal to M, and a sum of P and Q equals to M.

6. The method of claim 5, wherein partitioning the top template of the current block into the P sub-templates comprises:

partitioning the top template into the P sub-templates along a vertical direction, or partitioning the top template into the P sub-templates with n columns of samples being a minimum partitioning unit, n being a positive integer, wherein n is determined according to a length of the current block.

7. The method of claim 5, wherein partitioning the left template of the current block into the Q sub-templates comprises:

partitioning the left template into the Q sub-templates along a horizontal direction; or partitioning the left template into the Q sub-templates with m rows of samples being a minimum partitioning unit, m being a positive integer, wherein m is determined according to a width of the current block.

8. The method of claim 1, wherein mapping the M sub-templates into the K templates according to the weight derivation mode comprises:

for a $j^{th}$ sub-template in the M sub-templates, determining a weight of a first point in the $j^{th}$ sub-template with respect to an $i^{th}$ prediction mode according to the weight derivation mode, wherein the $i^{th}$ prediction mode is any one of the K prediction modes; and mapping the $j^{th}$ sub-template into the K templates according to the weight of the first point in the $j^{th}$ sub-template with respect to the $i^{th}$ prediction mode.

9. The method of claim 8, wherein determining the weight of the first point in the $j^{th}$ sub-template with respect to the $i^{th}$ prediction mode according to the weight derivation mode comprises:

determining an angle index and a distance index according to the weight derivation mode; and determining the weight of the first point in the $j^{th}$ sub-template with respect to the $i^{th}$ prediction mode according to the angle index and the distance index.

10. The method of claim 8, wherein mapping the $j^{th}$ sub-template into the K templates according to the weight of the first point in the $j^{th}$ sub-template with respect to the $i^{th}$ prediction mode comprises:

mapping the $j^{th}$ sub-template into the $i^{th}$ template, and the $i^{th}$ template is one of the K templates, when the weight of the first point with respect to the $i^{th}$ prediction mode is greater than a first preset value.

11. The method of claim 1, wherein determining the K templates according to at least one of the size of the current block and the weight derivation mode comprises:

determining a target first correspondence for the current block from a first correspondence for different preset block-sizes, wherein the first correspondence comprises a correspondence between different angle indexes or different weight derivation modes and the K templates; and determining the K templates corresponding to the weight derivation mode from the target first correspondence.

12. The method of claim 1, wherein determining the K prediction modes according to the K templates comprises:

for an $i^{th}$ prediction mode in the K prediction modes, obtaining at least one candidate prediction modes;

predicting an $i^{th}$ template in the K templates by using the candidate prediction modes to obtain a prediction value of the $i^{th}$ template;

determining a cost of the candidate prediction mode according to a prediction value and a reconstructed value of the $i^{th}$ template; and determining the $i^{th}$ prediction mode according to the cost of the at least one candidate prediction mode.

13. The method of claim 1, wherein determining the prediction value according to the K prediction modes and the weight derivation mode comprises:

determining a weight according to the weight derivation mode;

determining K prediction values according to the K prediction modes; and determining the prediction value by weighting the K predicted values according to the weight.

14. A prediction method, applied to an encoder and comprising:

determining a weight derivation mode of a current block;

determining K templates according to at least one of a size of the current block and the weight derivation mode, wherein K is a positive integer and K>1;

determining K prediction modes according to the K templates; and determining a prediction value according to the K prediction modes and the weight derivation mode;

wherein determining the K templates according to at least one of the size of the current block and the weight derivation mode comprises:

partitioning the template of the current block into M sub-templates, M being a positive integer greater than or equal to K; and mapping the M sub-templates into the K templates according to the weight derivation mode.

15. The method of claim 14, wherein mapping the M sub-templates into the K templates according to the weight derivation mode comprises:

for a $j^{th}$ sub-template in the M sub-templates, determining a weight of a first point in the $j^{th}$ sub-template with respect to an $i^{th}$ prediction mode according to the weight derivation mode, wherein the $i^{th}$ prediction mode is any one of the K prediction modes; and mapping the $j^{th}$ sub-template into the K templates according to the weight of the first point in the $j^{th}$ sub-template with respect to the $i^{th}$ prediction mode.

16. The method of claim 15, wherein determining the weight of the first point in the $j^{th}$ sub-template with respect to the $i^{th}$ prediction mode according to the weight derivation mode comprises:

determining an angle index and a distance index according to the weight derivation mode; and determining the weight of the first point in the $j^{th}$ sub-template with respect to the $i^{th}$ prediction mode according to the angle index and the distance index.

17. The method of claim 15, wherein mapping the $j^{th}$ sub-template into the K templates according to the weight of the first point in the $j^{th}$ sub-template with respect to the $i^{th}$ prediction mode comprises:

mapping the $j^{th}$ sub-template into the $i^{th}$ template, and the $i^{th}$ template is one of the K templates, when the weight of the first point with respect to the $i^{th}$ prediction mode is greater than a first preset value.

18. A method for bitstream transmission, comprising:

obtaining, by a processor, a bitstream; and transmitting the bitstream;

wherein the bitstream is generated by performing steps of:

determining, by the processor, a weight derivation mode of a current block;

determining, by the processor, K templates according to at least one of a size of the current block and the weight derivation mode, wherein K is a positive integer and K>1;

determining, by the processor, K prediction modes according to the K templates; and determining, by the processor, a prediction value according to the K prediction modes and the weight derivation mode;

wherein determining the K templates according to at least one of the size of the current block and the weight derivation mode comprises:

partitioning the template of the current block into M sub-templates, M being a positive integer greater than or equal to K; and mapping the M sub-templates into the K templates according to the weight derivation mode.

19. The method of claim 1, wherein the weight derivation mode is used to determine a weight matrix or weights.

20. The method of claim 14, wherein the weight derivation mode is used to determine a weight matrix or weights.

* * * * *